United States Patent
Pertel et al.

(10) Patent No.: US 12,447,178 B2
(45) Date of Patent: Oct. 21, 2025

(54) METHOD OF TREATMENT USING ANTI-CD19 RITUXIMAB-RESISTANT CHIMERIC ANTIGEN RECEPTORS

(71) Applicant: ALLOGENE THERAPEUTICS, INC., South San Francisco, CA (US)

(72) Inventors: Thomas Charles Pertel, San Mateo, CA (US); Barbra Johnson Sasu, San Francisco, CA (US); Mark W. Leonard, Burlingame, CA (US)

(73) Assignee: Allogene Therapeutics, Inc., South San Francisco, CA (US)

( * ) Notice: Subject to any disclaimer, the term of this patent is extended or adjusted under 35 U.S.C. 154(b) by 0 days.

(21) Appl. No.: 18/395,996

(22) Filed: Dec. 26, 2023

(65) Prior Publication Data

US 2024/0277763 A1    Aug. 22, 2024

Related U.S. Application Data

(62) Division of application No. 16/857,573, filed on Apr. 24, 2020, now Pat. No. 11,896,617.

(Continued)

(51) Int. Cl.
*A61K 39/395* (2006.01)
*A61K 35/17* (2015.01)
(Continued)

(52) U.S. Cl.
CPC .............. *A61K 35/17* (2013.01); *A61K 40/11* (2025.01); *A61K 40/31* (2025.01); *A61K 40/4211* (2025.01); *A61P 35/00* (2018.01); *C07K 14/70517* (2013.01); *C07K 14/70596* (2013.01); *C07K 16/2803* (2013.01);
(Continued)

(58) Field of Classification Search
None
See application file for complete search history.

(56) References Cited

U.S. PATENT DOCUMENTS 5,830,462 A   11/1998   Crabtree et al.
5,834,266 A   11/1998   Crabtree et al.
(Continued)

FOREIGN PATENT DOCUMENTS

WO   WO2013153391 A1   10/2013
WO   WO2014127261 A1   8/2014
(Continued)

OTHER PUBLICATIONS

Perosa et al., Two Structurally Dierent Rituximab-Specic CD20 Mimotope Peptides Reveal That Rituximab Recognizes Two Dierent CD20-Associated Epitopes, J. Immuno. 182(1):416-423, 2009.*
(Continued)

*Primary Examiner* — Claire Kaufman
(74) *Attorney, Agent, or Firm* — Allogene Therapeutics, Inc.

(57) ABSTRACT

Provided herein are polynucleotides encoding chimeric antigen receptors (CARs) comprising a CD19 antigen binding domain that specifically binds to CD19 and is resistant to rituximab binding; and immune cells comprising these CD19-specific CARs, e.g., CAR-T cells. Also provided are methods of making and using these CD19-specific CARs, and immune cells comprising these CD19-specific CARs.

21 Claims, 30 Drawing Sheets

Specification includes a Sequence Listing.

Related U.S. Application Data

(60) Provisional application No. 63/005,041, filed on Apr. 3, 2020, provisional application No. 62/839,455, filed on Apr. 26, 2019.

(51) Int. Cl.

| | |
|---|---|
| *A61K 40/11* | (2025.01) |
| *A61K 40/31* | (2025.01) |
| *A61K 40/42* | (2025.01) |
| *A61P 35/00* | (2006.01) |
| *C07K 14/705* | (2006.01) |
| *C07K 16/28* | (2006.01) |
| *C12N 5/0783* | (2010.01) |
| *A61K 39/00* | (2006.01) |
| *C12N 15/00* | (2006.01) |

(52) U.S. Cl.
CPC ...... *C12N 5/0636* (2013.01); *A61K 2039/505* (2013.01); *A61K 2239/38* (2023.05); *C07K 2317/76* (2013.01); *C07K 2319/33* (2013.01); *C12N 2510/00* (2013.01); *C12N 2740/15043* (2013.01)

(56) References Cited

U.S. PATENT DOCUMENTS

| | | | |
|---|---|---|---|
| 5,869,337 | A | 2/1999 | Crabtree et al. |
| 6,165,787 | A | 12/2000 | Crabtree et al. |
| 6,319,494 | B1 | 11/2001 | Capon et al. |
| 7,741,465 | B1 | 6/2010 | Eshhar et al. |
| 8,436,183 | B2 | 5/2013 | Holt et al. |
| 8,486,693 | B2 | 7/2013 | Park et al. |
| 8,906,682 | B2 | 12/2014 | June et al. |
| 9,024,028 | B2 | 5/2015 | Li et al. |
| 9,944,690 | B2 | 4/2018 | Spencer et al. |
| 10,428,142 | B2 | 10/2019 | Jarjour et al. |
| 10,874,693 | B2 | 12/2020 | Galetto et al. |
| 10,888,608 | B2 | 1/2021 | Spencer et al. |
| 2011/0286980 | A1 | 11/2011 | Brenner |
| 2016/0046700 | A1 | 2/2016 | Foster et al. |
| 2016/0068601 | A1 | 3/2016 | Brogdon et al. |
| 2017/0173124 | A1 | 6/2017 | Thrasher et al. |
| 2018/0319854 | A1 | 11/2018 | Gummadova |
| 2021/0213119 | A1 | 7/2021 | Wang et al. |

FOREIGN PATENT DOCUMENTS

| | | | |
|---|---|---|---|
| WO | WO2014184143 | A1 | 11/2014 |
| WO | WO2015090229 | A1 | 6/2015 |
| WO | WO2015120096 | | 8/2015 |
| WO | WO2015132604 | A1 | 9/2015 |
| WO | WO2016036746 | A1 | 3/2016 |
| WO | WO2016120216 | A1 | 8/2016 |
| WO | WO2017180587 | A2 | 4/2017 |
| WO | WO2017156484 | A1 | 9/2017 |
| WO | WO2018161017 | A1 | 9/2018 |
| WO | WO2018178377 | | 10/2018 |

OTHER PUBLICATIONS

Miller et al., CD19-Targeted CAR T Cells: A New Tool in the Fight against B Cell Malignancies, Oncol. Res. Treat. 38:683-690, 2015.*
Jensen-Jarolim et al., Small mimotopes are big in identifying B-cell epitopes, Blood, 108(6):1794-1795, 2006.*
Hofmann et al., Targeting B Cells and Plasma Cells in Autoimmune DiseasesFront. Immunol. 9:835, 17 pages, Apr. 2018.*
Brenner, Malcom K., et al., "Adoptive T Cell Therapy of Cancer", Curr Opin Immunol. Apr. 2010 ; 22(2): 251-257. doi:10.1016/j.coi. 2010.01.020.
Eshhar, Zelig , et al., "Specific activation and targeting of cytotoxic lymphocytes through chimeric single chains consisting of antibody-binding domains and the gamma or zeta subunits of the immunoglobulin and T-cell receptors.", Immunology; Proc Natl Acad Sci U S A. Jan. 15, 1993; 90(2): 720-724.
Finney, Helen , et al., "Chimeric Receptors Providing Both Primary and Costimulatory Signaling in T Cells from a Single Gene Product", J Immunol Sep. 15, 1998, 161 (6) 2791-2797.
Gross, Gideon , et al., "Therapeutic Potential of T Cell Chimeric Antigen Receptors (CARs) in Cancer Treatment: Counteracting Off-Tumor Toxicities for Safe Car T Cell Therapy", Annual Review of Pharmacology and Toxicology; vol. 56:59-83 (Volume publication date Jan. 2016) https://doi.org/10.1146/annurev-pharmtox-010814-124844.
Kalos, Michael , et al., "T Cells with Chimeric Antigen Receptors Have Potent Antitumor Effects and Can Establish Memory in Patients with Advanced Leukemia", Science Transnational Medicine, vol. 3 Issue 95 95ra73, 2011.
Krause, Anja , et al., "Antigen-dependent CD28 Signaling Selectively Enhances Survival and Proliferation in Genetically Modified Activated Human Primary T Lymphocytes", The Journal of experimental medicine vol. 188,4 (1998): 619-26. doi:10.1084/jem.188. 4.619.
Milone, Michael C., et al., "Chimeric Receptors Containing CD137 Signal Transduction Domains Mediate Enhanced Survival of T Cells and Increased Antileukemic Efficacy In Vivo", Molecular Therapy vol. 17 No. 8, 1453-1464 Aug. 2009.
Montiel-Equiha, Claudia A., et al., "The β-globin locus control region in combination with the EF1α short promoter allows enhanced lentiviral vector-mediated erythroid gene expression with conserved multilineage activity.", Mol Ther. 2012;20(7):1400-1409. doi: 10.1038/mt.2012.50.
Porter, David L., et al., "Chimeric Antigen Receptor-Modified T Cells in Chronic Lymphoid Leukemia", N Engl J Med 2011;365:725-33.
Roddie, Claire , et al., "Manufacturing chimeric antigen receptor T cells: issues and challenges", Cytotherapy; 2019 21(3):327-340; DOI: 10.1016/j.jcyt.2018.11.009.
Rosenberg, Steven A., et al., "Adoptive cell transfer: a clinical path to effective cancer immunotherapy", Nat Rev Cancer. Apr. 2008 ; 8(4): 299-308. doi:10.1038/nrc2355.
Sadelain, Michel , et al., "The promise and potential pitfalls of chimeric antigen receptors", Current Opinion in Immunology 2009, 21:215-223.
Sanber, Khaled S., et al., "Construction of stable packaging cell lines for clinical lentiviral vector production", Sci Rep 5, 9021 (2015). https://doi.org/10.1038/srep09.
Song, De-Gang , et al., "CD27 costimulation augments the survival and antitumor activity of redirected human T cells in vivo", Blood (2012) 119 (3): 696-706.
Wakabayashi-Ito, Noriko , et al., "Characterization of the regulatory elements in the promoter of the human elongation factor-1 alpha gene", J Biol Chem . Nov. 25, 1994;269(47):29831-7.
Ying, Zhitao , et al., "A safe and potent anti-CD19 CAR T cell therapy", Nat Med 25, 947-953 (2019). https://doi.org/10.1038/s41591-019-0421-7.
Ying, Zhitao , et al., "A safe and potent anti-CD19 CAR T cell therapy (Supplementary Information)", A safe and potent anti-CD19 CAR T cell therapy, Nat. Med. 25, 947-953 (2019).
EPO, International Search Report & Written Opinion mailed on Jun. 30, 2020 for International Application No. PCT/US2020/029775.
Bai et al., Enhancement of the in vivo persistence and antitumor efficacy of CD19 chimeric antigen receptor T cells through the delivery of modified TERT mRNA; Cell Discov. 1, 15040; doi:10. 1038/celldisc.2015.40, 15 pages and Suppl Info and Figs., Dec. 2015.
G&P Biosciences. Product ID: CD19-CART-2G40, Retrieved online: <URL: https://www.gnpbio.com/index.php/products/1567/15/ lentiviral-expression-system/anti-cd19-chimeric-antigen-receptor-t-cell-car-t-lentivinus-2nd-generation-scfv-cd19-ox40-cd3zeta-pre-packaged-lentiviral-particles-detail> on Nov. 18, 2022, 2018.
Cao Y. et al., Design of Switchable Chimeric Antigen Receptor T Cells Targeting Breast Cancer. May 4, 2016, Angew Chem Int Ed Engl, vol. 55, No. 26, pp. 7520-7524.

(56) References Cited

OTHER PUBLICATIONS

Dong Jie et al., Optimizing CAR structure to improve safety and efficiency of CAR-T cell therapy. Dec. 25, 2018Chinese Journal of Cancer Biotherapy, vol. 25, No. 12, pp. 1209-1217 (English abstract).

\* cited by examiner

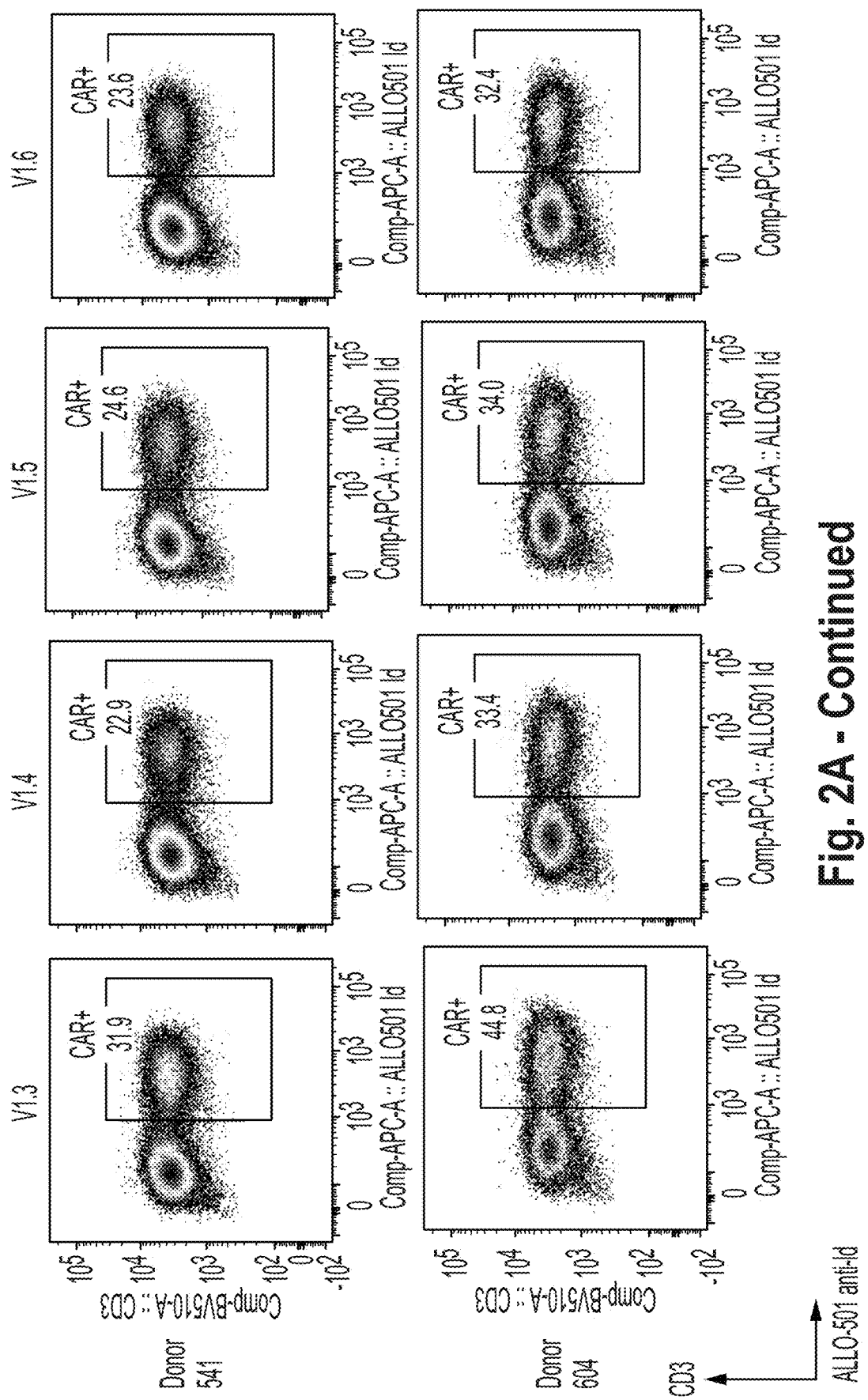
Fig. 2A - Continued

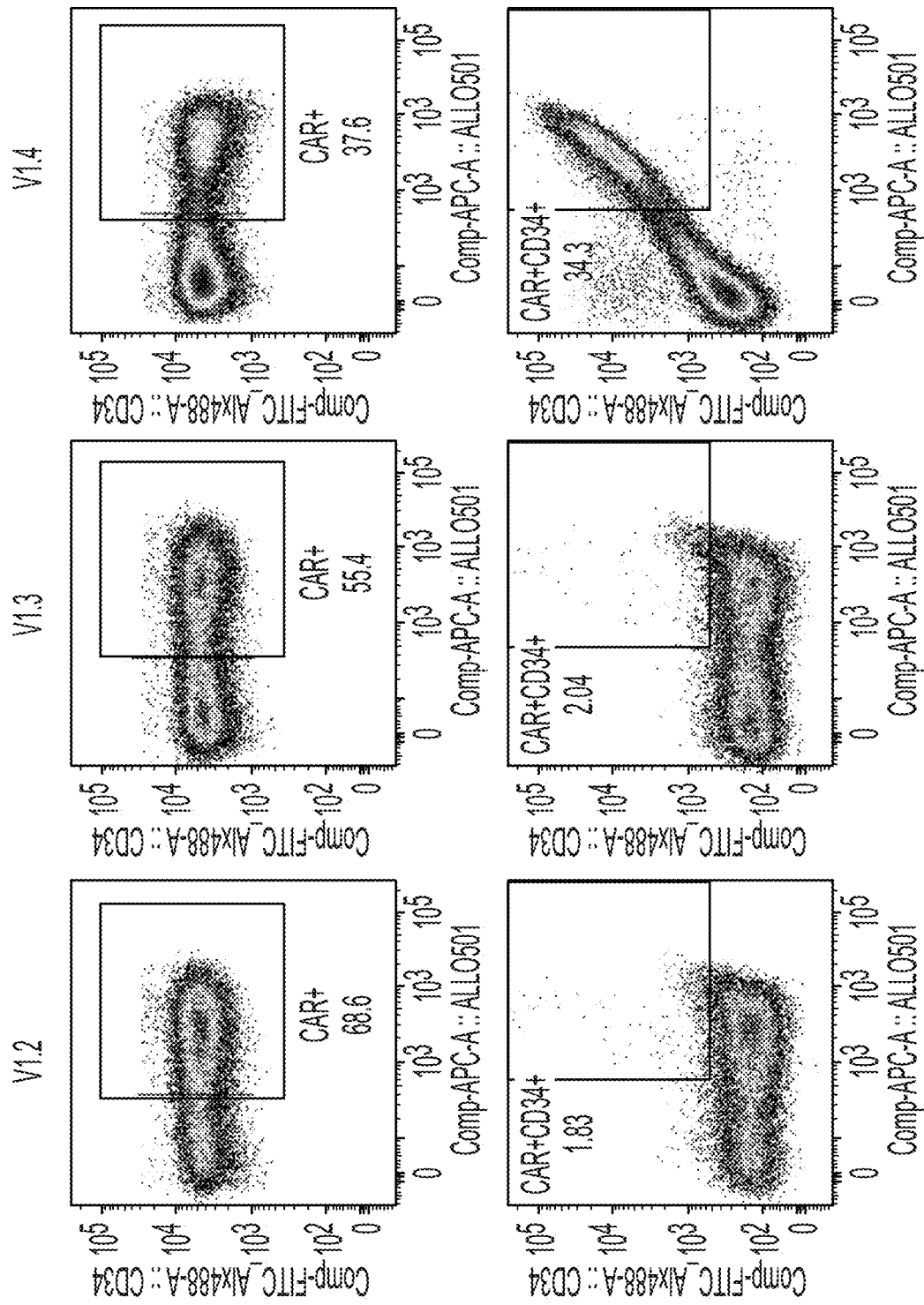
Fig. 2B - Continued

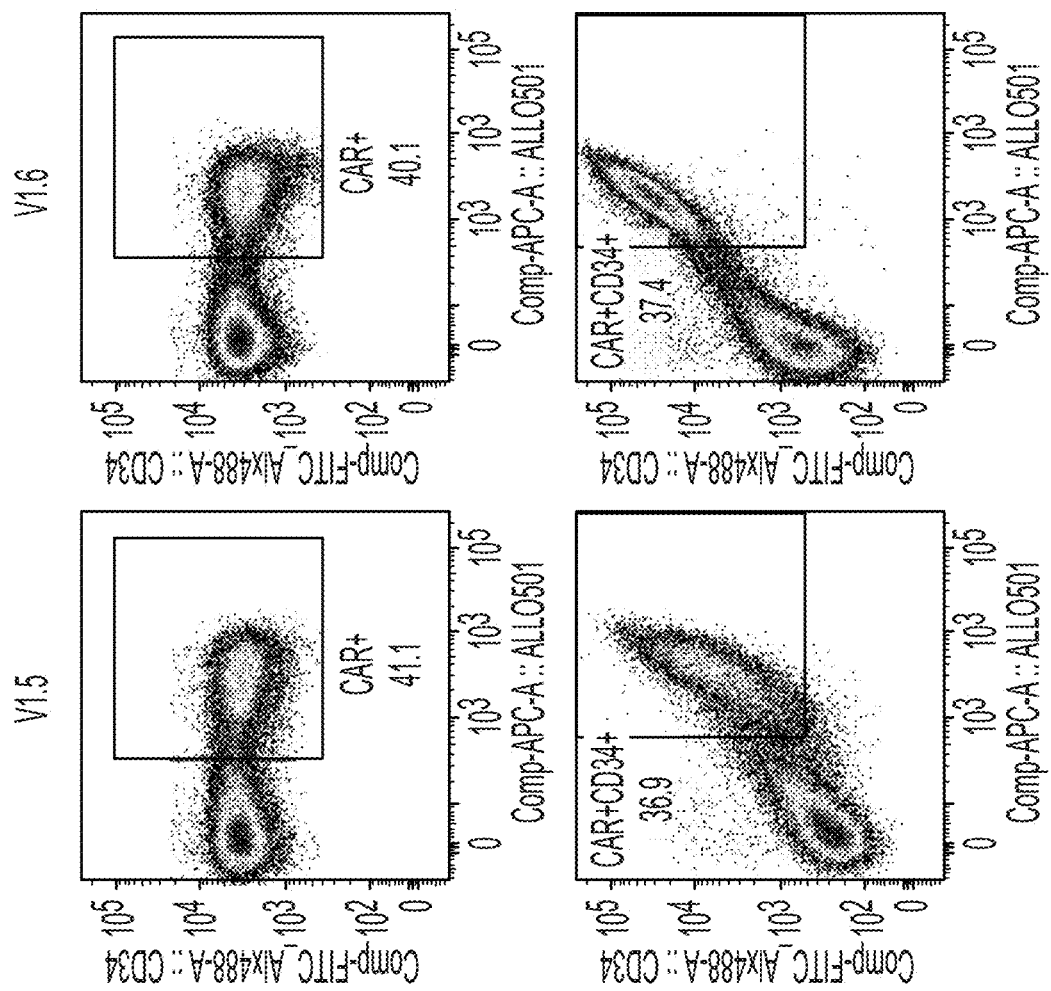
Fig. 2B - Continued

METHOD OF TREATMENT USING ANTI-CD19 RITUXIMAB-RESISTANT CHIMERIC ANTIGEN RECEPTORS

CROSS REFERENCE TO RELATED APPLICATIONS

The present application is a divisional of application Ser. No. 16/857,573 filed on Apr. 24, 2020 (now issued U.S. Pat. No. 11,896,617), which claims the benefit of priority to U.S. Provisional Application No. 62/839,455, filed on Apr. 26, 2019; and U.S. Provisional Application No. 63/005,041, filed on Apr. 3, 2020, the contents of which are hereby incorporated by reference in their entireties.

TECHNICAL FIELD

This disclosure relates to chimeric antigen receptors (CARs) comprising an antigen binding molecule which binds to CD19, polynucleotides encoding the same, and methods of treating a cancer in a patient using the same.

SEQUENCE LISTING

This application contains a Sequence Listing which has been submitted electronically in XML format and is hereby incorporated by reference in its entirety. Said XML copy, created on Mar. 28, 2024, is named AT-028_04US_SL.xml and is 83,706 bytes in size.

BACKGROUND

Adoptive transfer of immune cells genetically modified to recognize malignancy-associated antigens is showing promise as a new approach to treating cancer (see, e.g., Brenner et al., Current Opinion in Immunology, 22(2): 251-257 (2010); Rosenberg et al., Nature Reviews Cancer, 8(4): 299-308 (2008)). Immune cells can be genetically modified to express chimeric antigen receptors (CARs), fusion proteins comprised of a CD19 antigen recognition moiety and T cell activation domains (see, e.g., Eshhar et al., Proc. Natl. Acad. Sci. USA, 90(2): 720-724 (1993), and Sadelain et al., Curr. Opin. Immunol, 21(2): 215-223 (2009)). Immune cells that contain CARs, e.g., CAR-T cells (CAR-Ts), are engineered to endow them with antigen specificity while retaining or enhancing their ability to recognize and kill a target cell.

There is a need for treatments for cancer and in particular malignancies involving aberrant expression of CD19. Provided herein are methods and compositions addressing this need.

SUMMARY

Provided herein are chimeric antigen receptors (CARs) comprising a CD19 antigen binding domain that specifically binds to CD19; polynucleotides encoding these CARs; and immune cells expressing these CD19-specific CARs, e.g., CAR-T cells. Also provided are methods of making and using these CD19-specific CARs, and immune cells comprising these CD19-specific CARs.

In one aspect, the disclosure provides an isolated polynucleotide encoding a polypeptide comprising an anti-CD19 chimeric antigen receptor (CAR) that is at least 70% identical to SEQ ID NO: 9, wherein the polypeptide does not comprise a rituximab binding site, and wherein the polynucleotide comprises a short EF1a promoter that is capable of expressing the anti-CD19 chimeric antigen receptor (CAR) in a mammalian T cell.

In some embodiments, the short EF1a promoter does not comprise an intron sequence within the nucleic acid sequence of SEQ ID NO:15. In some embodiments, the intron comprises the nucleic acid sequence of SEQ ID NO:39.

In some embodiments, the promoter comprises the nucleic acid sequence of SEQ ID NO:16, In some embodiments, the promoter is a full length EF1a promoter comprising the nucleic acid sequence of SEQ ID NO:15.

In some embodiments, the promoter comprises the nucleic acid sequence of SEQ ID NO:15, and the polynucleotide encodes a polypeptide that is at least about 80%, 85%, 90%, 95%, 96%, 98%, 99% or 100% identical to any one of SEQ ID NO: 8-14.

In some embodiments, the polypeptide further comprises a safety switch.

In some embodiments, the safety switch is linked to the CD19 CAR using a linker peptide.

In some embodiments, the safety switch is linked to the anti-CD19 CAR using a T2A linker.

In some embodiments, the safety switch comprises an antibody binding site.

In some embodiments, the safety switch comprises a mutated CD20 mimotope.

In some embodiments, the polypeptide further comprises a CD8 hinge/transmembrane domain.

In some embodiments, the polypeptide comprises a CD34 epitope.

In some embodiments, the CD34 epitope is a QBEND-10 epitope.

In some embodiments, the isolated polynucleotide comprises a nucleic acid sequence that is at least about 80%, 85%, 90%, 95%, 96%, 98%, 99% or 100% identical to any one of SEQ ID NO: 1-7.

In some embodiments, the isolated polynucleotide encodes a polypeptide that is at least about 80%, 85%, 90%, 95%, 96%, 98%, 99% or 100% identical to any one of SEQ ID NO: 8-14.

In another aspect, the disclosure provides a vector comprising the isolated polynucleotide described herein.

In some embodiments, the vector is a retroviral vector, a DNA vector, a plasmid, an RNA vector, an adenoviral vector, an adenovirus associated vector, a lentiviral vector, or any combination thereof.

In one aspect, the disclosure provides an engineered immune cell comprising the isolated polynucleotide described herein.

In some embodiments, the disclosure provides an engineered immune cell comprising a polynucleotide that comprises a nucleic acid sequence that is at least about 80%, 85%, 90%, 95%, 96%, 98%, 99% or 100% identical to SEQ ID NO: 3.

In some embodiments, the disclosure provides an engineered immune cell comprising a polynucleotide that is at least about 80%, 85%, 90%, 95%, 96%, 98%, 99% or 100% identical to the anti-CD19 CAR v1.2, v1.3, v1.4, v1.5 or v1.6 lentiviral construct as shown in Table 1.

In some embodiments, the disclosure provides an engineered immune cell comprising a polynucleotide that is at least about 80%, 85%, 90%, 95%, 96%, 98%, 99% or 100% identical to the anti-CD19 CAR v1.2 lentiviral construct as shown in Table 1.

In some embodiments, the disclosure provides an engineered immune cell comprising a polynucleotide that encodes a polypeptide that is at least about 80%, 85%, 90%, 95%, 96%, 98%, 99% or 100% identical to SEQ ID NO:9 or SEQ ID NO:10, with or without the signal sequence.

In some embodiments, the disclosure provides an engineered immune cell comprising a polynucleotide that comprises the nucleic acid sequence of SEQ ID NO:3, driven by an EF1a short promoter comprising the nucleic acid of SEQ ID NO:16.

In some embodiments, the disclosure provides an engineered immune cell comprising a polynucleotide that encodes a polypeptide sequence of SEQ ID NO:9 or 10, with or without the signal sequence, driven by an EF1a short promoter comprising the nucleic acid of SEQ ID NO:16. In some embodiments, the promoter does not comprise the first intron of the EF1a gene.

In some embodiments, the engineered immune cell does not comprise a rituximab mimotope.

In some embodiments, the engineered immune cell comprises a polynucleotide comprising the CD19 CAR v1.2 lentiviral construct as shown in FIG. 1 (may also be referred to as ALLO-501A).

In some embodiments, the engineered immune cell comprises a vector described herein.

In some embodiments, the immune cell is a T cell, tumor infiltrating lymphocyte (TIL), NK cell, TCR-expressing cell, dendritic cell, or NK-T cell.

In some embodiments, the cell is an autologous T cell.

In some embodiments, the cell is an allogeneic T cell.

In one aspect, the disclosure provides an engineered immune cell described herein, wherein the cell is resistant to rituximab.

In another aspect, the disclosure provides a pharmaceutical composition comprising the engineered immune cell described herein.

In one aspect, the disclosure provides a method of treating a disease or disorder in a subject in need thereof comprising administering to the subject the engineered immune cell described herein, or the pharmaceutical composition described herein.

In some embodiments, the disease or disorder is Non-Hodgkin lymphoma (NHL).

In some embodiments, the subject has been treated or is currently being treated with rituximab.

In one aspect, the disclosure provides an article of manufacture comprising the engineered immune cell or the pharmaceutical composition comprising the engineered immune cell expressing a chimeric antigen receptors described herein.

BRIEF DESCRIPTION OF THE DRAWINGS

FIG. 2A shows CAR expression on cells from donor 541 and 604. FIG. 2B shows CAR and CD34 expression on cells from donor 410. A similar profile was observed with donor 2593 (data not shown).

DETAILED DESCRIPTION

Figure 1:
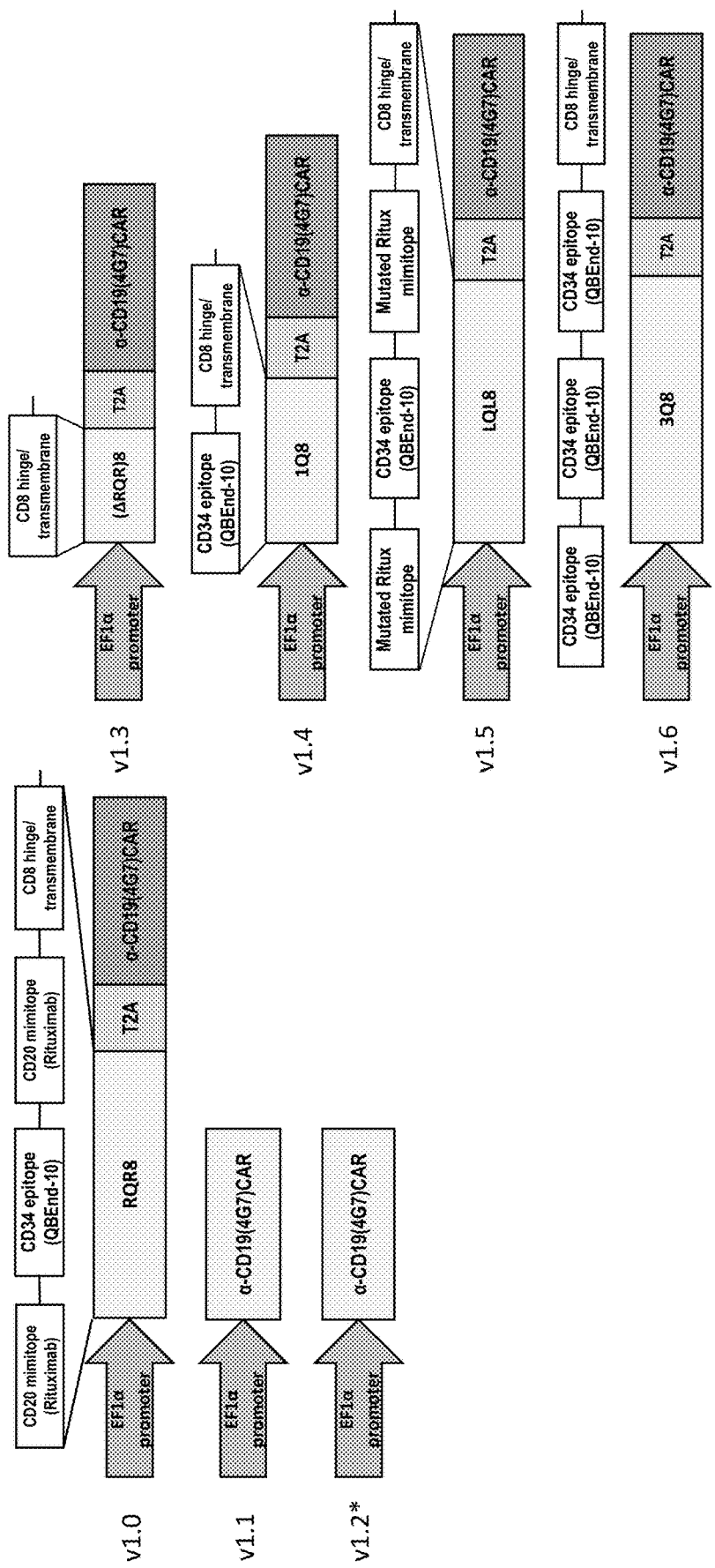
FIG. 1 shows schematic representations of rituximab-resistant CD19 chimeric antigen receptors.

Chimeric Antigen Receptor (CAR) therapy is a promising approach to cancer treatment. The CAR construct described herein as v1.0 is an exemplary anti-CD19 CAR that expresses a synthetic peptide, RQR8, which serves as a safety switch. RQR8 contains two rituximab-binding mimotopes. In the instance of an adverse event, patients may be treated with rituximab to deplete the levels of anti-CD19 v1.0 in circulation. Rituximab is also used as the standard of care in some Non-Hodgkin Lymphoma (NHL) indications and is administered at high doses. Due to the long half-life of rituximab, anti-CD19 v1.0 cannot be administered to patients until the level of circulating rituximab has reached a low concentration. Rituximab-resistant CD19 CAR therapy would allow patients who were previously treated with rituximab to receive CAR-T therapy immediately, without having to wait for rituximab levels to diminish and without patients being subjected to apheresis. Provided herein are anti-CD19 chimeric antigen receptors (CARs) that are resistant to the CD20 binding antibody rituximab. The novel CAR constructs are designed to eliminate rituximab binding while retaining CAR expression and activity.

I. Chimeric Antigen Receptors

As used herein, chimeric antigen receptors (CARs) are proteins that specifically recognize target antigens (e.g., target antigens on cancer cells). When bound to the target antigen, the CAR may activate the immune cell to attack and destroy the cell bearing that antigen (e.g., the cancer cell). CARs may also incorporate costimulatory or signaling domains to increase their potency. See Krause et al., J. Exp.

Med., Volume 188, No. 4, 1998 (619-626); Finney et al., *Journal of Immunology*, 1998, 161: 2791-2797, Song et al., Blood 119:696-706 (2012); Kalos et al., *Sci. Transl. Med.* 3:95 (2011); Porter et al., *N. Engl. J. Med.* 365:725-33 (2011), and Gross et al., *Annu. Rev. Pharmacol. Toxicol.* 56:59-83 (2016); U.S. Pat. Nos. 7,741,465, and 6,319,494.

Chimeric antigen receptors described herein comprise an extracellular domain, a transmembrane domain, and an intracellular domain, wherein the extracellular domain comprises a CD19 antigen binding domain that specifically binds to CD19. In some embodiments, the CD19 specific CAR comprises the following elements from 5' to 3': a signal sequence, a CD19 antigen binding domain (e.g., a scFv derived from 4G7), a hinge and transmembrane region, and one or more successive signaling domains. In some embodiments, the antibody binding domain binds CD19 to treat a hematologic cancer associated with expression of CD19.

The scFv portion of the chimeric antigen receptor (CAR) used in the allogeneic anti-CD19 CAR v1.0 is derived from the mouse anti-human CD19 antibody clone 4G7. 4G7 is a CD19 monoclonal antibody that recognizes CD19. Single chain variable fragments (scFv) formed from 4G7 comprise the targeting component of some chimeric antigen receptors (CARs) (See WO2014184143A1). In some embodiments, the scFv derived from the CD19 monoclonal antibody 4G7, comprises a part of the CD19 monoclonal antibody 4G7 immunoglobulin gamma 1 heavy chain (GenBank: CAD88275.1; SEQ ID NO: 17) and a part of CD19 monoclonal antibody 4G7 immunoglobulin kappa light chain (GenBank: CAD88204.1; SEQ ID NO: 35), linked together by a flexible linker. (Peipp M., D. Saul, et al., 2004. Efficient eukaryotic expression of fluorescent scFv fusion proteins directed against CD antigens for FACS applications. *J. Immunol. Methods* 285: 265-280). In some embodiments, the scFv comprises the variable fragments of the CD19 monoclonal antibody 4G7 immunoglobulin gamma 1 heavy chain and the variable fragments of the CD19 monoclonal antibody 4G7 immunoglobulin kappa light chain linked together by a flexible linker.

CD19 monoclonal antibody 4G7 immunoglobulin gamma 1 heavy chain (the signal sequence is underlined)

(SEQ ID NO: 17)
MEWSWIFLFLLSGTAGVHSEVQLQQSGPELIKPGASVKMSCKASGYTFTS

YVMHWVKQKPGQGLEWIGYINPYNDGTKYNEKFKGKATLTSDKSSSTAYM

ELSSLTSEDSAVYYCARGTYYYGSRVFDYWGQGTTLTVSSAKTTPPSVYP

LAPGSAAQTNSMVTLGCLVKGYFPEPVTVTWNSGSLSSGVHTFPAVLQSD

LYTLSSSVTVPSSTWPSETVTCNVAHPASSTKVDKKIVPRDCGCKPCICT

VPEVSSVFIFPPKPKDVLTITLTPKVTCVVVDISKDDPEVQFSWFVDDVE

VHTAQTQPREEQFNSTFRSVSELPIMHQDWLNGKEFKCRVNSAAFPAPIE

KTISKTKGRPKAPQVYTIPPPKEQMAKDKVSLTCMITDFFPEDITVEWQW

NGQPAENYKNTQPIMDTDGSYFVYSKLNVQKSNWEAGNTFTCSVLHEGLH

NHHTEKSLSHSPGK

CD19 monoclonal antibody 4G7 immunoglobulin kappa light chain (the signal sequence is underlined)

(SEQ ID NO: 18)
MRCLAEFLGLLVLWIPGAIGDIVMTQAAPSIPVTPGESVSISCRSSKSLL

NSNGNTYLYWFLQRPGQSPQLLIYRMSNLASGVPDRFSGSGSGTAFTLRI

SRVEAEDVGVYYCMQHLEYPFTFGAGTKLELKRADAAPTVSIFPPSSEQL

TSGGASVVCFLNNFYPKDINVKWKIDGSERQNGVLNSWTDQDSKDSTYSM

SSTLTLTKDEYERHNSYTCEATHKTSTSPIVKSFNRNEC

In some embodiments, the scFv comprises a part of amino acid sequences of SEQ ID NO: 17 and/or SEQ ID NO: 18. In some embodiments, the scFv comprises at least 70%, at least 80%, at least 90%, at least 95%, at least 97% or at least 99% sequence identity with the variable region of amino acid sequence of 34 and/or SEQ ID NO: 35. Disclosed herein are antigen binding molecules, including antibodies, that specifically bind to the anti-CD19 scFv derived from 4G7, as well as molecules comprising these sequences and cells presenting such molecules. Humanized forms of the antigen binding molecules also form as aspect of the disclosure. Applications and uses of these antigen binding molecules are also disclosed.

a. Antigen Binding Domain

As discussed above, the CD19 CARs described herein comprise an antigen binding domain. An "antigen binding domain" as used herein means any polypeptide that binds a specified target antigen, for example the specified target antigen can be the CD19 protein or fragment thereof. In some embodiments, the antigen binding domain binds to a CD19 antigen on a tumor cell. In some embodiments, the antigen binding domain binds to a CD19 antigen on a cell involved in a hyperproliferative disease.

In some embodiments, the antigen binding domain comprises a variable heavy chain, variable light chain, and/or one or more CDRs. In some embodiments, the antigen binding domain is a single chain variable fragment (scFv), comprising light chain CDRs CDR1, CDR2 and CDR3, and heavy chain CDRs CDR1, CDR2 and CDR3. Variants of the antigen binding domains (e.g., variants of the CDRs, VH and/or VL) are also within the scope of the disclosure, e.g., variable light and/or variable heavy chains that each have at least 70-80%, 80-85%, 85-90%, 90-95%, 95-97%, 97-99%, or above 99% identity to the amino acid sequences of the antigen binding domain sequences described herein. In some instances, such molecules include at least one heavy chain and one light chain, whereas in other instances the variant forms contain two variable light chains and two variable heavy chains (or subparts thereof). A skilled artisan will be able to determine suitable variants of the antigen binding domains as set forth herein using well-known techniques. In certain embodiments, one skilled in the art can identify suitable areas of the molecule that may be changed without destroying activity by targeting regions not believed to be important for activity.

In certain embodiments, the polypeptide structure of the antigen binding domains is based on antibodies, including, but not limited to, monoclonal antibodies, bispecific antibodies, minibodies, domain antibodies, synthetic antibodies (sometimes referred to herein as "antibody mimetics"), chimeric antibodies, humanized antibodies, human antibodies, antibody fusions (sometimes referred to herein as "antibody conjugates"), and fragments thereof, respectively. In some embodiments, the antigen binding domain comprises or consists of avimers.

A CD19 antigen binding domain is said to be "selective" when it binds to one target more tightly than it binds to a second target. In some embodiments, the CD19 antigen binding domain is a scFv.

In some embodiments, the disclosure relates to isolated polynucleotides encoding any one of the CD19 chimeric antigen receptors (CARs) described herein. In some embodiments, the disclosure relates to isolated polynucleotides encoding a CD19 CAR described in Table 1. Also provided herein are vectors comprising the polynucleotides, and methods of making the same.

TABLE 1

Polynucleotide Sequences of exemplary CD19 targeting CARs

| SEQ ID NO | Description | Sequence |
| --- | --- | --- |
| 1 | anti-CD19 CAR_v1.0 | ATGCTGACCAGCCTGCTGTGCTGGATGGCCCTGTGCCTGCTG GGCGCCGACCACGCCGATGCCTGCCCCTACAGCAACCCCAG CCTGTGCAGCGGAGGCGGCGGCAGCGAGCTGCCCACCCAGG GCACCTTCTCCAACGTGTCCACCAACGTGAGCCCAGCCAAG CCCACCACCACCGCCTGTCCTTATTCCAATCCTTCCCTGTGT AGCGGAGGGGAGGCAGCCCAGCCCCCAGACCTCCCACCCC AGCCCCCACCATCGCCAGCCAGCCTCTGAGCCTGAGACCCG AGGCCTGCCGCCCAGCCGCCGGCGGCGCCGTGCACACCAGA GGCCTGGATTTCGCCTGCGATATCTACATCTGGGCCCCACTG GCCGGCACCTGTGGCGTGCTGCTGCTGAGCCTGGTGATCACC CTGTACTGCAACCACCGCAACCGCAGGCGCGTGTGCAAGTG CCCCAGGCCCGTGGTGAGAGCCGAGGGCAGAGGCAGCCTGC TGACCTGCGGCGACGTGGAGGAGAACCCAGGCCCCATGGAG ACCGACACCCTGCTGCTGTGGGTGCTGCTGCTGTGGGTGCCA GGCAGCACCGGCGAGGTGCAGCTGCAGCAGAGCGGACCCG AGCTGATCAAGCCAGGCGCCAGCGTGAAGATGAGCTGCAAG GCCAGCGGCTACACCTTCACCAGCTACGTGATGCACTGGGT GAAGCAGAAGCCAGGCCAGGGCCTGGAGTGGATCGGCTAC ATCAACCCCTACAACGACGGCACCAAGTACAACGAGAAGTT CAAGGGCAAGGCCACCCTGACCAGCGACAAGAGCAGCAGC ACCGCCTACATGGAGCTGAGCAGCCTGACCAGCGAGGACAG CGCCGTGTACTACTGCGCCAGAGGCACCTACTACTACGGCA GCCGGGTGTTCGACTACTGGGGCCAGGGCACCACCCTGACC GTGAGCTCTGGCGGAGGCGGCTCTGGCGGAGGCGGCTCTGG CGGAGGCGGCAGCGACATCGTGATGACCCAGGCTGCCCCCA GCATCCCCGTGACCCCAGGCGAGAGCGTGAGCATCAGCTGC CGGAGCAGCAAGAGCCTGCTGAACAGCAACGGCAACACCTA CCTGTACTGGTTCCTGCAGCGGCCAGGCCAGAGCCCCCAGC TGCTGATCTACCGGATGAGCAACCTGGCCAGCGGCGTGCCC GACCGGTTCAGCGGCAGCGGCAGCGGCACCGCCTTCACCCT GCGGATCAGCCGGGTGGAGGCCGAGGACGTGGGCGTGTACT ACTGCATGCAGCACCTGGAGTACCCCTTCACCTTCGGAGCCG GCACCAAGCTGGAGCTGAAGCGGTCGGATCCCACCACCACC CCAGCCCCACGGCCACCTACCCCTGCCCCAACCATCGCCAG CCAGCCCCTGAGCCTGCGGCCTGAAGCCTGCAGGCCTGCCG CCGGAGGAGCCGTGCACACAAGGGGCCTGGACTTCGCCTGC GACATCTATATCTGGGCCCCCCTGGCCGGGACATGCGGGGT GCTGCTGCTGTCCCTGGTGATTACACTGTATTGCAAACGGGG CCGGAAGAAGCTGCTGTACATCTTCAAGCAGCCCCTTCATGC GGCCCGTGCAGACCACCCAGGAGGAGGACGGCTGCAGCTGC CGGTTCCCCGAGGAAGAGGAAGGCGGCTGCGAGCTGCGGGT GAAGTTCAGCCGGAGCGCCGACGCCCCAGCCTACCAGCAGG GCCAGAACCAGCTGTACAACGAGCTGAACCTGGGACGGCGG GAGGAGTACGACGTGCTGGACAAGCGGCGGGGACGGGACC CCGAGATGGGCGGCAAGCCTCGCCGGAAGAATCCCCAGGAG GGCCTGTACAACGAGCTGCAGAAGGACAAGATGGCCGAGG CCTACAGCGAGATCGGCATGAAGGGCGAGCGGCGCCGGGG CAAGGGCCACGACGGCCTGTACCAGGGCCTGAGCACCGCCA CCAAGGACACCTACGACGCCCTGCACATGCAGGCCCTGCCA CCCCGGTGA |
| 2 | anti-CD19 CAR_v1.1 | ATGGAGACCGACACCCTGCTGCTGTGGGTGCTGCTGCTGTG GGTGCCAGGCAGCACCGGCGAGGTGCAGCTGCAGCAGAGC GGACCCGAGCTGATCAAGCCAGGCGCCAGCGTGAAGATGAG CTGCAAGGCCAGCGGCTACACCTTCACCAGCTACGTGATGC ACTGGGTGAAGCAGAAGCCAGGCCAGGGCCTGGAGTGGATC GGCTACATCAACCCCTACAACGACGGCACCAAGTACAACGA GAAGTTCAAGGGCAAGGCCACCCTGACCAGCGACAAGAGC AGCAGCACCGCCTACATGGAGCTGAGCAGCCTGACCAGCGA GGACAGCGCCGTGTACTACTGCGCCAGAGGCACCTACTACT ACGGCAGCCGGGTGTTCGACTACTGGGGCCAGGGCACCACC CTGACCGTGAGCTCTGGCGGAGGCGGCTCTGGCGGAGGCGG CTCTGGCGGAGGCGGCAGCGACATCGTGATGACCCAGGCTG CCCCCAGCATCCCCGTGACCCCAGGCGAGAGCGTGAGCATC AGCTGCCGGAGCAGCAAGAGCCTGCTGAACAGCAACGGCA |

TABLE 1-continued

Polynucleotide Sequences of exemplary CD19 targeting CARs

| SEQ ID NO | Description | Sequence |
|---|---|---|
| | | ACACCTACCTGTACTGGTTCCTGCAGCGGCCAGGCCAGAGC<br>CCCCAGCTGCTGATCTACCGGATGAGCAACCTGGCCAGCGG<br>CGTGCCCGACCGGTTCAGCGGCAGCGGCAGCGGCACCGCCT<br>TCACCCTGCGGATCAGCCGGGTGGAGGCCGAGGACGTGGGC<br>GTGTACTACTGCATGCAGCACCTGGAGTACCCCTTCACCTTC<br>GGAGCCGGCACCAAGCTGGAGCTGAAGCGGTCGGATCCCAC<br>CACCACCCCAGCCCCACGGCCACCTACCCCTGCCCCAACCAT<br>CGCCAGCCAGCCCCTGAGCCTGCGGCCTGAAGCCTGCAGGC<br>CTGCCGCCGGAGGAGCCGTGCACACAAGGGGCCTGGACTTC<br>GCCTGCGACATCTATATCTGGGCCCCCCTGGCCGGGACATGC<br>GGGGTGCTGCTGCTGTCCCTGGTGATTACACTGTATTGCAAA<br>CGGGGCCGGAAGAAGCTGCTGTACATCTTCAAGCAGCCCTT<br>CATGCGGCCCGTGCAGACCACCCAGGAGGAGGACGGCTGCA<br>GCTGCCGGTTCCCCGAGGAAGAGGAAGGCGGCTGCGAGCTG<br>CGGGTGAAGTTCAGCCGGAGCGCCGACGCCCCAGCCTACCA<br>GCAGGGCCAGAACCAGCTGTACAACGAGCTGAACCTGGGAC<br>GGCGGGAGGAGTACGACGTGCTGGACAAGCGGCGGGGACG<br>GGACCCCGAGATGGGCGGCAAGCCTCGCCGGAAGAATCCCC<br>AGGAGGGCCTGTACAACGAGCTGCAGAAGGACAAGATGGC<br>CGAGGCCTACAGCGAGATCGGCATGAAGGGCGAGCGGCGC<br>CGGGGCAAGGGCCACGACGGCCTGTACCAGGGCCTGAGCAC<br>CGCCACCAAGGACACCTACGACGCCCTGCACATGCAGGCCC<br>TGCCACCCCGGTGA |
| 3 | anti-CD19 CAR_v1.2 | ATGGAGACAGATACCCTGCTGCTGTGGGTGCTGCTGCTGTG<br>GGTGCCTGGCTCCACAGGAGAGGTGCAGCTGCAGCAGTCTG<br>GACCAGAGCTGATCAAGCCTGGAGCATCCGTGAAGATGTCT<br>TGCAAGGCCAGCGGCTATACATTCACCAGCTACGTGATGCA<br>CTGGGTGAAGCAGAAGCCTGGCCAGGGCCTGGAGTGGATCG<br>GCTATATCAATCCATACAACGACGGCACCAAGTATAATGAG<br>AAGTTTAAGGGCAAGGCCACACTGACCTCTGATAAGAGCTC<br>CTCTACAGCCTACATGGAGCTGAGCTCCCTGACCTCTGAGGA<br>CAGCGCCGTGTACTATTGCGCCAGAGGCACATACTATTACG<br>GCAGCAGGGTGTTCGATTACTGGGGCCAGGGCACCACACTG<br>ACCGTGTCTAGCGGAGGAGGAGGCTCCGGAGGAGGAGGCTC<br>TGGCGGCGGCGGCAGCGACATCGTGATGACACAGGCAGCAC<br>CAAGCATCCCAGTGACCCCTGGCGAGAGCGTGTCCATCTCTT<br>GTCGGTCCTCTAAGTCCCTGCTGAACTCTAATGGCAACACCT<br>ATCTGTACTGGTTTCTGCAGCGGCCCGGACAGTCCCCACAGC<br>TGCTGATCTATAGGATGAGCAACCTGGCATCCGGAGTGCCT<br>GATCGCTTCAGCGGCTCCGGCTCTGGAACAGCCTTTACCCTG<br>AGGATCTCTCGGGTGGAGGCAGAGGACGTGGGCGTGTATTA<br>CTGCATGCAGCACCTGGAGTACCCCTTCACATTTGGCGCAGG<br>AACCAAGCTGGAGCTGAAGCGGAGCGACCCCACCACAACCC<br>CTGCCACCACGGCCCCCTACACCAGCACCTACCATCGCATCTC<br>AGCCACTGAGCCTGCGGCCCGAGGCCTGTAGGCCTGCAGCA<br>GGAGGAGCAGTGCACACCAGGGGCCTGGACTTCGCCTGCGA<br>TATCTATATCTGGGCACCACTGGCAGGAACATGTGGCGTGCT<br>GCTGCTGAGCCTGGTCATCACCCTGTATTGCAAGAGAGGCA<br>GGAAGAAGCTGCTGTACATCTTCAAGCAGCCTTTTATGCGGC<br>CAGTGCAGACAACCCAGGAGGAGGATGGCTGCTCCTGTAGA<br>TTCCCAGAGGAGGAGGAGGGAGGATGTGAGCTGCGCGTGA<br>AGTTTAGCCGGTCCGCCGACGCACCAGCATATCAGCAGGGC<br>CAGAATCAGCTGTACAATGAGCTGAACCTGGGCCGGAGAGA<br>GGAGTACGACGTGCTGGATAAGAGGAGGGGAAGGGACCCC<br>GAGATGGGAGGCAAGCCACGAGAAAGAATCCCCAGGAGG<br>GCCTGTATAACGAGCTGCAGAAGGATAAGATGGCCGAGGCC<br>TACAGCGAGATCGGCATGAAGGGAGAGAGGCGCCGGGGCA<br>AGGGACACGACGGCCTGTATCAGGGCCTGTCCACAGCCACC<br>AAGGACACCTACGATGCCCTGCACATGCAGGCCCTGCCACC<br>AAGGTGA |
| 4 | anti-CD19 CAR_v1.3 | ATGGGAACAAGCCTGCTGTGCTGGATGGCTCTGTGCCTGCTG<br>GGGGCCGACCACGCTGACGCCTCCGGGGGGGGGGCTCTCC<br>TGCCCCTAGGCCCCCTACACCTGCACCAACCATCGCATCCCA<br>GCCACTGTCTCTGCGCCCTGAGGCCTGCCGGCCAGCAGCAG<br>GAGGAGCAGTGCACACCCGCGGCCTGGACTTCGCCTGCGAT<br>ATCTATATCTGGGCACCACTGGCAGGCACATGTGGCGTGCT<br>GCTGCTGAGCCTGGTCATCACCCTGTACTGCAATCACAGGA<br>ACCGGAGAAGGGTGTGCAAGTGTCCCCGGCCTGTGGTGAGA<br>GCAGAGGGAAGGGGCAGCCTGCTGACATGTGGCGACGTGG<br>AGGAGAATCCAGGCCCTATGGAGACAGATACCCTGCTGCTG<br>TGGGTGCTGCTGCTGTGGGTGCCCGGCAGCACCGGAGAGGT<br>GCAGCTGCAGCAGTCCGGACCAGAGCTGATCAAGCCTGGAG<br>CCAGCGTGAAGATGTCCTGTAAGGCCTCTGGCTATACATTCA |

TABLE 1-continued

Polynucleotide Sequences of exemplary CD19 targeting CARs

| SEQ ID NO | Description | Sequence |
|---|---|---|
| | | CCAGCTACGTGATGCACTGGGTGAAGCAGAAGCCTGGCCAG<br>GGCCTGGAGTGGATCGGCTATATCAATCCATACAACGACGG<br>CACAAAGTATAACGAGAAGTTTAAGGGCAAGGCCACACTGA<br>CCTCCGATAAGAGCTCCTCTACAGCCTACATGGAGCTGAGCT<br>CCCTGACCTCTGAGGACAGCGCCGTGTACTATTGCGCCAGA<br>GGCACATACTATTACGGCTCTAGGGTGTTCGATTACTGGGGC<br>CAGGGCACCACACTGACCGTGTCTAGCGGAGGAGGAGGCAG<br>CGGAGGAGGAGGCTCCGGCGGCGGCGGCTCTGACATCGTGA<br>TGACACAGGCAGCACCATCCATCCCAGTGACCCCTGGCGAG<br>AGCGTGTCCATCTCTTGTCGGTCCTCTAAGAGCCTGCTGAAC<br>TCCAATGGCAACACCTATCTGTACTGGTTTCTGCAGCGGCCC<br>GGACAGAGCCCACAGCTGCTGATCTATAGGATGTCTAATCT<br>GGCAAGCGGCGTGCCCGATCGCTTCAGCGGCTCCGGCTCTG<br>GCACAGCCTTTACCCTGAGGATCTCCCGCGTGGAGGCAGAG<br>GACGTGGGCGTGTATTACTGCATGCAGCACCTGGAGTACCC<br>CTTCACATTTGGCGCAGGCACCAAGCTGGAGCTGAAGCGGA<br>GCGACCCCACCACAACCCCTGCACCACGGCCACCCACACCA<br>GCACCTACTATTGCATCCCAGCCACTGAGCCTGCGGCCCGA<br>GGCCTGTAGGCCTGCCGCCGGCGGCCAGTGCACACCCGGG<br>GCCTGGACTTTGCCTGCGATATCTACATCTGGGCACCTCTGG<br>CCGGCACATGCGGCGTGCTGTTACTGAGCCTGGTCATCACCC<br>TGTATTGCAAGCGGGGCAGAAAGAAGCTGCTGTACATCTTC<br>AAGCAGCCTTTTATGCGGCCAGTGCAGACAACCCAGGAGGA<br>GGATGGCTGCTCCTGTAGATTCCCAGAGGAGGAGGAGGGAG<br>GATGTGAGCTGCGCGTGAAGTTTAGCCGGTCCGCCGACGCA<br>CCAGCATATCAGCAGGGCCAGAACCAGCTGTACAATGAGCT<br>GAACCTGGGCCGGAGAGAGGAGTATGACGTGCTGGATAAG<br>AGACGGGGCCGGGACCCCGAGATGGGAGGCAAGCCACGCC<br>GGAAGAATCCCCAGGAGGGCCTGTATAACGAGCTGCAGAAG<br>GATAAGATGGCCGAGGCCTACAGCGAGATCGGCATGAAGG<br>GAGAGAGAAGGCGCGGCAAGGGACACGACGGCCTGTACCA<br>GGGCCTGAGCACAGCAACAAAAGACACCTACGACGCACTGC<br>ACATGCAGGCTCTGCCCCCTCGGTAA |
| 5 | anti-CD19 CAR_v1.4 | ATGGGAACCTCTCTGCTGTGCTGGATGGCTCTGTGCCTGCTG<br>GGGGCCGATCACGCTGACGCAAGTGGCGGGGGGGGGTCCG<br>AACTGCCCACACAGGGCACCTTCTCCAACGTGAGCACCAAC<br>GTGAGCTCCGGCGGAGGAGGCAGCCCTGCACCAAGGCCCCC<br>TACACCAGCACCTACCATCGCATCTCAGCCACTGAGCCTGCG<br>CCCCGAGGCCTGCCGGCCTGCAGCAGGCGGCGCCGTGCACA<br>CCCGCGGCCTGGACTTTGCCTGCGATATCTATATCTGGGCAC<br>CTCTGGCAGGCACATGTGGCGTGCTGCTGCTGAGCCTGGTCA<br>TCACCCTGTACTGCAATCACAGGAACCGGAGAAGGGTGTGC<br>AAGTGTCCACGGCCCGTGGTGAGAGCAGAGGGAAGGGGCTC<br>CCTGCTGACATGTGGCGACGTGGAGGAGAATCCTGGCCCAA<br>TGGAGACAGATACCCTGCTGCTGTGGGTGCTGCTGCTGTGG<br>GTGCCCGGCTCCACCGGAGAGGTGCAGCTGCAGCAGTCTGG<br>ACCAGAGCTGATCAAGCCAGGAGCATCCGTGAAGATGTCTT<br>GTAAGGCCAGCGGCTATACATTCACCAGCTACGTGATGCAC<br>TGGGTGAAGCAGAAGCCAGGACAGGGCCTGGAGTGGATCG<br>GCTATATCAATCCTTACAACGACGGCACCAAGTATAACGAG<br>AAGTTTAAGGGCAAGGCCACACTGACCTCTGATAAGTCTAG<br>CTCCACAGCCTACATGGAGCTGTCTAGCCTGACCAGCGAGG<br>ACTCCGCCGTGTACTATTGCGCCAGAGGCACATACTATTACG<br>GCAGCAGGGTGTTCGATTACTGGGGCCAGGGCACCACACTG<br>ACCGTGTCCTCTGGAGGAGGAGGCTCCGGAGGAGGAGGCTC<br>TGGCGGCGGCGGCAGCGACATCGTGATGACACAGGCAGCAC<br>CTTCCATCCCAGTGACCCCAGGCGAGTCTGTGAGCATCTCCT<br>GTCGGAGCTCCAAGTCCCTGCTGAACTCTAATGGCAACACCT<br>ATCTGTACTGGTTTCTGCAGCGGCCCGGACAGTCCCCACAGC<br>TGCTGATCTATAGGATGAGCAATCTGGCCTCCGGCGTGCCA<br>GATCGCTTCTCTGGCAGCGGCTCCGGCACAGCCTTTACCCTG<br>AGGATCTCTCGCGTGGAGGCAGAGGACGTGGGCGTGTATTA<br>CTGCATGCAGCACCTGGAGTACCCATTCACATTTGGCGCAG<br>GCACCAAGCTGGAGCTGAAGCGGAGCGACCCCACCACAACC<br>CCAGCACCTCGGCCACCCACACCAGCACCCACCATCGCATC<br>TCAGCCTCTGAGCCTGCGGCCCGAGGCCTGTAGGCCCGCAG<br>CAGGAGGAGCAGTGCACACCCGGGGCCTGGACTTCGCCTGC<br>GATATCTACATCTGGGCACCACTGGCCGGACATGCGGCGT<br>GCTGTTACTGAGCCTGGTCATCACCCTGTATTGCAAGCGGG<br>CAGAAAGAAGCTGCTGTACATCTTCAAGCAGCCCTTTATGC<br>GGCCTGTGCAGACAACCCAGGAGGAGGATGGCTGCTCCTGT<br>AGATTCCCTGAGGAGGAGGAGGGAGGATGTGAGCTGCGCGT<br>GAAGTTTTCTCGGAGCGCCGACGCACCAGCATATCAGCAGG<br>GACAGAACCAGCTGTACAATGAGCTGAACCTGGGCCGGAGA |

TABLE 1-continued

Polynucleotide Sequences of exemplary CD19 targeting CARs

| SEQ ID NO | Description | Sequence |
|---|---|---|
| | | GAGGAGTATGACGTGCTGGATAAGAGACGGGGCCGGGACC<br>CCGAGATGGGAGGCAAGCCTCGCCGGAAGAATCCACAGGA<br>GGGCCTGTATAACGAGCTGCAGAAGGATAAGATGGCCGAGG<br>CCTACAGCGAGATCGGCATGAAGGGAGAGAGAAGGCGCGG<br>CAAGGGACACGACGGCCTGTACCAGGGCCTGAGCACAGCAA<br>CAAAAGACACCTACGACGCACTGCACATGCAGGCTCTGCCA<br>CCAAGATGA |
| 6 | anti-CD19 CAR_v1.5 | ATGGGGACCTCACTGCTGTGCTGGATGGCTCTGTGCCTGCTG<br>GGGGCCGACCACGCTGACGCCTGCTCTGGGGGGGGGGGGG<br>CTCATGCTCCGGAGGAGGAGGCTCTGAGCTGCCAACCCAGG<br>GCACATTCTCCAACGTGAGCACCAACGTGTCTCCTGCCAAGC<br>CAACCACAACCGCATGCAGCGGCGGAGGAGGAGGCAGCTG<br>TTCCGGCGGCGGCGGCAGCCCTGCCCCAAGGCCCCCTACCC<br>CAGCACCTACAATCGCATCTCAGCCTCTGAGCCTGCGCCCAG<br>AGGCCTGTCGGCCCGCAGCAGGAGGAGCAGTGCACACCCGC<br>GGCCTGGACTTTGCCTGCGATATCTATATCTGGGCACCACTG<br>GCAGGCACCTGTGGCGTGCTGCTGCTGAGCCTGGTCATCACC<br>CTGTACTGCAATCACAGGAACCGGAGAAGGGTGTGCAAGTG<br>TCCACGGCCCGTGGTGAGAGCAGAGGGAAGGGGCTCTCTGC<br>TGACCTGTGGCGACGTGGAGGAGAATCCTGGCCCTATGGAG<br>ACAGATACACTGCTGCTGTGGGTGCTGCTGCTGTGGGTGCCC<br>GGCAGCACAGGAGAGGTGCAGCTGCAGCAGTCCGGACCTGA<br>GCTGATCAAGCCAGGCGCCTCCGTGAAGATGTCTTGCAAGG<br>CCAGCGGCTATACCTTCACAAGCTACGTGATGCACTGGGTG<br>AAGCAGAAGCCAGGCCAGGGCCTGGAGTGGATCGGCTATAT<br>CAATCCCTACAACGACGGCACCAAGTATAACGAGAAGTTTA<br>AGGGCAAGGCCACCCTGACAAGCGATAAGAGCTCCTCTACC<br>GCCTACATGGAGCTGAGCTCCCTGACAAGCGAGGACTCCGC<br>CGTGTACTATTGCGCCAGAGGCACCTACTATTACGGCTCCAG<br>GGTGTTCGATTACTGGGGCCAGGGCACAACCCTGACAGTGT<br>CTAGCGGAGGAGGAGGCAGCGGAGGAGGAGGCTCCGGCGG<br>CGGCGGCTCTGACATCGTGATGACCCAGGCAGCACCATCCA<br>TCCCTGTGACACCAGGCGAGTCTGTGAGCATCTCCTGTCGGT<br>CCTCTAAGTCCCTGCTGAACTCTAATGGCAACACCTATCTGT<br>ACTGGTTTCTGCAGCGGCCCGGACAGTCTCCTCAGCTGCTGA<br>TCTATAGGATGAGCAATCTGGCCTCCGGCGTGCCTGATCGCT<br>TCTCTGGCAGCGGCTCCGGCACCGCCTTTACACTGAGGATCA<br>GCCGCGTGGAGGCAGAGGACGTGGGCGTGTATTACTGCATG<br>CAGCACCTGGAGTACCTTTCACCTTTGGCGCCGGCACAAA<br>GCTGGAGCTGAAGCGGAGCGACCCCACAACCACACCAGCAC<br>CTCGGCCACCCACCCCAGCACCAACAATCGCATCTCAGCCA<br>CTGAGCCTGCGGCCCGAGGCCTGTAGGCCAGCCGCCGGCGG<br>CGCAGTGCACACCCGGGGCCTGGACTTCGCCTGCGATATCT<br>ACATCTGGGCCCCTCTGGCCGGCACCTGCGCGTGCTGTTAC<br>TGAGCCTGGTCATCACCCTGTATTGCAAGCGGGGCAGAAAG<br>AAGCTGCTGTACATCTTCAAGCAGCCCTTCATGCGGCCCGTG<br>CAGACCACACAGGAGGAGGATGGCTGCTCCTGTAGATTCCC<br>AGAGGAGGAGGAGGAGGATGTGAGCTGCGCGTGAAGTTTT<br>CTCGGAGCGCCGACGCACCTGCATATCAGCAGGGACAGAAC<br>CAGCTGTACAATGAGCTGAACCTGGGCCGGAGAGAGGAGTA<br>TGACGTGCTGGATAAGAGACGGGGCCGGGACCCCGAGATGG<br>GAGGCAAGCCCCGCCGGAAGAATCCTCAGGAGGGCCTGTAT<br>AACGAGCTGCAGAAGGATAAGATGGCCGAGGCCTACAGCG<br>AGATCGGCATGAAGGGAGAGAGAAGGCGCGGCAAGGGCCA<br>CGACGGCCTGTACCAGGGCCTGTCCACAGCAACAAAGGATA<br>CTTATGACGCTCTGCACATGCAGGCTCTGCCCCCTCGGTGA |
| 7 | anti-CD19 CAR_v1.6 | ATGGGAACCAGCCTGCTGTGCTGGATGGCACTGTGCCTGCT<br>GGGAGCAGACCACGCCGATGCCGAACTGCCTACTCAGGGGA<br>CATTCTCTAATGTGAGCACCAACGTGAGCTCTGGAGGAGGA<br>GGCTCCGAGCTGCCAACCCAGGGCACATTCTCTAATGTGAG<br>CACAAACGTGTCTCCCGCCAAGCCTACCACAACCGCCGAAC<br>TGCCTACCCAGGGCACATTTTCCAACGTGTCTACCAACGTGT<br>CTAGCGGAGGAGGAGGCTCCCCCGCACCTAGGCCCCCTACC<br>CCAGCACCAACAATCGCAAGCCAGCCTCTGTCCCTGCGCCC<br>AGAGGCATGCAGGCCAGCAGCAGGAGGAGCAGTGCACACC<br>CGCGGCCTGGACTTTGCCTGCGATATCTATATCTGGGCACCA<br>CTGGCAGGAACCTGTGGCGTGCTGCTGCTGTCTCTGGTCATC<br>ACCCTGTACTGCAATCACAGAAACCGGAAGGGTGTGCAA<br>GTGTCCTCGGCCAGTGGTGAGAGCAGAGGGAAGGGGCAGCC<br>TGCTGACCTGTGGCGACGTGGAGGAGAATCCTGGCCCTATG<br>GAGACAGATACACTGCTGCTGTGGGTGCTGCTGCTGTGGGT<br>GCCAGGCTCTACAGGAGAGGTGCAGCTGCAGCAGAGCGGAC<br>CTGAGCTGATCAAGCCAGGCGCCTCTGTGAAGATGAGCTGC |

TABLE 1-continued

Polynucleotide Sequences of exemplary CD19 targeting CARs

| SEQ ID NO | Description | Sequence |
|---|---|---|
| | | AAGGCCTCCGGCTATACCTTCACAAGCTACGTGATGCACTG<br>GGTGAAGCAGAAGCCAGGCCAGGGCCTGGAGTGGATCGGCT<br>ATATCAATCCCTACAACGACGGCACCAAGTATAACGAGAAG<br>TTTAAGGGCAAGGCCACCCTGACATCCGATAAGAGCTCCTC<br>TACCGCCTACATGGAGCTGAGCTCCCTGACATCCGAGGACT<br>CTGCCGTGTACTATTGCGCCAGAGGCACCTACTATTACGGCT<br>CTAGGGTGTTCGATTACTGGGGCCAGGGCACAACCCTGACA<br>GTGTCTAGCGGAGGAGGAGGCTCTGGAGGAGGAGGCAGCG<br>GCGGCGGAGGCTCCGACATCGTGATGACCCAGGCAGCACCA<br>TCCATCCCAGTGACACCTGGCGAGAGCGTGTCCATCTCTTGT<br>AGGTCCTCTAAGTCTCTGCTGAACAGCAATGGCAACACCTAT<br>CTGTACTGGTTTCTGCAGCGGCCCGGACAGAGCCCTCAGCTG<br>CTGATCTATAGGATGTCCAATCTGGCCTCTGGAGTGCCTGAT<br>CGCTTCAGCGGCTCCGGCTCTGGAACCGCCTTTACACTGAGG<br>ATCTCCCGCGTGGAGGCAGAGGACGTGGGCGTGTATTACTG<br>CATGCAGCACCTGGAGTACCCTTTCACCTTTGGCGCCGGCAC<br>AAAGCTGGAGCTGAAGCGGAGCGACCCCACAACCACACCA<br>GCACCCCGGCCACCAACCCTGCCCCTACAATCGCAAGCCA<br>GCCACTGTCCCTGCGGCCCGAGGCCTGTAGACCTGCCGCCG<br>GCGGCGCCGTCCATACCCGCGGCCTGGATTTCGCCTGCGATA<br>TCTACATTTGGGCCCCTCTGGCCGGCACTTGCGGCGTGCTGC<br>TGCTGAGCCTGGTCATCACCCTGTATTGCAAGCGGGGCAGA<br>AAGAAGCTGCTGTACATCTTCAAGCAGCCCTTCATGCGGCCC<br>GTGCAGACCACACAGGAGGAGGATGGCTGCTCCTGTAGATT<br>CCCAGAGGAGGAGGAGGGAGGATGTGAGCTGCGCGTGAAG<br>TTTAGCCGGTCCGCCGACGCACCTGCATATCAGCAGGGCCA<br>GAACCAGCTGTACAATGAGCTGAACCTGGGCGGAGAGAGG<br>AGTACGACGTGCTGGATAAGAGAAGGGGACGGGACCCCGA<br>GATGGGAGGCAAGCCCCGCCGGAAGAATCCTCAGGAGGGC<br>CTGTATAACGAGCTGCAGAAGGATAAGATGGCCGAGGCCTA<br>CAGCGAGATCGGCATGAAGGGAGAGAGAAGGCGCGGCAAG<br>GGACACGACGGCCTGTATCAGGGCCTGTCCACCGCCACAAA<br>GGACACCTACGATGCCCTGCACATGCAGGCCCTGCCTCCAA<br>GATGA | b. Safety Switches and Monoclonal Antibody Specific-Epitopes

Safety Switches

It will be appreciated that adverse events may be minimized by transducing the immune cells (containing one or more CARs) with a suicide gene other than a rituximab-binding epitope. It may also be desired to incorporate an inducible "on" or "accelerator" switch into the immune cells. Suitable techniques include use of inducible caspase-9 (U.S. Appl. 2011/0286980) or a thymidine kinase, before, after or at the same time, as the cells are transduced with the CAR construct of the present disclosure. Additional methods for introducing suicide genes and/or "on" switches include TALENS, zinc fingers, RNAi, siRNA, shRNA, antisense technology, and other techniques known in the art.

In accordance with the disclosure, additional on-off or other types of control switch techniques may be incorporated herein. These techniques may employ the use of dimerization domains and optional activators of such domain dimerization. These techniques include, e.g., those described by Wu et al., Science 2014 350 (6258) utilizing FKBP/Rapalog dimerization systems in certain cells, the contents of which are incorporated by reference herein in their entirety. Additional dimerization technology is described in, e.g., Fegan et al. Chem. Rev. 2010, 110, 3315-3336 as well as U.S. Pat. Nos. 5,830,462; 5,834,266; 5,869,337; and 6,165,787, the contents of which are also incorporated by reference herein in their entirety. Additional dimerization pairs may include cyclosporine-A/cyclophilin, receptor, estrogen/estrogen receptor (optionally using tamoxifen), glucocorticoids/glucocorticoid receptor, tetracycline/tetracycline receptor, vitamin D/vitamin D receptor. Further examples of dimerization technology can be found in e.g., WO 2014/127261, WO 2015/090229, US 2014/0286987, US2015/0266973, US2016/0046700, U.S. Pat. No. 8,486,693, US 2014/0171649, and US 2012/0130076, the contents of which are further incorporated by reference herein in their entirety.

In some embodiments, the CAR-immune cell (e.g., CAR-T cell) of the disclosure comprises a polynucleotide encoding a suicide polypeptide that is deficient in rituximab binding. In some embodiments, the suicide peptide comprises a mutated RQR8 sequence. See, e.g., WO2013153391A, which is hereby incorporated by reference in its entirety. In CAR-immune cell (e.g., CAR-T cell) cells comprising the polynucleotide, the suicide polypeptide is expressed at the surface of a CAR-immune cell (e.g., CAR-T cell). In some embodiments, the suicide polypeptide comprises the amino acid sequence shown in SEQ ID NO: 19.

(SEQ ID NO: 19)
CPYSNPSLCSGGGGSELPTQGTFSNVSTNVSPAKPTTTACPYSNPSLCSG

GGGSPAPRPPTPAPTIASQPLSLRPEACRPAAGGAVHTRGLDFACDIYIW

APLAGTCGVLLLSLVITLYCNHRNRRRVCKCPRPVV.

The suicide polypeptide may also comprise a signal peptide at the amino terminus—for example, MGTSLLCW-MALCLLGADHADA (SEQ ID NO: 20). In some embodiments, the suicide polypeptide comprises the amino acid sequence shown in SEQ ID NO: 21, which includes the signal sequence of SEQ ID NO: 20.

```
                                               (SEQ ID NO: 21)
MGTSLLCWMALCLLGADHADACPYSNPSLCSGGGGSELPTQGTFSNVSTN

VSPAKPTTTACPYSNPSLCSGGGGSPAPRPPTPAPTIASQPLSLRPEACR

PAAGGAVHTRGLDFACDIYIWAPLAGTCGVLLLSLVITLYCNHRNRRRVC

KCPRPVV.
```

In certain embodiments, the suicide peptide comprises an amino acid sequence that comprises a one or more mutated residues, inserted residues, or deleted residues that reduce or eliminate rituximab binding.

When the suicide polypeptide is expressed at the surface of a CAR-immune cell (e.g., CAR-T cell), antibody binding to the suicide gene epitopes of the polypeptide causes lysis of the cell. Deletion of CD19-specific CAR-immune cell (e.g., CAR-T cell) may occur in vivo, for example by administering a suicide agent to a patient. The decision to delete the transferred cells may arise from undesirable effects being detected in the patient which are attributable to the transferred cells, such as for example, when unacceptable levels of toxicity are detected. As used herein, a "suicide agent" refers to a molecule that binds to the CAR immune cell and causes lysis of the CAR expressing immune cell.

In some embodiments, a suicide polypeptide is expressed on the surface of the cell. In some embodiments, a suicide polypeptide is included in the CAR construct. In some embodiments, a suicide polypeptide is not part of the CD19 CAR construct.

In some embodiments, the extracellular domain of any one of the CD19-specific CARs disclosed herein may comprise one or more epitopes specific for (i.e., specifically recognized by) a monoclonal antibody. These epitopes are also referred to herein as mAb-specific epitopes.

Exemplary mAb-specific epitopes are disclosed in International Patent Publication No. WO 2016/120216, which is incorporated herein in its entirety. In these embodiments, the extracellular domain of the CARs comprise antigen binding domains that specifically bind to CD19 and one or more epitopes that bind to one or more monoclonal antibodies (mAbs). CARs comprising the mAb-specific epitopes can be single-chain or multi-chain.

The inclusion of epitopes specific for monoclonal antibodies in the extracellular domain of the CARs described herein allows sorting and depletion of engineered immune cells expressing the CARs. In some embodiments, this feature also promotes recovery of endogenous CD19-expressing cells that were depleted by administration of engineered immune cells expressing the CARs. In some embodiments, allowing for depletion provides a safety switch in case of deleterious effects, e.g., upon administration to a subject.

Accordingly, in some embodiments, the present disclosure relates to a method for sorting and/or depleting the engineered immune cells endowed with the CARs comprising mAb-specific epitopes and a method for promoting recovery of endogenous CD19-expressing cells.

Several epitope-monoclonal antibody couples can be used to generate CARs comprising monoclonal antibody specific epitopes; in particular, those already approved for medical use or for use in GMP manufacturing, such as CD34 epitope/QBEND-10 as a non-limiting example.

The disclosure also encompasses methods for sorting the engineered immune cells endowed with the CD19-specific CARs expressing the mAb-specific epitope(s) and therapeutic methods where the activation of the engineered immune cells endowed with these CARs is modulated by depleting the cells using an antibody that targets the external ligand binding domain of said CARs. Table 2 provides exemplary mimotope sequences that can be inserted into the extracellular domains of the CARs of the disclosure.

TABLE 2

Exemplary mimotope sequences

| Rituximab | | | |
|---|---|---|---|
| Mimotope | SEQ ID NO: 22 | CPYSNPSLC |
| Palivizumab | | | |
| Epitope | SEQ ID NO: 23 | NSELLSLINDMPITNDQKKL MSNN |
| Cetuximab | | | |
| Mimotope 1 | SEQ ID NO: 24 | CQFDLSTRRLKC |
| Mimotope 2 | SEQ ID NO: 25 | CQYNLSSRALKC |
| Mimotope 3 | SEQ ID NO: 26 | CVWQRWQKSYVC |
| Mimotope 4 | SEQ ID NO: 27 | CMWDRFSRWYKC |
| Nivolumab | | | |
| Epitope 1 | SEQ ID NO: 28 | SFVLNWYRMSPSNQTDKLAA FPEDR |
| Epitope 2 | SEQ ID NO: 29 | SGTYLCGAISLAPKAQIKE |
| QBEND-10 | | | |
| Epitope | SEQ ID NO: 30 | ELPTQGTFSNVSTNVS |
| Alemtuzumab | | | |
| Epitope | SEQ ID NO: 31 | GQNDTSQTSSPS |

In certain embodiments, the CAR comprises an epitope or mimotope amino acid sequence that is at least about 75%, at least about 80%, at least about 85%, at least about 90%, at least about 95%, at least about 96%, at least about 97%, at least about 98%, at least about 99%, or 100% identical to the epitope or mimotope amino acid sequences set forth herein in Table 2. In certain embodiments, the CAR comprises an epitope or mimotope amino acid sequence that is not or does not comprise SEQ ID NO: 22. In certain embodiments, the CAR comprises an epitope or mimotope comprising the amino acid sequence of SEQ ID NO: 30.

c. Hinge Domain

The extracellular domain of the CARs of the disclosure may comprise a "hinge" domain (or hinge region). The term generally to any polypeptide that functions to link the transmembrane domain in a CAR to the extracellular antigen binding domain in a CAR. In particular, hinge domains can be used to provide more flexibility and accessibility for the extracellular antigen binding domain.

A hinge domain may comprise up to 300 amino acids—in some embodiments 10 to 100 amino acids or in some embodiments 25 to 50 amino acids. The hinge domain may be derived from all or part of naturally occurring molecules, such as from all or part of the extracellular region of CD8, CD4, CD28, 4-1BB, or IgG (in particular, the hinge region of an IgG; it will be appreciated that the hinge region may contain some or all of a member of the immunoglobulin family such as IgG1, IgG2, IgG3, IgG4, IgA, IgD, IgE, IgM, or fragment thereof), or from all or part of an antibody heavy-chain constant region. Alternatively, the hinge domain may be a synthetic sequence that corresponds to a naturally occurring hinge sequence, or may be an entirely synthetic hinge sequence. In some embodiments said hinge domain is a part of human CD8α chain (e.g., NP_001139345.1). In another particular embodiment, said hinge and transmembrane domains comprise a part of human CD8α chain. In some embodiments, the hinge domain of CARs described herein comprises a subsequence of CD8α, an IgG1, IgG4, PD-1 or an FcγRIIIα, in particular the hinge region of any of an CD8α, an IgG1, IgG4, PD-1 or an FcγRIIIα. In some embodiments, the hinge domain comprises a human CD8α hinge, a human IgG1 hinge, a human IgG4, a human PD-1 or a human FcγRIIIα hinge. In some embodiments the CARs disclosed herein comprise a scFv, CD8α human hinge and transmembrane domains, the CD3ζ signaling domain, and 4-1BB signaling domain. Table 3 provides amino acid sequences for exemplary hinges provided herein.

TABLE 3

Exemplary hinges

| Domain | Amino Acid Sequence | SEQ ID NO: |
|---|---|---|
| FcγRIIIα hinge | GLAVSTISSFFPPGYQ | 32 |
| CD8α hinge | TTTPAPRPPTPAPTIASQPLSLRPEACRPAAGGA VHTRGLDFACD | 33 |
| IgG1 hinge | EPKSPDKTHTCPPCPAPPVAGPSVFLFPPKPKDT LMIARTPEVTCVVVDVSHEDPEVKFNWYVDGVEV HNAKTKPREEQYNSTYRVVSVLTVLHQDWLNGKE YKCKVSNKALPAPIEKTISKAKGQPREPQVYTLP PSRDELTKNQVSLTCLVKGFYPSDIAVEWESNGQ PENNYKTTPPVLDSDGSFFLYSKLTVDKSRWQQG NVFSCSVMHEALHNHYTQKSLSLSPGK | 34 |

In certain embodiments, the hinge region comprises an amino acid sequence that is at least about 75%, at least about 80%, at least about 85%, at least about 90%, at least about 95%, at least about 96%, at least about 97%, at least about 98%, at least about 99%, or 100% identical to the hinge domain amino acid sequences set forth herein in Table 3.

d. Transmembrane Domain

The CARs of the disclosure are designed with a transmembrane domain that is fused to the extracellular domain of the CAR. It can similarly be fused to the intracellular domain of the CAR. In some instances, the transmembrane domain can be selected or modified by amino acid substitution to avoid binding of such domains to the transmembrane domains of the same or different surface membrane proteins to minimize interactions with other members of the receptor complex. In some embodiments, short linkers may form linkages between any or some of the extracellular, transmembrane, and intracellular domains of the CAR. In some embodiments, the linker comprises a glycine repeat sequence. In some embodiments, the linker comprises (GGGGS)n, wherein n is 1, 2, 3, 4, or 5 (SEQ ID NO: 41).

Suitable transmembrane domains for a CAR disclosed herein have the ability to (a) be expressed at the surface an immune cell such as, for example without limitation, a lymphocyte cell, such as a T helper ($T_h$) cell, cytotoxic T ($T_c$) cell. T regulatory ($T_{reg}$) cell, or Natural killer (NK) cells, and/or (b) interact with the extracellular antigen binding domain and intracellular signaling domain for directing the cellular response of an immune cell against a target cell.

The transmembrane domain may be derived either from a natural or from a synthetic source. Where the source is natural, the domain may be derived from any membrane-bound or transmembrane protein.

Transmembrane regions of particular use in this disclosure may be derived from (comprise, or correspond to) CD28, OX-40, 4-1BB/CD137, CD2, CD7, CD27, CD30, CD40, programmed death-1 (PD-1), inducible T cell costimulator (ICOS), lymphocyte function-associated antigen-1 (LFA-1, CD1-1a/CD18), CD3 gamma, CD3 delta, CD3 epsilon, CD247, CD276 (B7-H3), LIGHT, (TNFSF14), NKG2C, Ig alpha (CD79a), DAP-10, Fc gamma receptor, MHC class 1 molecule. TNF receptor proteins, an Immunoglobulin protein, cytokine receptor, integrins, Signaling Lymphocytic Activation Molecules (SLAM proteins), activating NK cell receptors, BTLA, a Toll ligand receptors, ICAM-1, B7-H3, CDS, ICAM-1, GITR, BAFFR, LIGHT, HVEM (LIGHTR), KIRDS2, SLAMF7, NKp80 (KLRF1), NKp44, NKp30, NKp46, CD19, CD4, CD8alpha, CD8beta, IL-2R beta, IL-2R gamma, IL-7R alpha, ITGA4, VLA1, CD49a, ITGA4, IA4, CD49D, ITGA6, VLA-6, CD49f. ITGAD, CD1 1d, ITGAE, CD103, ITGAL, CD1 1a, LFA-1, ITGAM, CD1 1b, ITGAX, CD1 1c, ITGB1, CD29, ITGB2, CD18, LFA-1, ITGB7, NKG2D, TNFR2, TRANCE/RANKL, DNAMI (CD226), SLAMF4 (CD244, 2B4), CD84, CD96 (Tactile), CEACAMI, CRT AM, Ly9 (CD229), CD160 (BY55), PSGL1, CD100 (SEMA4D), CD69, SLAMF6 (NTB-A, Ly108), SLAM (SLAMF1, CD150, IPO-3), BLAME (SLAMF8), SELPLG (CD162), LTBR, LAT. GADS, SLP-76, PAG/Cbp, CD19a, a ligand that specifically binds with CD83, or any combination thereof.

As non-limiting examples, the transmembrane region can be a derived from, or be a portion of a T cell receptor such as α, β, γ or δ, polypeptide constituting CD3 complex, IL-2 receptor p55 (a chain), p75 (β chain) or γ chain, subunit chain of Fc receptors, in particular Fcγ receptor III or CD proteins. Alternatively, the transmembrane domain can be synthetic and can comprise predominantly hydrophobic residues such as leucine and valine. In some embodiments said transmembrane domain is derived from the human CD8α chain (e.g., NP_001139345.1).

In some embodiments, the transmembrane domain in the CAR of the disclosure is a CD8α transmembrane domain. In some embodiments, the transmembrane domain in the CAR of the disclosure is a CD8α transmembrane domain comprising the amino acid sequence IYIWAPLAGTCGVLLLSLVIT (SEQ ID NO: 35). In some embodiments, the CD8α transmembrane domain comprises the nucleic acid sequence that encodes the transmembrane amino acid sequence of SEQ ID NO: 35. In some embodiments, the hinge and transmembrane domain in the CAR of the disclosure is a CD8α hinge and transmembrane domain comprising the amino acid sequence (SEQ ID NO: 36)
TTTPAPRPPTPAPTIASQPLSLRPEACRPAAGGAVHTRGLDFACDIYIWA

PLAGTCGVLLLSLVIT.

e. Intracellular Domain

The intracellular (cytoplasmic) domain of the CARs of the disclosure can provide activation of at least one of the normal effector functions of the immune cell comprising the CAR. Effector function of a T cell, for example, may refer to cytolytic activity or helper activity, including the secretion of cytokines.

In some embodiments, an activating intracellular signaling domain for use in a CAR can be the cytoplasmic sequences of, for example without limitation, the T cell receptor and co-receptors that act in concert to initiate signal transduction following antigen receptor engagement, as well as any derivative or variant of these sequences and any synthetic sequence that has the same functional capability.

It will be appreciated that suitable (e.g., activating) intracellular domains include, but are not limited to signaling domains derived from (or corresponding to) CD28, OX-40, 4-1BB/CD137, CD2, CD7, CD27, CD30, CD40, programmed death-1 (PD-1), inducible T cell costimulator (ICOS), lymphocyte function-associated antigen-1 (LFA-1, CD1-1a/CD18), CD3 gamma, CD3 delta, CD3 epsilon, CD247, CD276 (B7-H3), LIGHT, (TNFSF14), NKG2C, Ig alpha (CD79a), DAP-10, Fc gamma receptor, MHC class 1 molecule, TNF receptor proteins, an Immunoglobulin protein, cytokine receptor, integrins, Signaling Lymphocytic Activation Molecules (SLAM proteins), activating NK cell receptors, BTLA, a Toll ligand receptors, ICAM-1, B7-H3, CDS, ICAM-1, GITR, BAFFR, LIGHT, HVEM (LIGHTR), KIRDS2, SLAMF7, NKp80 (KLRF1), NKp44, NKp30, NKp46, CD19, CD4, CD8alpha, CD8beta, IL-2R beta, IL-2R gamma, IL-7R alpha, ITGA4, VLA1, CD49a, ITGA4, IA4, CD49D, ITGA6, VLA-6, CD49f, ITGAD, CD1 1d, ITGAE, CD103, ITGAL, CD1 1a, LFA-1, ITGAM, CD1 1b, ITGAX, CD1 1c, ITGB1, CD29, ITGB2, CD18, LFA-1, ITGB7, NKG2D, TNFR2, TRANCE/RANKL, DNAMI (CD226), SLAMF4 (CD244, 2B4), CD84, CD96 (Tactile), CEACAMI, CRT AM, Ly9 (CD229), CD160 (BY55), PSGL1, CD100 (SEMA4D), CD69, SLAMF6 (NTB-A, Ly108), SLAM (SLAMF1, CD150, IPO-3), BLAME (SLAMF8), SELPLG (CD162), LTBR, LAT. GADS, SLP-76, PAG/Cbp, CD19a, a ligand that specifically binds with CD83, or any combination thereof.

The intracellular domains of the CARs of the disclosure may incorporate, in addition to the activating domains described above, co-stimulatory signaling domains (interchangeably referred to herein as costimulatory molecules) to increase their potency. Costimulatory domains can provide a signal in addition to the primary signal provided by an activating molecule as described herein.

It will be appreciated that suitable costimulatory domains within the scope of the disclosure can be derived from (or correspond to) for example, CD28, OX40, 4-1BB/CD137, CD2, CD3 (alpha, beta, delta, epsilon, gamma, zeta), CD4, CD5, CD7, CD9, CD16, CD22, CD27, CD30, CD 33, CD37, CD40, CD 45, CD64, CD80, CD86, CD134, CD137, CD154, PD-1, ICOS, lymphocyte function-associated antigen-1 (LFA-1 (CD1 1a/CD18), CD247, CD276 (B7-H3), LIGHT (tumor necrosis factor superfamily member 14; TNFSF14), NKG2C, Ig alpha (CD79a), DAP-10, Fc gamma receptor, MHC class I molecule, TNFR, integrin, signaling lymphocytic activation molecule, BTLA, Toll ligand receptors, ICAM-1, B7-H3, CDS, ICAM-1, GITR, BAFFR. LIGHT, HVEM (LIGHTR), KIRDS2, SLAMF7, NKp80 (KLRF1), NKp44, NKp30, NKp46, CD19, CD4, CD8alpha, CD8beta, IL-2R beta, IL-2R gamma, IL-7R alpha, ITGA4, VLA1, CD49a, ITGA4, IA4, CD49D, ITGA6, VLA-6, CD49f, ITGAD, CD1-1d, ITGAE, CD103, ITGAL, CD1-1a, LFA-1, ITGAM, CD1-1b, ITGAX, CD1-1c, ITGB1, CD29, ITGB2, CD18, LFA-1, ITGB7, NKG2D, TNFR2, TRANCE/RANKL, DNAMI (CD226), SLAMF4 (CD244, 2B4), CD84, CD96 (Tactile), CEACAMI, CRT AM, Ly9 (CD229), CD160 (BY55), PSGL1, CD100 (SEMA4D), CD69, SLAMF6 (NTB-A, Ly108), SLAM (SLAMF1, CD150, IPO-3), BLAME (SLAMF8), SELPLG (CD162), LTBR, LAT, GADS, SLP-76, PAG/Cbp, CD19a, CD83 ligand, or fragments or combinations thereof. It will be appreciated that additional costimulatory molecules, or fragments thereof, not listed above are within the scope of the disclosure.

In some embodiments, the intracellular/cytoplasmic domain of the CAR can be designed to comprise the 41BB/CD137 domain by itself or combined with any other desired intracellular domain(s) useful in the context of the CAR of the disclosure. The complete native amino acid sequence of 41BB/CD137 is described in NCBI Reference Sequence: NP_001552.2. The complete native 41BB/CD137 nucleic acid sequence is described in NCBI Reference Sequence: NM_001561.5.

In some embodiments, the intracellular/cytoplasmic domain of the CAR can be designed to comprise the CD28 domain by itself or combined with any other desired intracellular domain(s) useful in the context of the CAR of the disclosure. The complete native amino acid sequence of CD28 is described in NCBI Reference Sequence: NP_006130.1. The complete native CD28 nucleic acid sequence is described in NCBI Reference Sequence: NM_006139.1.

In some embodiments, the intracellular/cytoplasmic domain of the CAR can be designed to comprise the CD3 zeta domain by itself or combined with any other desired intracellular domain(s) useful in the context of the CAR of the disclosure. In some embodiments, the intracellular signaling domain of the CAR can comprise the CD3 signaling domain which has amino acid sequence with at least about 70%, at least 80%, at least 90%, 95%, 97%, or 99% sequence identity with an amino acid sequence shown in SEQ ID NO: 38. For example, the intracellular domain of the CAR can comprise a CD3 zeta chain portion and a portion of a costimulatory signaling molecule. The intracellular signaling sequences within the intracellular signaling portion of the CAR of the disclosure may be linked to each other in a random or specified order. In some embodiments, the intracellular domain is designed to comprise the activating domain of CD3 zeta and a signaling domain of CD28.

In some embodiments, the intracellular domain is designed to comprise the activating domain of CD3 zeta and a signaling domain of 4-1BB. In some embodiments, the 4-1BB (intracellular domain) comprises the amino acid sequence

```
                                         (SEQ ID NO: 37)
   KRGRKKLLYIFKQPFMRPVQTTQEEDGCSCRFPEEEEGGCEL.
```

The CD3 zeta amino acid sequence may comprise SEQ ID NO: 38.

```
                                         (SEQ ID NO: 38)
LRVKFSRSADAPAYQQGQNQLYNELNLGRREEYDVLDKRRGRDPEMGGKP

RRKNPQEGLYNELQKDKMAEAYSEIGMKGERRRGKGHDGLYQGLSTATKD

TYDALHMQALPPR.
```

In some embodiments the intracellular signaling domain of the CAR of the disclosure comprises a domain of a co-stimulatory molecule. In some embodiments, the intracellular signaling domain of a CAR of the disclosure comprises a part of co-stimulatory molecule selected from the group consisting of fragment of 41BB (GenBank: AAA53133) and CD28 (NP_006130.1). In some embodiments, the intracellular signaling domain of the CAR of the disclosure comprises amino acid sequence which comprises at least 70%, at least 80%, at least 90%, 95%, 97%, or 99% sequence identity with an amino acid sequence shown in SEQ ID NO: 37 and SEQ ID NO: 38. In some embodiments, the intracellular signaling domain of the CAR of the disclosure comprises amino acid sequence which comprises at least 70%, at least 80%, at least 90%, 95%, 97%, or 99% sequence identity with an amino acid sequence shown in SEQ ID NO: 37 and/or at least 70%, at least 80%, at least 90%, 95%, 97%, or 99% sequence identity with an amino acid sequence shown in SEQ ID NO: 38.

In exemplary embodiments, a CAR of the disclosure comprises, from N- terminus to C-terminus: a CD8α signal sequence, a CD19 scFv, a CD8α hinge and transmembrane region, a 41BB cytoplasmic signaling domain, and a CD3ζ cytoplasmic signaling domain.

III. Immune Cells Comprising CARs a. Immune Cells

Provided herein are engineered immune cells expressing the CARs of the disclosure (e.g., CAR-T cells).

In some embodiments, an engineered immune cell comprises a population of CARS, each CAR comprising different extracellular antigen-binding domains. In some embodiments, an immune cell comprises a population of CARs, each CAR comprising the same extracellular antigen-binding domains.

The engineered immune cells can be allogeneic or autologous.

In some embodiments, the engineered immune cell is a T cell (e.g., inflammatory T-lymphocyte cytotoxic T-lymphocyte, regulatory T-lymphocyte, helper T-lymphocyte, tumor infiltrating lymphocyte (TIL)), NK cell, NK-T-cell. TCR-expressing cell, dendritic cell, killer dendritic cell, a mast cell, or a B-cell. In some embodiments, the cell can be derived from the group consisting of CD4+ T-lymphocytes and CD8+ T-lymphocytes. In some exemplary embodiments, the engineered immune cell is a T cell. In some exemplary embodiments, the engineered immune cell is a gamma delta T cell. In some exemplary embodiments, the engineered immune cell is a macrophage.

In some embodiments, the engineered immune cell can be derived from, for example without limitation, a stem cell. The stem cells can be adult stem cells, non-human embryonic stem cells, more particularly non-human stem cells, cord blood stem cells, progenitor cells, bone marrow stem cells, induced pluripotent stem cells, totipotent stem cells or hematopoietic stem cells.

In some embodiments, the cell is obtained or prepared from peripheral blood. In some embodiments, the cell is obtained or prepared from peripheral blood mononuclear cells (PBMCs). In some embodiments, the cell is obtained or prepared from bone marrow. In some embodiments, the cell is obtained or prepared from umbilical cord blood. In some embodiments, the cell is a human cell. In some embodiments, the cell is transfected or transduced by the nucleic acid vector using a method selected from the group consisting of electroporation, sonoporation, biolistics (e.g., Gene Gun), lipid transfection, polymer transfection, nanoparticles, viral transfection (e.g., retrovirus, lentivirus, AAV) or polyplexes.

In some embodiments, the engineered immune cells expressing at their cell surface membrane a CD19-specific CAR of the disclosure comprise a percentage of stem cell memory and central memory cells greater than 10%, 20%, 30%, 40%, 50%, 60%, 70%, 80%, 90%, or 100%. In some embodiments, the engineered immune cells expressing at their cell surface membrane a CD19-specific CAR of the disclosure comprise a percentage of stem cell memory and central memory cells of about 10% to about 100%, about 10% to about 90%, about 10% to about 80%, about 10% to about 70%, about 10% to about 60%, about 10% to about 50%, about 10% to about 40%, about 10% to about 30%, about 10% to about 20%, about 15% to about 100%, about 15% to about 90%, about 15% to about 80%, about 15% to about 70%, about 15% to about 60%, about 15% to about 50%, about 15% to about 40%, about 15% to about 30%, about 20% to about 100%, about 20% to about 90%, about 20% to about 80%, about 20% to about 70%, about 20% to about 60%, about 20% to about 50%, about 20% to about 40%, about 20% to about 30%, about 30% to about 100%, about 30% to about 90%, about 30% to about 80%, about 30% to about 70%, about 30% to about 60%, about 30% to about 50%, about 30% to about 40%, about 40% to about 100%, about 40% to about 90%, about 40% to about 80%, about 40% to about 70%, about 40% to about 60%, about 40% to about 50%, about 50% to about 100%, about 50% to about 90%, about 50% to about 80%, about 50% to about 70%, about 50% to about 60%, about 60% to about 100%, about 60% to about 90%, about 60% to about 80%, about 60% to about 70%, about 70% to about 90%, about 70% to about 80%, about 80% to about 100%, about 80% to about 90%, about 90% to about 100%, about 25% to about 50%, about 75% to about 100%, or about 50% to about 75%.

In some embodiments, the immune cell is an inflammatory T-lymphocyte that expresses any one of the CARs described herein. In some embodiments, the immune cell is a cytotoxic T-lymphocyte that expresses any one of the CARs described herein. In some embodiments, the immune cell is a regulatory T-lymphocyte that expresses any one of the CARs described herein. In some embodiments, the immune cell is a helper T-lymphocyte that expresses any one of the CARs described herein.

Prior to expansion and genetic modification, a source of cells can be obtained from a subject through a variety of non-limiting methods. Cells can be obtained from a number of non-limiting sources, including peripheral blood mononuclear cells, bone marrow, lymph node tissue, cord blood, thymus tissue, stem cell- or iPSC-derived T cells or NK cells, tissue from a site of infection, ascites, pleural effusion, spleen tissue, and tumors. In some embodiments, any number of T cell lines available and known to those skilled in the art, may be used. In some embodiments, cells can be derived from a healthy donor, from a patient diagnosed with cancer or from a patient diagnosed with an infection. In some embodiments, cells can be part of a mixed population of cells which present different phenotypic characteristics.

Also provided herein are cell lines obtained from a transformed immune cell (e.g., T-cell) according to any of the above-described methods. Also provided herein are modified cells resistant to an immunosuppressive treatment. In some embodiments, an isolated cell according to the disclosure comprises a polynucleotide encoding a CAR.

The immune cells of the disclosure can be activated and expanded, either prior to or after genetic modification of the immune cells, using methods as generally known. Generally, the engineered immune cells of the disclosure can be expanded, for example, by contacting with an agent that stimulates a CD3 TCR complex and a co-stimulatory molecule on the surface of the T-cells to create an activation signal for the T cell. For example, chemicals such as calcium ionophore A23187, phorbol 12-myristate 13-acetate (PMA), or mitogenic lectins like phytohemagglutinin (PHA) can be used to create an activation signal for the T cell.

In some embodiments. T cell populations may be stimulated in vitro by contact with, for example, an anti-CD3 antibody, or antigen-binding fragment thereof, or an anti- CD28 antibody immobilized on a surface, or by contact with a protein kinase C activator (e.g., bryostatin) in conjunction with a calcium ionophore. For co-stimulation of an accessory molecule on the surface of the T cells, a ligand that binds the accessory molecule is used. For example, a population of T cells can be contacted with an anti-CD3 antibody and an anti-CD28 antibody, under conditions appropriate for stimulating proliferation of the T cells. The anti-CD3 antibody and an anti-CD28 antibody can be disposed on a bead or plate or other substrate. Conditions appropriate for T cell culture include an appropriate media (e.g., Minimal Essential Media or RPMI Media 1640 or, X-vivo 15, (Lonza)) that may contain factors necessary for proliferation and viability, including serum (e.g., fetal bovine or human serum), interleukin-2 (IL-2), insulin, IFN-γ, IL-4, IL-7, GM-CSF, IL-10, IL-2, IL-15, TGFbeta, and TNF, or any other additives for the growth of cells known to the skilled artisan. Other additives for the growth of cells include, but are not limited to, surfactant, plasmanate, and reducing agents such as N-acetyl- cysteine and 2-mercaptoethanoi. Media can include RPMI 1640, A1M-V. DMEM, MEM, a- MEM, F-12, X-Vivo 15, and X-Vivo 20, Optimizer, with added amino acids, sodium pyruvate, and vitamins, either serum-free or supplemented with an appropriate amount of serum (or plasma) or a defined set of hormones, and/or an amount of cytokine(s) sufficient for the growth and expansion of T cells (e.g., IL-7 and/or IL-15). Antibiotics, e.g., penicillin and streptomycin, are included only in experimental cultures, not in cultures of cells that are to be infused into a subject. The target cells are maintained under conditions necessary to support growth, for example, an appropriate temperature (e.g., 37° C.) and atmosphere (e.g., air plus 5% $CO_2$). T cells that have been exposed to varied stimulation times may exhibit different characteristics In some embodiments, the cells of the disclosure can be expanded by co-culturing with tissue or cells. The cells can also be expanded in vivo, for example in the subject's blood after administering the cell into the subject.

In some embodiments, an engineered immune cell according to the present disclosure may comprise one or more disrupted or inactivated genes. In some embodiments, an engineered immune cell according to the present disclosure comprises one disrupted or inactivated gene selected from the group consisting of CD52, CD19, GR, PD-1, CTLA-4, LAG3, TIM3, BTLA, BY55, TIGIT, B7H5, LAIR1, SIGLEC10, 2B4, HLA, TCRα and TCRβ and/or expresses a CAR, a multi-chain CAR and/or a pTα transgene. In some embodiments, an isolated cell comprises polynucleotides encoding polypeptides comprising a multi-chain CAR. In some embodiments, the isolated cell according to the present disclosure comprises two disrupted or inactivated genes selected from the group consisting of: CD52 and GR, CD52 and TCRα, CDR52 and TCRβ, CD19 and CD52, CD19 and TCRα, CD19 and TCRβ, GR and TCRα, GR and TCRβ, TCRα and TCRβ, PD-1 and TCRα, PD-1 and TCRβ, CTLA-4 and TCRα, CTLA-4 and TCRβ, LAG3 and TCRα, LAG3 and TCRβ, TIM3 and TCRα, Tim3 and TCRβ, BTLA and TCRα, BTLA and TCRβ, BY55 and TCRα, BY55 and TCRβ, TIGIT and TCRα, TIGIT and TCRβ, B7H5 and TCRα, B7H5 and TCRβ, LAIR1 and TCRα, LAIR1 and TCRβ, SIGLEC10 and TCRα, SIGLEC10 and TCRβ, 2B4 and TCRα, 2B4 and TCRβ and/or expresses a CAR, a multi-chain CAR and a pTα transgene. In some embodiments the method comprises disrupting or inactivating one or more genes by introducing into the cells an endonuclease able to selectively inactivate a gene by selective DNA cleavage. In some embodiments the endonuclease can be, for example, a zinc finger nuclease (ZFN), megaTAL nuclease, meganuclease, transcription activator-like effector nuclease (TALE-nuclease), or CRIPR (e.g., Cas9) endonuclease.

In some embodiments, TCR is rendered not functional in the cells according to the disclosure by disrupting or inactivating TCRα gene and/or TCRβ gene(s). In some embodiments, a method to obtain modified cells derived from an individual is provided, wherein the cells can proliferate independently of the major histocompatibility complex (MHC) signaling pathway. Modified cells, which can proliferate independently of the MHC signaling pathway, susceptible to be obtained by this method are encompassed in the scope of the present disclosure. Modified cells disclosed herein can be used in for treating patients in need thereof against Host versus Graft (HvG) rejection and Graft versus Host Disease (GvHD); therefore in the scope of the present disclosure is a method of treating patients in need thereof against Host versus Graft (HvG) rejection and Graft versus Host Disease (GvHD) comprising treating said patient by administering to said patient an effective amount of modified cells comprising disrupted or inactivated TCRα and/or TCRβ genes.

In some embodiments, the immune cells are engineered to be resistant to one or more chemotherapy drugs. The chemotherapy drug can be, for example, a purine nucleotide analogue (PNA), thus making the immune cell suitable for cancer treatment combining adoptive immunotherapy and chemotherapy. Exemplary PNAs include, for example, clofarabine, fludarabinc, cyclophosphamide, and cytarabine, alone or in combination. PNAs are metabolized by deoxycytidine kinase (dCK) into mono-, di-, and tri-phosphate PNA. Their tri-phosphate forms compete with ATP for DNA synthesis, act as pro-apoptotic agents, and are potent inhibitors of ribonucleotide reductase (RNR), which is involved in trinucleotide production. Provided herein are CD19-specific CAR-T cells comprising a disrupted or inactivated dCK gene. In some embodiments, the dCK knockout cells are made by transfection of T cells using polynucleotides encoding specific TAL-nulcease directed against dCK genes by, for example, electroporation of mRNA. The dCK knockout CD19-specific CAR-T cells are resistant to PNAs, including for example clorofarabine and/or fludarabine, and maintain T cell cytotoxic activity toward CD19-expressing cells.

In some embodiments, isolated cells or cell lines of the disclosure can comprise a pTα or a functional variant thereof. In some embodiments, an isolated cell or cell line can be further genetically modified by disrupting or inactivating the TCRα gene.

The disclosure also provides engineered immune cells comprising any of the CAR polynucleotides described herein.

c. Methods of Making

Provided herein are methods of making the CARs and the CAR containing immune cells of the disclosure. A variety of known techniques can be utilized in making the polynucleotides, polypeptides, vectors, antigen binding domains, immune cells, compositions, and the like according to the disclosure.

Polynucleotides and Vectors

In some embodiments, a CAR can be introduced into an immune cell as a transgene via a plasmid vector. In some embodiments, the plasmid vector can also contain, for example, a selection marker which provides for identification and/or selection of cells which received the vector.

CAR polypeptides may be synthesized in situ in the cell after introduction of polynucleotides encoding the CAR polypeptides into the cell. Alternatively, CAR polypeptides may be produced outside of cells, and then introduced into cells. Methods for introducing a polynucleotide construct into cells are known in the art. In some embodiments, stable transformation methods (e.g., using a lentiviral vector) can be used to integrate the polynucleotide construct into the genome of the cell. In other embodiments, transient transformation methods can be used to transiently express the polynucleotide construct, and the polynucleotide construct not integrated into the genome of the cell. In other embodiments, virus-mediated methods can be used. The polynucleotides may be introduced into a cell by any suitable means such as for example, recombinant viral vectors (e.g., retroviruses, adenoviruses), liposomes, and the like. Transient transformation methods include, for example without limitation, microinjection, electroporation or particle bombardment. Polynucleotides may be included in vectors, such as for example plasmid vectors or viral vectors.

In some embodiments, isolated nucleic acids are provided comprising a promoter operably linked to a first polynucleotide encoding a CD19 antigen binding domain, at least one costimulatory molecule, and an activating domain. In some embodiments, the nucleic acid construct is contained within a viral vector. In some embodiments, the viral vector is selected from the group consisting of retroviral vectors, murine leukemia virus vectors, SFG vectors, adenoviral vectors, lentiviral vectors, adeno-associated virus (AAV) vectors, Herpes virus vectors, and vaccinia virus vectors. In some embodiments, the nucleic acid is contained within a plasmid.

In one aspect, the present disclosure provides a polynucleotide sequence comprising a promoter that is capable of expressing a CAR transgene in a mammalian T cell. In some embodiments, the promoter is the EF1a promoter. The native EF1a promoter drives expression of the alpha subunit of the elongation factor-1 complex, which is responsible for the enzymatic delivery of aminoacyl tRNAs to the ribosome. The EF1a promoter has been extensively used in mammalian expression plasmids and has been shown to be effective in driving CAR expression from transgenes cloned into a lentiviral vector. See, e.g., Milone et al., Mol. Ther. 17(8): 1453-1464 (2009). In some embodiments, the EF1a promoter comprises the sequence provided as SEQ ID NO: 15.

(SEQ ID NO: 15)
GCGTGAGGCTCCGGTGCCCGTCAGTGGGCAGAGCGCACATCGCCCACAGT

CCCCGAGAAGTTGGGGGGAGGGGTCGGCAATTGAACCGGTGCCTAGAGAA

GGTGGCGCGGGGTAAACTGGGAAAGTGATGTCGTGTACTGGCTCCGCCTT

TTTCCCGAGGGTGGGGGAGAACCGTATATAAGTGCAGTAGTCGCCGTGAA

CGTTCTTTTTCGCAACGGGTTTGCCGCCAGAACACAGGTAAGTGCCGTGT

GTGGTTCCCGCGGGCCTGGCCTCTTTACGGGTTATGGCCCTTGCGTGCCT

TGAATTACTTCCACGCCCCTGGCTGCAGTACGTGATTCTTGATCCCGAGC

TTCGGGTTGGAAGTGGGTGGGAGAGTTCGAGGCCTTGCGCTTAAGGAGCC

CCTTCGCCTCGTGCTTGAGTTGAGGCCTGGCCTGGGCGCTGGGGCCGCCG

CGTGCGAATCTGGTGGCACCTTCGCGCCTGTCTCGCTGCTTTCGATAAGT

CTCTAGCCATTTAAAATTTTTGATGACCTGCTGCGACGCTTTTTTTCTGG

CAAGATAGTCTTGTAAATGCGGGCCAAGATCTGCACACTGGTATTTCGGT

TTTTGGGGCCGCGGGCGGCGACGGGGCCCGTGCGTCCCAGCGCACATGTT

CGGCGAGGCGGGGCCTGCGAGCGCGGCCACCGAGAATCGGACGGGGGTAG

TCTCAAGCTGGCCGGCCTGCTCTGGTGCCTGGCCTCGCGCCGCCGTGTAT

CGCCCCGCCCTGGGCGGCAAGGCTGGCCCGGTCGGCACCAGTTGCGTGAG

CGGAAAGATGGCCGCTTCCCGGCCCTGCTGCAGGGAGCTCAAAATGGAGG

ACGCGGCGCTCGGGAGAGCGGGCGGGTGAGTCACCCACACAAAGGAAAAG

GGCCTTTCCGTCCTCAGCCGTCGCTTCATGTGACTCCACGGAGTACCGGG

CGCCGTCCAGGCACCTCGATTAGTTCTCGAGCTTTTGGAGTACGTCGTCT

TTAGGTTGGGGGGAGGGGTTTTATGCGATGGAGTTTCCCCACACTGAGTG

GGTGGAGACTGAAGTTAGGCCAGCTTGGCACTTGATGTAATTCTCCTTGG

AATTTGCCCTTTTTGAGTTTGGATCTTGGTTCATTCTCAAGCCTCAGACA

GTGGTTCAAAGTTTTTTTCTTCCATTTCAGGTGTCGTGA

The EF1a promoter sequence shown above comprises the first exon (bold) and the first intron (underlined, SEQ ID NO: 39), followed by the N-terminal portion of the second exon, of the EF1a gene. In some embodiments, the polynucleotide provided herein comprises a short EF1a promoter. In some embodiments, the polynucleotide provided herein comprises an EF1a promoter that is shorter than the nucleic acid sequence of SEQ ID NO: 15. In some embodiments, the polynucleotide provided herein comprises an EF1a promoter that does not comprise the first intron of the EF1a gene. In some embodiments, the polynucleotide provided herein comprises an EF1a promoter that does not comprise the nucleic acid sequence of SEQ ID NO:39.

In some embodiments, the promoter comprises the sequence provided as SEQ ID NO:16.

(SEQ ID NO: 16)
GCGTGAGGCTCCGGTGCCCGTCAGTGGGCAGAGCGCACATCGCCCACAGT

CCCCGAGAAGTTGGGGGGAGGGGTCGGCAATTGAACCGGTGCCTAGAGAA

GGTGGCGCGGGGTAAACTGGGAAAGTGATGTCGTGTACTGGCTCCGCCTT

TTTCCCGAGGGTGGGGGAGAACCGTATATAAGTGCAGTAGTCGCCGTGAA

CGTTCTTTTTCGCAACGGGTTTGCCGCCAGAACACAG

Prior to the in vitro manipulation or genetic modification of the immune cells described herein, the cells may be obtained from a subject. The cells expressing a CD19 CAR may be derived from an allogenic or autologous process.

Source Material

In some embodiments, the immune cells comprise T cells. T cells can be obtained from a number of sources, including peripheral blood mononuclear cells (PBMCs), bone marrow, lymph nodes tissue, cord blood, thymus tissue, tissue from a site of infection, ascites, pleural effusion, spleen tissue, and tumors. In certain embodiments, T cells can be obtained from a unit of blood collected from the subject using any number of techniques known to the skilled person, such as FICOLL™ separation.

Cells may be obtained from the circulating blood of an individual by apheresis. The apheresis product typically contains lymphocytes, including T cells, monocytes, granulocytes, B cells, other nucleated white blood cells, red blood cells, and platelets. In certain embodiments, the cells collected by apheresis may be washed to remove the plasma fraction, and placed in an appropriate buffer or media for subsequent processing.

In certain embodiments, T cells are isolated from PBMCs by lysing the red blood cells and depleting the monocytes, for example, using centrifugation through a PERCOLL™ gradient. A specific subpopulation of T cells, (e.g., CD28+, CD4+, CDS+, CD45RA+, and CD45RO+T cells or CD28+, CD4+, CDS+, CD45RA-, CD45RO+, and CD62L+T cells) can be further isolated by positive or negative selection techniques known in the art. For example, enrichment of a T cell population by negative selection can be accomplished with a combination of antibodies directed to surface markers unique to the negatively selected cells. One method for use herein is cell sorting and/or selection via negative magnetic immunoadherence or flow cytometry that uses a cocktail of monoclonal antibodies directed to cell surface markers present on the cells negatively selected. For example, to enrich for CD4+cells by negative selection, a monoclonal antibody cocktail typically includes antibodies to CD14, CD20, CD11b, CD16, HLA-DR, and CD8. Flow cytometry and cell sorting may also be used to isolate cell populations of interest for use in the present disclosure.

PBMCs may be used directly for genetic modification with the immune cells (such as CARs or TCRs) using methods as described herein. In certain embodiments, after isolating the PBMCs, T lymphocytes can be further isolated and both cytotoxic and helper T lymphocytes can be sorted into naive, memory, and effector T cell subpopulations either before or after genetic modification and/or expansion.

In some embodiments, CD8+ cells are further sorted into naive, stem cell memory, central memory, and effector cells by identifying cell surface antigens that are associated with each of these types of CD8+ cells. In some embodiments, the expression of phenotypic markers of central memory T cells include CD45RO, CD62L, CCR7, CD28, CD3, and CD127 and are negative for granzyme B. In some embodiments, stem cell memory T cells are CD45RO-, CD62L+, CD8+ T cells. In some embodiments, central memory T cells are CD45RO+, CD62L+, CD8+ T cells. In some embodiments, effector T cells are negative for CD62L, CCR7, CD28, and CD127, and positive for granzyme B and perforin. In certain embodiments, CD4+ T cells are further sorted into subpopulations. For example, CD4+ T helper cells can be sorted into naive, central memory, and effector cells by identifying cell populations that have cell surface antigens.

Stem Cell Derived Immune Cells

In some embodiments, the immune cells may be derived from embryonic stem (ES) or induced pluripotent stem (iPS) cells. Suitable HSCs, ES cells, iPS cells and other stems cells may be cultivated immortal cell lines or isolated directly from a patient. Various methods for isolating, developing, and/or cultivating stem cells are known in the art and may be used to practice the present invention.

In some embodiments, the immune cell is an induced pluripotent stem cell (iPSC) derived from a reprogrammed T-cell. In some embodiments, the source material may be an induced pluripotent stem cell (iPSC) derived from a T cell or non-T cell. The source material may be an embryonic stem cell. The source material may be a B cell, or any other cell from peripheral blood mononuclear cell isolates, hematopoietic progenitor, hematopoietic stem cell, mesenchymal stem cell, adipose stem cell, or any other somatic cell type.

Genetic Modification of Isolated Cells

The immune cells, such as T cells, can be genetically modified following isolation using known methods, or the immune cells can be activated and expanded (or differentiated in the case of progenitors) in vitro prior to being genetically modified. In some embodiments, the isolated immune cells are genetically modified to reduce or eliminate expression of endogenous TCRα and/or CD52. In some embodiments, the cells are genetically modified using gene editing technology (e.g., CRISPR/Cas9, a zinc finger nuclease (ZFN), a TALEN, a MegaTAL, a meganuclease) to reduce or eliminate expression of endogenous proteins (e.g., TCRα and/or CD52). In another embodiment, the immune cells, such as T cells, are genetically modified with the chimeric antigen receptors described herein (e.g., transduced with a viral vector comprising one or more nucleotide sequences encoding a CAR) and then are activated and/or expanded in vitro. Methods for activating and expanding T cells are known in the art and are described, for example, in U.S. Pat. Nos. 6,905,874; 6,867,041; 6,797,514; and PCT WO2012/079000, the contents of which are hereby incorporated by reference in their entirety. Generally, such methods include contacting PBMC or isolated T cells with a stimulatory molecule and a costimulatory molecule, such as anti-CD3 and anti-CD28 antibodies, generally attached to a bead or other surface, in a culture medium with appropriate cytokines, such as IL-2. Anti-CD3 and anti-CD28 antibodies attached to the same bead serve as a "surrogate" antigen presenting cell (APC). One example is The Dynabeads R system, a CD3/CD28 activator/stimulator system for physiological activation of human T cells. In other embodiments, the T cells may be activated and stimulated to proliferate with feeder cells and appropriate antibodies and cytokines using methods such as those described in U.S. Pat. Nos. 6,040,177; 5,827,642; and WO2012129514, the contents of which are hereby incorporated by reference in their entirety.

Certain methods for making the constructs and engineered immune cells of the disclosure are described in PCT application PCT/US15/14520, the contents of which are hereby incorporated by reference in their entirety.

It will be appreciated that PBMCs can further include other cytotoxic lymphocytes such as NK cells or NKT cells. An expression vector carrying the coding sequence of a chimeric receptor as disclosed herein can be introduced into a population of human donor T cells, NK cells or NKT cells. Successfully transduced T cells that carry the expression vector can be sorted using flow cytometry to isolate CD3 positive T cells and then further propagated to increase the number of these CAR expressing T cells in addition to cell activation using anti-CD3 antibodies and IL-2 or other methods known in the art as described elsewhere herein. Standard procedures are used for cryopreservation of T cells expressing the CAR for storage and/or preparation for use in a human subject. In one embodiment, the in vitro transduction, culture and/or expansion of T cells are performed in the absence of non-human animal derived products such as fetal calf serum and fetal bovine serum.

For cloning of polynucleotides, the vector may be introduced into a host cell (an isolated host cell) to allow replication of the vector itself and thereby amplify the copies of the polynucleotide contained therein. The cloning vectors may contain sequence components generally include, without limitation, an origin of replication, promoter sequences, transcription initiation sequences, enhancer sequences, and selectable markers. These elements may be selected as appropriate by a person of ordinary skill in the art. For example, the origin of replication may be selected to promote autonomous replication of the vector in the host cell.

In certain embodiments, the present disclosure provides isolated host cells containing the vector provided herein. The host cells containing the vector may be useful in expression or cloning of the polynucleotide contained in the vector. Suitable host cells can include, without limitation, prokaryotic cells, fungal cells, yeast cells, or higher eukaryotic cells such as mammalian cells. Suitable prokaryotic cells for this purpose include, without limitation, eubacteria, such as Gram-negative or Gram-positive organisms, for example, Enterobactehaceae such as Escherichia, e.g., *E. coli*, Enterobacter, Erwinia, Klebsiella, Proteus, Salmonella, e.g., *Salmonella typhimurium*, Serratia, e.g., *Serratia marcescans*, and Shigella, as well as Bacilli such as *B. subtilis* and *B. licheniformis*, Pseudomonas such as *P. aeruginosa*, and Streptomyces.

The vector can be introduced to the host cell using any suitable methods known in the art, including, without limitation, DEAE-dextran mediated delivery, calcium phosphate precipitate method, cationic lipids mediated delivery, liposome mediated transfection, electroporation, microprojectile bombardment, receptor-mediated gene delivery, delivery mediated by polylysine, histone, chitosan, and peptides. Standard methods for transfection and transformation of cells for expression of a vector of interest are well known in the art. In a further embodiment, a mixture of different expression vectors can be used in genetically modifying a donor population of immune effector cells wherein each vector encodes a different CAR as disclosed herein. The resulting transduced immune effector cells form a mixed population of engineered cells, with a proportion of the engineered cells expressing more than one different CARS.

In some embodiments, the vector comprises a lentiviral vector. The lentiviral vector comprising a CAR coding sequence can be introduced into a lentiviral packaging cell line and the lentivirus produced by the packaging cell line can be used for transduction of T cells to generate CAR-T cells. To make lentivirus encoding CARs, HEK-293T cells can be plated at 0.4 million cells per mL in 2 mL of DMEM (Gibco) supplemented with 10% FBS (Hyclone or JR Scientific) per well of a 6-well plate on Day 0. On Day 1, the lentivirus can be prepared by mixing together lentiviral packaging vectors 1.5 ug psPAX2, 0.5 ug pMD2G, and 0.5 ug of the appropriate transfer CAR vector in 250 uL Opti-MEM (Gibco) per well of the 6-well plate ("DNA mix"). 10 uL Lipofectamine 2000 (Invitrogen) in 250 uL Opti-MEM can be incubated at room temperature for 5 minutes and then added to the DNA mix. The mixture can be incubated at room temperature for 20 minutes and the total volume of 500 uL was slowly added to the sides of the wells containing HEK-293T. The general methods of CAR-containing lentivirus production and transduction are generally known in the art, for example, see Milone et al., Leukemia, 2018, 32:1529-1541; Sanber et al., Construction of stable packaging cell lines for clinical lentiviral vector production, Nature 2015, DOI: 10.1038; Roddie et al., Cytotherapy 2019, 21:327-340, all of which are incorporate herein by reference in their entireties. In one embodiment, the disclosure provides a method of storing genetically engineered cells expressing CARs or TCRs which target a CD19 protein. This involves cryopreserving the immune cells such that the cells remain viable upon thawing. A fraction of the immune cells expressing the CARs can be cryopreserved by methods known in the art to provide a permanent source of such cells for the future treatment of patients afflicted with a malignancy. When needed, the cryopreserved transformed immune cells can be thawed, grown and expanded for more such cells.

In some embodiments, the cells are formulated by first harvesting them from their culture medium, and then washing and concentrating the cells in a medium and container system suitable for administration (a "pharmaceutically acceptable" carrier) in a treatment-effective amount. Suitable infusion media can be any isotonic medium formulation, typically normal saline, Normosol™ R (Abbott) or Plasma-Lyte™ A (Baxter), but also 5% dextrose in water or Ringer's lactate can be utilized. The infusion medium can be supplemented with human serum albumin.

Allogeneic CAR T Cells

The process for manufacturing allogeneic CAR T therapy, or AlloCARS™, involves harvesting healthy, selected, screened and tested T cells from healthy donors. Next, the T cells are engineered to express CARs, which recognize certain cell surface proteins (e.g., CD19) that are expressed in hematologic or solid tumors. Allogeneic T cells are gene edited to reduce the risk of graft versus host disease (GvHD) and to prevent allogeneic rejection. A T cell receptor gene (e.g., TCRα, TCRβ) is knocked out to avoid GvHD. The CD52 gene can be knocked out to render the CAR T product resistant to anti-CD52 antibody treatment. Anti-CD52 antibody treatment can therefore be used to suppress the host immune system and allow the CAR T to stay engrafted to achieve full therapeutic impact. The engineered T cells then undergo a purification step and are ultimately cryopreserved in vials for delivery to patients.

Autologous CAR T Cells

Autologous chimeric antigen receptor (CAR) T cell therapy, involves collecting a patient's own cells (e.g., white blood cells, including T cells) and genetically engineering the T cells to express CARs that recognize target expressed on the cell surface of one or more specific cancer cells and kill cancer cells. The engineered cells are then cryopreserved and subsequently administered to the patient.

IV. Methods of Treatment

The disclosure comprises methods for treating or preventing a condition associated with undesired and/or elevated CD19 levels in a patient, comprising administering to a patient in need thereof an effective amount of at least one CAR, or immune-cell comprising a CAR disclosed herein.

Methods are provided for treating diseases or disorders, including cancer. In some embodiments, the disclosure relates to creating a T cell-mediated immune response in a subject, comprising administering an effective amount of the engineered immune cells of the present application to the subject. In some embodiments, the T cell-mediated immune response is directed against a target cell or cells. In some embodiments, the engineered immune cell comprises a chimeric antigen receptor (CAR). In some embodiments, the target cell is a tumor cell. In some aspects, the disclosure comprises a method for treating or preventing a malignancy, said method comprising administering to a subject in need thereof an effective amount of at least one isolated antigen binding domain described herein. In some aspects, the disclosure comprises a method for treating or preventing a malignancy, said method comprising administering to a subject in need thereof an effective amount of at least one immune cell, wherein the immune cell comprises at least one chimeric antigen receptor. T cell receptor, and/or isolated antigen binding domain as described herein.

The CAR containing immune cells of the disclosure can be used to treat malignancies involving aberrant expression of CD19. In some embodiments, CAR containing immune cells of the disclosure can be used to treat cancer. As used herein, the term "cancer" includes, but is not limited to, solid tumors and blood born tumors. The term "cancer" refers to disease of skin tissues, organs, blood, and vessels, including, but not limited to, cancers of the bladder, bone or blood, brain, breast, cervix, chest, colon, endometrium, esophagus, eye, head, kidney, liver, lymph nodes, lung, mouth, neck, ovaries, pancreas, prostate, rectum, stomach, testis, throat, and uterus. Specific cancers include, but are not limited to, advanced malignancy, amyloidosis, neuroblastoma, meningioma, hemangiopericytoma, multiple brain metastase, glioblastoma multiforms, glioblastoma, brain stem glioma, poor prognosis malignant brain tumor, malignant glioma, recurrent malignant giolma, anaplastic astrocytoma, anaplastic oligodendroglioma, neuroendocrine tumor, rectal adenocarcinoma, Dukes C & D colorectal cancer, unresectable colorectal carcinoma, metastatic hepatocellular carcinoma, Kaposi's sarcoma, karotype acute myeloblastic leukemia, Hodgkin lymphoma, non-Hodgkin lymphoma (NHL), cutaneous T-Cell lymphoma, cutaneous B-Cell lymphoma, diffuse large B-Cell lymphoma, low grade follicular lymphoma, malignant melanoma, malignant mesothelioma, malignant pleural effusion mesothelioma syndrome, peritoneal carcinoma, papillary serous carcinoma, gynecologic sarcoma, soft tissue sarcoma, scleroderma, cutaneous vasculitis, Langerhans cell histiocytosis, leiomyosarcoma, fibrodysplasia ossificans progressive, hormone refractory prostate cancer, resected high-risk soft tissue sarcoma, unrescectable hepatocellular carcinoma, Waldenstrom's macroglobulinemia, smoldering myeloma, indolent myeloma, fallopian tube cancer, androgen independent prostate cancer, androgen dependent stage IV non-metastatic prostate cancer, hormone-insensitive prostate cancer, chemotherapy-insensitive prostate cancer, papillary thyroid carcinoma, follicular thyroid carcinoma, medullary thyroid carcinoma, and leiomyoma. In a specific embodiment, the cancer is metastatic. In another embodiment, the cancer is refractory or resistance to chemotherapy or radiation.

In exemplary embodiments, the CAR containing immune cells, e.g., CAR-T cells of the disclosure, are used to treat NHL.

Also provided are methods for reducing the size of a tumor in a subject, comprising administering to the subject an engineered cell of the present disclosure to the subject, wherein the cell comprises a chimeric antigen receptor comprising a CD19 antigen binding domain and binds to a CD19 antigen on the tumor.

In some embodiments, the subject has a solid tumor, or a blood malignancy such as lymphoma or leukemia. In some embodiments, the engineered cell is delivered to a tumor bed. In some embodiments, the cancer is present in the bone marrow of the subject. In some embodiments, the engineered cells are autologous immune cells, e.g., autologous T cells. In some embodiments, the engineered cells are allogeneic immune cells, e.g., allogeneic T cells. In some embodiments, the engineered cells are heterologous immune cells, e.g., heterologous T cells. In some embodiments, the engineered cells of the present application are transfected or transduced in vivo. In other embodiments, the engineered cells are transfected or transduced ex vivo. As used herein, the term "in vitro cell" refers to any cell which is cultured ex vivo.

A "therapeutically effective amount," "effective dose," "effective amount," or "therapeutically effective dosage" of a therapeutic agent, e.g., engineered CART cells, is any amount that, when used alone or in combination with another therapeutic agent, protects a subject against the onset of a disease or promotes disease regression evidenced by a decrease in severity of disease symptoms, an increase in frequency and duration of disease symptom-free periods, or a prevention of impairment or disability due to the disease affliction. The ability of a therapeutic agent to promote disease regression can be evaluated using a variety of methods known to the skilled practitioner, such as in human subjects during clinical trials, in animal model systems predictive of efficacy in humans, or by assaying the activity of the agent in in vitro assays.

The terms "patient" and "subject" are used interchangeably and include human and non-human animal subjects as well as those with formally diagnosed disorders, those without formally recognized disorders, those receiving medical attention, those at risk of developing the disorders, etc.

The term "treat" and "treatment" includes therapeutic treatments, prophylactic treatments, and applications in which one reduces the risk that a subject will develop a disorder or other risk factor. Treatment does not require the complete curing of a disorder and encompasses embodiments in which one reduces symptoms or underlying risk factors. The term "prevent" does not require the 100% elimination of the possibility of an event. Rather, it denotes that the likelihood of the occurrence of the event has been reduced in the presence of the compound or method.

Desired treatment amounts of cells in the composition is generally at least 2 cells (for example, at least 1 CD8+ central memory T cell and at least 1 CD4+ helper T cell subset) or is more typically greater than $10^2$ cells, and up to $10^6$, up to and including $10^8$ or $10^9$ cells and can be more than $10^{10}$ cells. The number of cells will depend upon the desired use for which the composition is intended, and the type of cells included therein. The density of the desired cells is typically greater than $10^6$ cells/ml and generally is greater than $10^7$ cells/ml, generally $10^8$ cells/ml or greater. The clinically relevant number of immune cells can be apportioned into multiple infusions that cumulatively equal or exceed $10^5$, $10^6$, $10^7$, $10^8$, $10^9$, $10^{10}$, $10^{11}$, or $10^{12}$ cells. In some aspects of the present disclosure, particularly since all the infused cells will be redirected to a particular target antigen (CD19), lower numbers of cells, in the range of $10^6$/kilogram ($10^6$-$10^{11}$ per patient) may be administered. CAR treatments may be administered multiple times at dosages within these ranges. The cells may be autologous, allogeneic, or heterologous to the patient undergoing therapy.

In some embodiments, the therapeutically effective amount of the CAR T cells is about $1\times10^5$ cells/kg, about $2\times10^5$ cells/kg, about $3\times10^5$ cells/kg, about $4\times10^5$ cells/kg, about $5\times10^5$ cells/kg, about $6\times10^5$ cells/kg, about $7\times10^5$ cells/kg, about $8\times10^5$ cells/kg, about $9\times10^5$ cells/kg. $2\times10^6$ cells/kg, about $3\times10^6$ cells/kg, about $4\times10^6$ cells/kg, about $5\times10^6$ cells/kg, about $6\times10^6$ cells/kg, about $7\times10^6$ cells/kg, about $8\times10^6$ cells/kg, about $9\times10^6$ cells/kg, about $1\times10^7$ cells/kg, about $2\times10^7$ cells/kg, about $3\times10^7$ cells/kg, about $4\times10^7$ cells/kg, about $5\times10^7$ cells/kg, about $6\times10^7$ cells/kg, about $7\times10^7$ cells/kg, about $8\times10^7$ cells/kg, or about $9\times10^7$ cells/kg.

In some embodiments, target doses for CAR+/CAR-T+/TCR+ cells range from $1\times10^6$-$2\times10^8$ cells/kg, for example $2\times10^6$ cells/kg. It will be appreciated that doses above and below this range may be appropriate for certain subjects, and appropriate dose levels can be determined by the healthcare provider as needed. Additionally, multiple doses of cells can be provided in accordance with the disclosure.

In some aspects, the disclosure comprises a pharmaceutical composition comprising at least one antigen binding domain as described herein and a pharmaceutically acceptable excipient. In some embodiments, the pharmaceutical composition further comprises an additional active agent.

The CAR expressing cell populations of the present disclosure may be administered either alone, or as a pharmaceutical composition in combination with diluents and/or with other components such as IL-2 or other cytokines or cell populations. Pharmaceutical compositions of the present disclosure may comprise a CAR or TCR expressing cell population, such as T cells, as described herein, in combination with one or more pharmaceutically or physiologically acceptable carriers, diluents or excipients. Such compositions may comprise buffers such as neutral buffered saline, phosphate buffered saline and the like; carbohydrates such as glucose, mannose, sucrose or dextrans, mannitol; proteins; polypeptides or amino acids such as glycine; antioxidants; chelating agents such as EDTA or glutathione; adjuvants (e.g., aluminum hydroxide); and preservatives. Compositions of the present disclosure are preferably formulated for intravenous administration.

The pharmaceutical compositions (solutions, suspensions or the like), may include one or more of the following: sterile diluents such as water for injection, saline solution, preferably physiological saline, Ringer's solution, isotonic sodium chloride, fixed oils such as synthetic mono- or diglycerides which may serve as the solvent or suspending medium, polyethylene glycols, glycerin, propylene glycol or other solvents; antibacterial agents such as benzyl alcohol or methyl paraben; antioxidants such as ascorbic acid or sodium bisulfite; chelating agents such as ethylenediaminetetraacetic acid; buffers such as acetates, citrates or phosphates and agents for the adjustment of tonicity such as sodium chloride or dextrose. The parenteral preparation can be enclosed in ampoules, disposable syringes or multiple dose vials made of glass or plastic. An injectable pharmaceutical composition is preferably sterile.

In some embodiments, upon administration to a patient, engineered immune cells expressing at their cell surface any one of the CD19-specific CARs described herein may reduce, kill or lyse endogenous CD19-expressing cells of the patient. In one embodiment, a percentage reduction or lysis of CD19-expressing endogenous cells or cells of a cell line expressing CD19 by engineered immune cells expressing any one of the CD19-specific CARs described herein is at least about or greater than 10%, 15%, 20%, 25%, 30%, 35%, 40%, 45%, 50%, 55%, 60%, 65%, 70%, 75%, 80%, 85%, 90%, or 95%. In one embodiment, a percentage reduction or lysis of CD19-expressing endogenous cells or cells of a cell line expressing CD19 by engineered immune cells expressing any one of the CD19-specific CARs described herein is about 5% to about 95%, about 10% to about 95%, about 10% to about 90%, about 10% to about 80%, about 10% to about 70%, about 10% to about 60%, about 10% to about 50%, about 10% to about 40%, about 20% to about 90%, about 20% to about 80%, about 20% to about 70%, about 20% to about 60%, about 20% to about 50%, about 25% to about 75%, or about 25% to about 60%. In one embodiment, the endogenous CD19-expressing cells are endogenous CD19-expressing bone marrow cells.

In one embodiment, the percent reduction or lysis of target cells, e.g., a cell line expressing CD19, by engineered immune cells expressing at their cell surface membrane a CD19-specific CAR of the disclosure can be measured using the assay disclosed herein.

The methods can further comprise administering one or more chemotherapeutic agent. In certain embodiments, the chemotherapeutic agent is a lymphodepleting (preconditioning) chemotherapeutic. For example, methods of conditioning a patient in need of a T cell therapy comprising administering to the patient specified beneficial doses of cyclophosphamide (between 200 mg/m$^2$/day and 2000 mg/m$^2$/day, about 100 mg/m$^2$/day and about 2000 mg/m$^2$/day; e.g., about 100 mg/m$^2$/day, about 200 mg/m$^2$/day, about 300 mg/m$^2$/day, about 400 mg/m$^2$/day, about 500 mg/m$^2$/day, about 600 mg/m$^2$/day, about 700 mg/m$^2$/day, about 800 mg/m$^2$/day, about 900 mg/m$^2$/day, about 1000 mg/m$^2$/day, about 1500 mg/m$^2$/day or about 2000 mg/m$^2$/day) and specified doses of fludarabine (between 20 mg/m$^2$/day and 900 mg/m$^2$/day, between about 10 mg/m$^2$/day and about 900 mg/m$^2$/day; e.g., about 10 mg/m$^2$/day, about 20 mg/m$^2$/day, about 30 mg/m$^2$/day, about 40 mg/m$^2$/day, about 40 mg/m$^2$/day, about 50 mg/m$^2$/day, about 60 mg/m$^2$/day, about 70 mg/m$^2$/day, about 80 mg/m$^2$/day, about 90 mg/m$^2$/day, about 100 mg/m$^2$/day, about 500 mg/m$^2$/day or about 900 mg/m$^2$/day). A preferred dose regimen involves treating a patient comprising administering daily to the patient about 300 mg/m$^2$/day of cyclophosphamide and about 30 mg/m$^2$/day of fludarabine for three days prior to administration of a therapeutically effective amount of engineered T cells to the patient.

In some embodiments, lymphodepletion further comprises administration of a CD52 antibody. In some embodiments, the CD52 antibody is administered at a dose of about 13 mg/day IV.

In other embodiments, the antigen binding domain, transduced (or otherwise engineered) cells and the chemotherapeutic agent are administered each in an amount effective to treat the disease or condition in the subject.

In certain embodiments, compositions comprising CAR-expressing immune effector cells disclosed herein may be administered in conjunction with any number of chemotherapeutic agents. Examples of chemotherapeutic agents include alkylating agents such as thiotepa and cyclophosphamide (CYTOXAN™); alkyl sulfonates such as busulfan, improsulfan and piposulfan; aziridines such as benzodopa, carboquone, meturedopa, and uredopa; ethylenimines and methylamelamines including altretamine, triethylenemelamine, trictylenephosphoramide, triethylenethiophosphaoramide and trimethylolomelamine resume; nitrogen mustards such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, ranimustine; antibiotics such as aclacinomysins, actinomycin, authramycin, azaserine, bleomycins, cactinomycin, calicheamicin, carabicin, carminomycin, carzinophilin, chromomycins, dactinomycin, daunorubicin, detorubicin, 6-diazo-5-oxo-L-norleucine, doxorubicin, epirubicin, esorubicin, idarubicin, marcellomycin, mitomycins, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogues such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine, 5-FU; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; amsacrine; bestrabucil; bisantrene; edatraxate; defofamine; demecolcine; diaziquone; elformithine; elliptinium acetate; ctoglucid; gallium nitrate; hydroxyurea; lentinan; lonidamine; mitoguazone; mitoxantrone; mopidamol; nitracrine; pentostatin; phenamet; pirarubicin; podophyllinic acid; 2-ethylhydrazide; procarbazine; PSK®; razoxane; sizofiran; spirogermanium;

tenuazonic acid: triaziquone: 2, 2', 2"-trichlorotriethylamine; urethan; vindesine; dacarbazine; mannomustine: mitobronitol: mitolactol: pipobroman: gacytosine: arabinoside ("Ara-C"); cyclophosphamide; thiotepa; taxoids, e.g., paclitaxel (TAXOL™, Bristol-Myers Squibb) and doxetaxel (TAXOTERE®, Rhone-Poulenc Rorer); chlorambucil; gemcitabine; 6-thioguanine; mercaptopurine; methotrexate; platinum analogs such as cisplatin and carboplatin; vinblastine; platinum; etoposide (VP-16); ifosfamide; mitomycin C; mitoxantrone; vincristine; vinorelbine; navelbine; novantrone; teniposide; daunomycin; aminopterin; xeloda; ibandronate; CPT-11; topoisomerase inhibitor RF S2000; difluoromethylomithine (DMFO); retinoic acid derivatives such as Targretin™ (bexarotene), Panretin™, (alitretinoin): ONTAK™ (denileukin diftitox); esperamicins; capecitabine; and pharmaceutically acceptable salts, acids or derivatives of any of the above. Also included in this definition are anti-hormonal agents that act to regulate or inhibit hormone action on tumors such as anti-estrogens including for example tamoxifen, raloxifene, aromatase inhibiting 4(5)-imidazoles, 4-hydroxytamoxifen, trioxifene, keoxifene, LY117018, onapristone, and toremifene (Fareston); and anti-androgens such as flutamide, nilutamide, bicalutamide, leuprolide, and goserelin; and pharmaceutically acceptable salts, acids or derivatives of any of the above. Combinations of chemotherapeutic agents are also administered where appropriate, including, but not limited to CHOP, i.e., Cyclophosphamide (Cytoxan®), Doxorubicin (hydroxydoxorubicin), Vincristine (Oncovin®), and Prednisone.

In some embodiments, the chemotherapeutic agent is administered at the same time or within one week after the administration of the engineered cell, polypeptide, or nucleic acid. In other embodiments, the chemotherapeutic agent is administered from 1 to 4 weeks or from 1 week to 1 month, 1 week to 2 months, 1 week to 3 months, 1 week to 6 months, 1 week to 9 months, or 1 week to 12 months after the administration of the engineered cell, polypeptide, or nucleic acid. In other embodiments, the chemotherapeutic agent is administered at least 1 month before administering the cell, polypeptide, or nucleic acid. In some embodiments, the methods further comprise administering two or more chemotherapeutic agents.

A variety of additional therapeutic agents may be used in conjunction with the compositions described herein. For example, potentially useful additional therapeutic agents include PD-1 inhibitors such as nivolumab (Opdivo®), pembrolizumab (Keytruda®), pembrolizumab, pidilizumab, and atezolizumab.

Additional therapeutic agents suitable for use in combination with the disclosure include, but are not limited to, ibrutinib (Imbruvica®), ofatumumab (Arzerra®, rituximab (Rituxan®), bevacizumab (Avastin®), trastuzumab (Herceptin®), trastuzumab emtansine (KADCYLA®, imatinib (Gleevec®), cetuximab (Erbitux®, panitumumab) (Vectibix®), catumaxomab, ibritumomab, ofatumumab, tositumomab, brentuximab, alemtuzumab, gemtuzumab, erlotinib, gefitinib, vandetanib, afatinib, lapatinib, neratinib, axitinib, masitinib, pazopanib, sunitinib, sorafenib, toceranib, lestaurtinib, axitinib, cediranib, lenvatinib, nintedanib, pazopanib, regorafenib, semaxanib, sorafenib, sunitinib, tivozanib, toceranib, vandetanib, entrectinib, cabozantinib, imatinib, dasatinib, nilotinib, ponatinib, radotinib, bosutinib, lestaurtinib, ruxolitinib, pacritinib, cobimetinib, selumetinib, trametinib, binimetinib, alectinib, ceritinib, crizotinib, aflibercept, adipotide, denileukin diftitox, mTOR inhibitors such as Everolimus and Temsirolimus, hedgehog inhibitors such as sonidegib and vismodegib, CDK inhibitors such as CDK inhibitor (palbociclib).

In some embodiments, the composition comprising CAR-containing immune cells may be administered with a therapeutic regimen to prevent cytokine release syndrome (CRS) or neurotoxicity. The therapeutic regimen to prevent cytokine release syndrome (CRS) or neurotoxicity may include lenzilumab, tocilizumab, atrial natriuretic peptide (ANP), anakinra, iNOS inhibitors (e.g., L-NIL or 1400 W). In additional embodiments, the composition comprising CAR-containing immune cells can be administered with an anti-inflammatory agent. Anti-inflammatory agents or drugs include, but are not limited to, steroids and glucocorticoids (including betamethasone, budesonide, dexamethasone, hydrocortisone acetate, hydrocortisone, hydrocortisone, methylprednisolone, prednisolone, prednisone, triamcinolone), nonsteroidal anti-inflammatory drugs (NSAIDS) including aspirin, ibuprofen, naproxen, methotrexate, sulfasalazine, leflunomide, anti-TNF medications, cyclophosphamide and mycophenolate. Exemplary NSAIDs include ibuprofen, naproxen, naproxen sodium, Cox-2 inhibitors, and sialylates. Exemplary analgesics include acetaminophen, oxycodone, tramadol of proporxyphene hydrochloride. Exemplary glucocorticoids include cortisone, dexamethasone, hydrocortisone, methylprednisolone, prednisolone, or prednisone. Exemplary biological response modifiers include molecules directed against cell surface markers (e.g., CD4, CD5, etc.), cytokine inhibitors, such as the TNF antagonists, (e.g., etanercept (ENBREL®), adalimumab (HUMIRA®) and infliximab (REMICADE®), chemokine inhibitors and adhesion molecule inhibitors. The biological response modifiers include monoclonal antibodies as well as recombinant forms of molecules. Exemplary DMARDs include azathioprine, cyclophosphamide, cyclosporine, methotrexate, penicillamine, leflunomide, sulfasalazine, hydroxychloroquine, Gold (oral (auranofin) and intramuscular) and minocycline.

In certain embodiments, the compositions described herein are administered in conjunction with a cytokine. Examples of cytokines are lymphokines, monokines, and traditional polypeptide hormones. Included among the cytokines are growth hormones such as human growth hormone, N-methionyl human growth hormone, and bovine growth hormone; parathyroid hormone; thyroxine; insulin; proinsulin; relaxin; prorelaxin; glycoprotein hormones such as follicle stimulating hormone (FSH), thyroid stimulating hormone (TSH), and luteinizing hormone (LH); hepatic growth factor (HGF); fibroblast growth factor (FGF); prolactin; placental lactogen; mullerian-inhibiting substance; mouse gonadotropin-associated peptide; inhibin; activin; vascular endothelial growth factor; integrin; thrombopoietin (TPO); nerve growth factors (NGFs) such as NGF-beta; platelet-growth factor; transforming growth factors (TGFs) such as TGF-alpha and TGF-beta; insulin-like growth factor-I and -II; erythropoietin (EPO); osteoinductive factors; interferons such as interferon-alpha, beta, and -gamma; colony stimulating factors (CSFs) such as macrophage-CSF (M-CSF); granulocyte-macrophage-CSF (GM-CSF); and granulocyte-CSF (G-CSF); interleukins (ILs) such as IL-1, IL-1alpha, IL-2, IL-3, IL-4, IL-5, IL-6, IL-7, IL-8, IL-9, IL-10, IL-11, IL-12; IL-15, IL-21 a tumor necrosis factor such as TNF-alpha or TNF-beta; and other polypeptide factors including LIF and kit ligand (KL). As used herein, the term cytokine includes proteins from natural sources or from recombinant cell culture, and biologically active equivalents of the native sequence cytokines.

V. Methods of Sorting and Depletion

In some embodiments, provided are methods for in vitro sorting of a population of immune cells, wherein a subset of the population of immune cells comprises engineered immune cells expressing any one of the CD19-specific CARs comprising epitopes specific for monoclonal antibodies (e.g., exemplary mimotope sequences). The method comprises contacting the population of immune cells with a monoclonal antibody specific for the epitopes and selecting the immune cells that bind to the monoclonal antibody to obtain a population of cells enriched in engineered immune cells expressing the CD19-specific CAR.

In some embodiments, said monoclonal antibody specific for said epitope is optionally conjugated to a fluorophore. In this embodiment, the step of selecting the cells that bind to the monoclonal antibody can be done by Fluorescence Activated Cell Sorting (FACS).

In some embodiments, said monoclonal antibody specific for said epitope is optionally conjugated to a magnetic particle. In this embodiment, the step of selecting the cells that bind to the monoclonal antibody can be done by Magnetic Activated Cell Sorting (MACS).

In some embodiments, the mAb used in the method for sorting immune cells expressing the CAR is chosen from alemtuzumab, ibritumomab tiuxetan, muromonab-CD3, tositumomab, abciximab, basiliximab, brentuximab vedotin, cetuximab, infliximab, rituximab, bevacizumab, certolizumab pegol, daclizumab, eculizumab, efalizumab, gemtuzumab, natalizumab, omalizumab, palivizumab, ranibizumab, tocilizumab, trastuzumab, vedolizumab, adalimumab, belimumab, canakinumab, denosumab, golimumab, ipilimumab, ofatumumab, panitumumab, QBEND-10 and/or ustekinumab. In some embodiments, said mAb is rituximab. In another embodiment, said mAb is QBEND-10.

In some embodiments, the population CAR-expressing immune cells obtained when using the method for in vitro sorting CAR-expressing immune cells described above, comprises at least 70%, 75%, 80%, 85%, 90%, 95% of CAR-expressing immune cells. In some embodiments, the population of CAR-expressing immune cells obtained when using the method for in vitro sorting CAR-expressing immune cells, comprises at least 85% CAR-expressing immune cells.

In some embodiments, the population of CAR-expressing immune cells obtained when using the method for in vitro sorting CAR-expressing immune cells described above shows increased cytotoxic activity in vitro compared with the initial (non-sorted) cell population. In some embodiments, said cytotoxic activity in vitro is increased by 10%, 20%, 30% or 50%. In some embodiments, the immune cells are T-cells.

In some embodiments, the mAbs are previously bound onto a support or surface. Non-limiting examples of solid support may include a bead, agarose bead, a magnetic bead, a plastic welled plate, a glass welled plate, a ceramic welled plate, a column, or a cell culture bag.

The CAR-expressing immune cells to be administered to the recipient may be enriched in vitro from the source population. Methods of expanding source populations may include selecting cells that express an antigen such as CD34 antigen, using combinations of density centrifugation, immuno-magnetic bead purification, affinity chromatography, and fluorescent activated cell sorting.

Flow cytometry may be used to quantify specific cell types within a population of cells. In general, flow cytometry is a method for quantitating components or structural features of cells primarily by optical means. Since different cell types can be distinguished by quantitating structural features, flow cytometry and cell sorting can be used to count and sort cells of different phenotypes in a mixture.

A flow cytometry analysis involves two primary steps: 1) labeling selected cell types with one or more labeled markers, and T) determining the number of labeled cells relative to the total number of cells in the population. In some embodiments, the method of labeling cell types includes binding labeled antibodies to markers expressed by the specific cell type. The antibodies may be either directly labeled with a fluorescent compound or indirectly labeled using, for example, a fluorescent-labeled second antibody which recognizes the first antibody.

In some embodiments, the method used for sorting T cells expressing CAR is the Magnetic-Activated Cell Sorting (MACS). Magnetic-activated cell sorting (MACS) is a method for separation of various cell populations depending on their surface antigens (CD molecules) by using superparamagnetic nanoparticles and columns. MACS may be used to obtain a pure cell population. Cells in a single-cell suspension may be magnetically labeled with microbeads. The sample is applied to a column composed of ferromagnetic spheres, which are covered with a cell-friendly coating allowing fast and gentle separation of cells. The unlabeled cells pass through while the magnetically labeled cells are retained within the column. The flow-through can be collected as the unlabeled cell fraction. After a washing step, the column is removed from the separator, and the magnetically labeled cells are eluted from the column.

Detailed protocol for the purification of specific cell population such as T-cell can be found in Basu S et al. (2010). (Basu S, Campbell H M, Dittel B N, Ray A. Purification of specific cell population by fluorescence activated cell sorting (FACS). J Vis Exp. (41): 1546).

In some aspects, the present disclosure provides a method for depleting CD19 specific CAR-expressing immune cells by in vivo depletion, in vivo depletion may include the administration of a treatment (e.g., a molecule that binds an epitope on the CAR) to a mammalian organism aiming to stop the proliferation of the CAR-expressing immune cells by inhibition or elimination.

One aspect of the invention is related to a method for in vivo depleting an engineered immune cell expressing a CD19 CAR comprising a mAb specific epitope, comprising contacting said engineered immune cell or said CAR-expressing immune cell with at least one epitope-specific mAb. Another aspect of the invention relates to a method for in vivo depleting CAR-expressing immune cell which comprises a chimeric scFv (e.g., formed by insertion of a mAb-specific epitope) by contacting said engineered immune cell with epitope-specific antibodies. In some embodiments, the immune cells are T-cells and/or the antibodies are monoclonal.

According to one embodiment, the in vivo depletion of the immune engineered cells is performed on engineered immune cells which has been previously sorted using the in vitro method of the present invention. In this case, the same infused mAb may be used. In some embodiments, the mAb-specific antigen is CD20 antigen and the epitope-specific mAb is rituximab. In some embodiments, the invention relates to a method for in vivo depleting an engineered immune cell expressing a CAR comprising an mAb-specific epitope (CAR-expressing immune cell) in a patient comprising contacting said CAR-expressing immune cell with at least one epitope-specific mAb In some embodiments, the step of contacting said engineered immune cell or said CAR-expressing immune cell with at least one epitope-specific mAb comprises infusing the patient with epitope-specific mAb (e.g., rituximab). In some embodiments, the amount of epitope-specific mAb administered to the patient is sufficient to eliminate at least 20%, 30%, 40%, 50%, 60%, 70%, 80% or 90% of the CAR-expressing immune cell in the patient.

In some embodiments, the step of contacting said engineered immune cell or said CAR-expressing immune cell with at least one epitope-specific mAb comprises infusing the patient with 375 mg/m$^2$ of rituximab, once or several times. In some embodiments, the mAb (e.g., rituximab) is administered once weekly.

In some embodiments, when immune cells expressing a CAR comprising an mAb-specific epitope (CAR-expressing immune cells) are depleted in a complement dependent cytotoxicity (CDC) assay using epitope-specific mAb, the amount of viable CAR-expressing immune cells decreases. In some embodiments, the amount of viable CAR-expressing immune cells decreases by at least 10%, 20%, 30%, 40%, 50%, 60%, 70%, 80% or 90%. In some embodiments, said mAb-specific epitope is a CD20 epitope or mimotope and/or the epitope-specific mAb is rituximab.

In certain embodiments, the in vivo depletion of CAR-engineered immune cells is performed by infusing bi-specific antibodies. By definition, a bispecific monoclonal antibody (BsAb) is an artificial protein that is composed of fragments of two different monoclonal antibodies and consequently binds to two different types of antigen. These BsAbs and their use in immunotherapy have been reviewed in Muller D and Kontermann R. E. (2010) Bispecific Antibodies for Cancer Immunotherapy, BioDrugs 24 (2): 89-98.

According to another particular embodiment, the infused bi-specific mAb is able to bind both the mAb-specific epitope borne on engineered immune cells expressing the chimeric scFv and to a surface antigen on an effector and cytotoxic cell (e.g., immune cells such as lymphocytes, macrophages, dendritic cells, natural killer cells (NK Cell), cytotoxic T lymphocytes (CTL)). By doing so, the depletion of engineered immune cells triggered by the BsAb may occur through antibody-dependent cellular cytotoxicity (ADCC). (Deo Y M. Sundarapandiyan K. Keler T, Wallace P K, and Graziano R F. (2000), Journal of Immunology, 165 (10):5954-5961]).

In some embodiments, a cytotoxic drug is coupled to the epitope-specific mAbs which may be used to deplete CAR-expressing immune cells. By combining targeting capabilities of monoclonal antibodies with the cancer-killing ability of cytotoxic drugs, antibody-drug conjugate (ADC) allows a sensitive discrimination between healthy and diseased tissue when compared to the use of the drug alone. Market approvals were received for several ADCs; the technology for making them, particularly the linkers, are described in (Payne, G. (2003) Cancer Cell 3:207-212; Trail et al (2003) Cancer Immunol. Immunother. 52:328-337; Syrigos and Epenetos (1999) Anticancer Research 19:605-614; Niculescu-Duvaz and Springer (1997) Adv. Drug Del. Rev. 26:151-172; U.S. Pat. No. 4,975,278).

In some embodiments, the epitope-specific mAb to be infused is conjugated beforehand with a molecule able to promote complement dependent cytotoxicity (CDC). Therefore, the complement system helps or complements the ability of antibodies to clear pathogens from the organism. When stimulated an activation cascade is triggered as a massive amplification of the response and activation of the cell-killing membrane attack complex. Different molecule may be used to conjugate the mAb, such as glycans [Courtois, A, Gac-Breton, S., Berthou, C, Guezennec, J., Bordron, A. and Boisset, C. (2012), Complement dependent cytotoxicity activity of therapeutic antibody fragments may be acquired by immunogenic glycan coupling, Electronic Journal of Biotechnology ISSN: 0717-3458; http://www.ejbiotechnology.info DOI: 10.2225/vol15-issue5).

VI. Kits and Articles of Manufacture

The present application provides kits comprising any one of the CD19 containing CARs or CD19 CAR containing immune cells described herein, and pharmaceutical compositions of the same. In some exemplary embodiments, a kit of the disclosure comprises allogeneic CD19 CAR-containing T-cells and a CD52 antibody for administering to the subject a lymphodepletion regiment and a CAR-T regimen.

The present application also provides articles of manufacture comprising any one of the therapeutic compositions or kits described herein. Examples of an article of manufacture include vials (e.g., sealed vials).

EXAMPLES

Example 1: Generation of Rituximab-Resistant CD19 CAR Immune Cells

Rituximab-resistant anti-CD19 chimeric antigen receptor constructs that do not express a rituximab binding site as shown in FIG. 1 and Table 4 were generated. The lentiviral vectors constructs were introduced into viral packaging cell line and anti-CD19 CAR containing lentiviruses were produced in-house.

Pan T cells from four human donors (541, 604, 410 and 2593) were thawed and activated at 1.5×10$^6$ cells/ml with Large-scale T Cell TransAct™ (1:15 ratio) in the presence of IL-2 (100 IU/ml). After 2 days 1.5×10$^6$ cells (in 3 ml) were transduced with 2 ml of fresh lentivirus comprising the vectors described in Table 4. Schematics of the modified vectors are shown in FIG. 1. IL-2 (100 IU/ml) was added on days 0, 2, 5, 7, 9 and 12. 6×10$^6$ total cells were transfered to a 6-well G-Rex plate on day 5 and media exchange performed on day 9 and 12. Cells were frozen on day 13.

TABLE 4

| Rituximab-resistant CD19 CAR vectors | |
|---|---|
| Vector: | Name: |
| anti-CD19 CAR v1.0 | pCLS-m4G7 CAR (with the RQR8 safety switch) |
| anti-CD19 CAR v1.1 | pCLS-4G7_CAR (same EF1a promoter sequence as in v1.0) |
| anti-CD19 CAR v1.2 | pCLS-EF1a(short)-4G7(co) |
| anti-CD19 CAR v1.3 | pCLS-(deltaRQR)8-4G7(co) (same EF1a promoter sequence as in v1.0) |
| anti-CD19 CAR v1.4 | pCLS-1Q8-4G7(co) (same EF1a promoter sequence as in v1.0) |
| anti-CD19 CAR v1.5 | pCLS-LQL8-4G7(co) (same EF1a promoter sequence as in v1.0) |
| anti-CD19 CAR v1.6 | pCLS-Q38-4G7(co) (same EF1a promoter sequence as in v1.0) | co = codon optimized

Figure 2A:
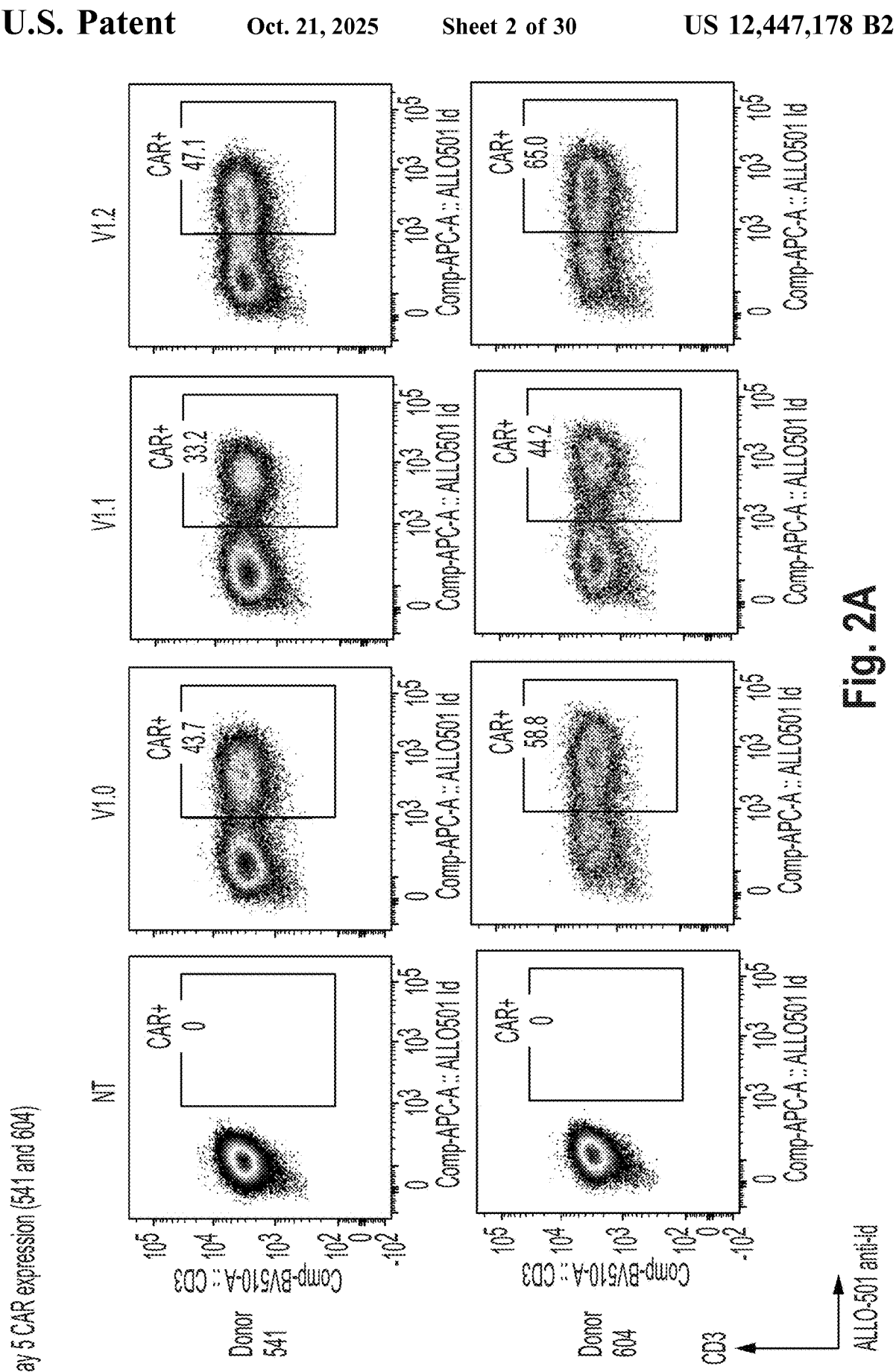
FIGS. 2A and 2B show flow cytometry plots demonstrating CAR expression on day 5 from Pan T cells transduced with the rituximab resistant CAR expression vectors.
Figure 2B:
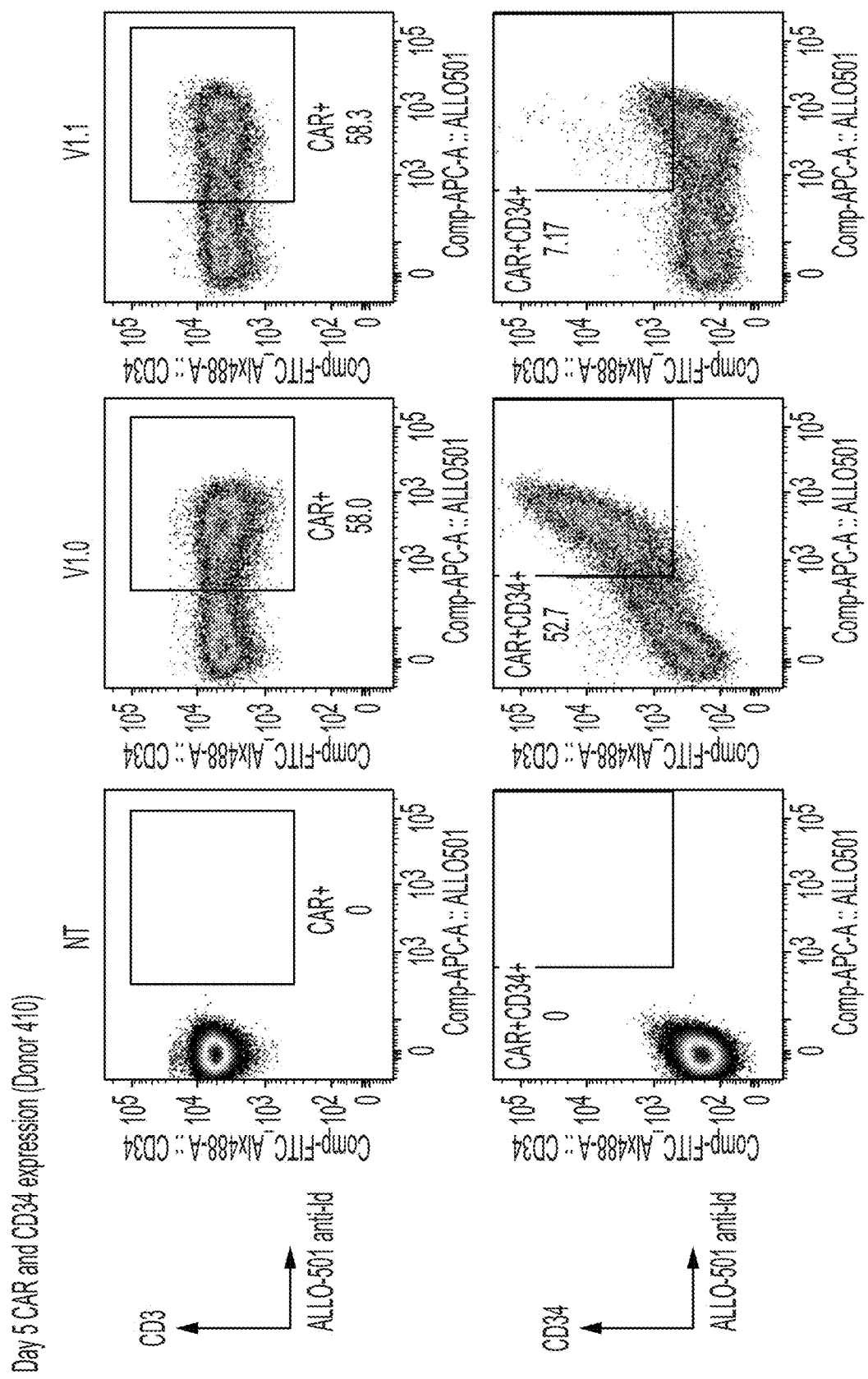

Flow cytometry experiments were performed on transduced cells gated on lymphocytes, live CD3+, CAR+, CD4/CD8 and downstream markers. A human transduction check and CD34 panel was performed on Day 5 and Day 13 using a panel of CD3, CD4, CD8, viability, CD34 and an anti-idiotype to antibody to the anti-CD19 CAR (4G7 anti-Id). FIGS. 2A and 2B show flow cytometry plots demonstrating CAR expression on day 5 from Pan T cells transduced with the CAR expression vectors shown in Table 4 using the anti-CD19 CAR anti-Id antibody.

Figure 3:
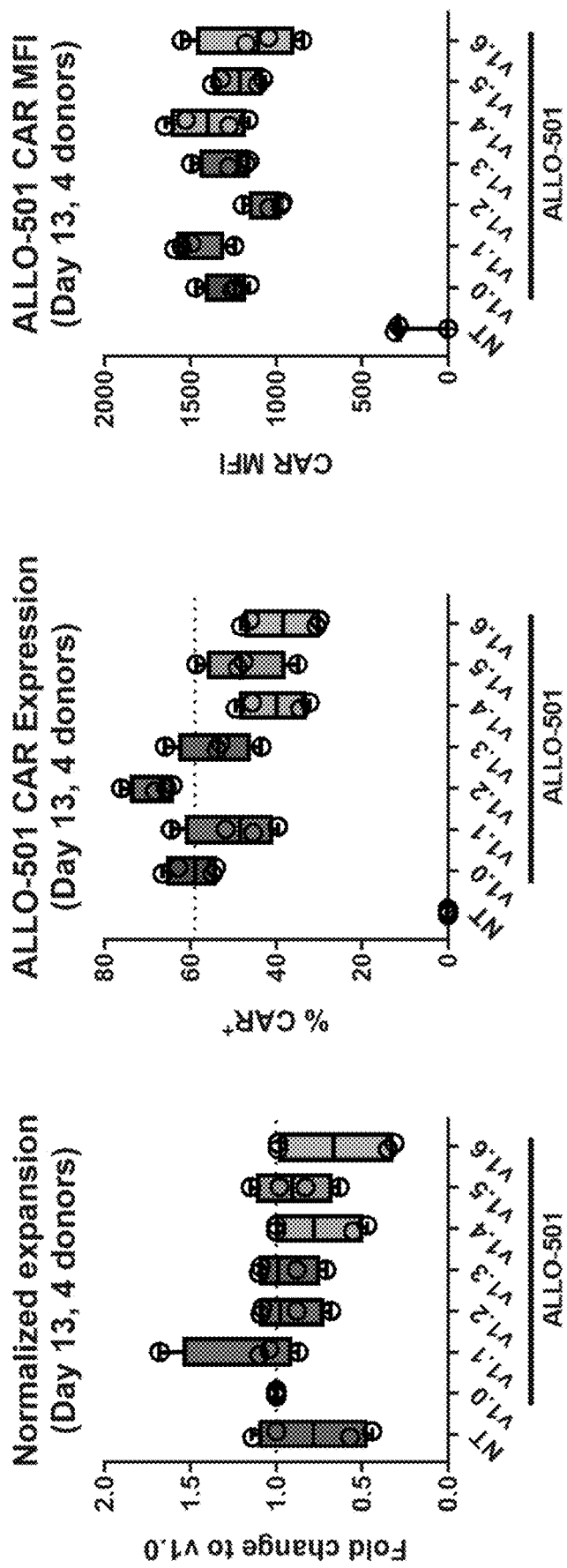
FIG. 3 shows normalized cell expansion and final CAR expression from all four donors on day 13.
Figure 4A:
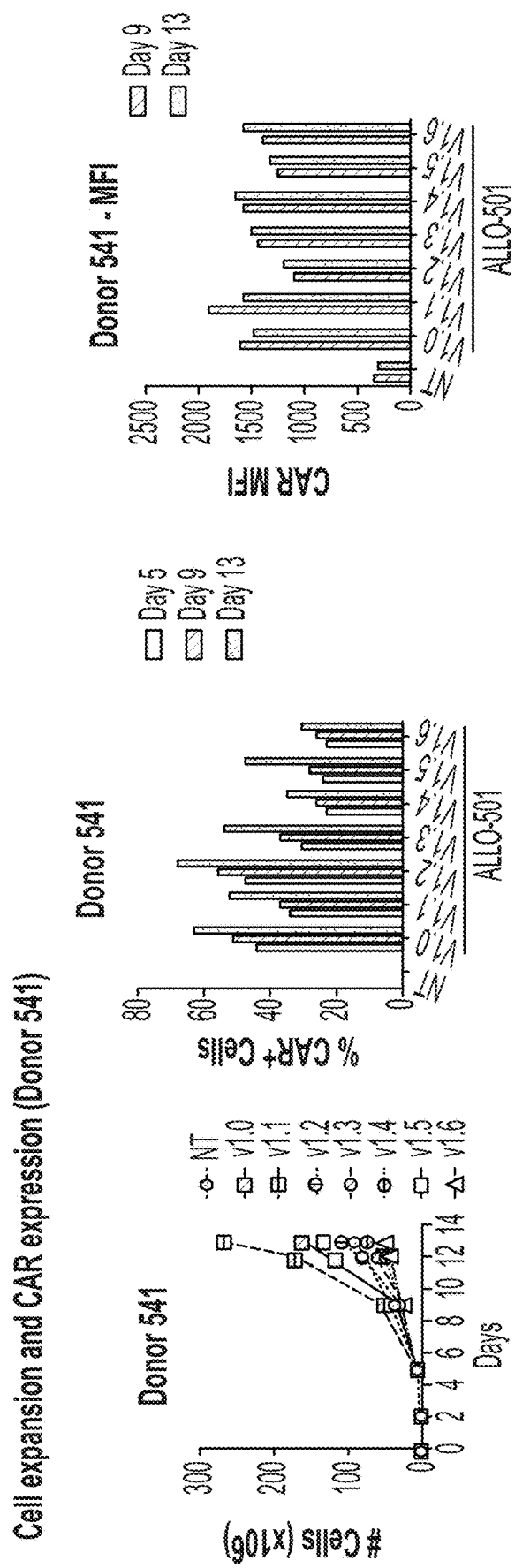
FIGS. 4A-4D show cell expansion and CAR expression over time of Pan T cells from donor 541 (FIG. 4A), 604 (FIG. 4B), 410 (FIG. 4C), 2593 (FIG. 4D) transduced with rituximab resistant CAR expression vectors.
Figure 4B:
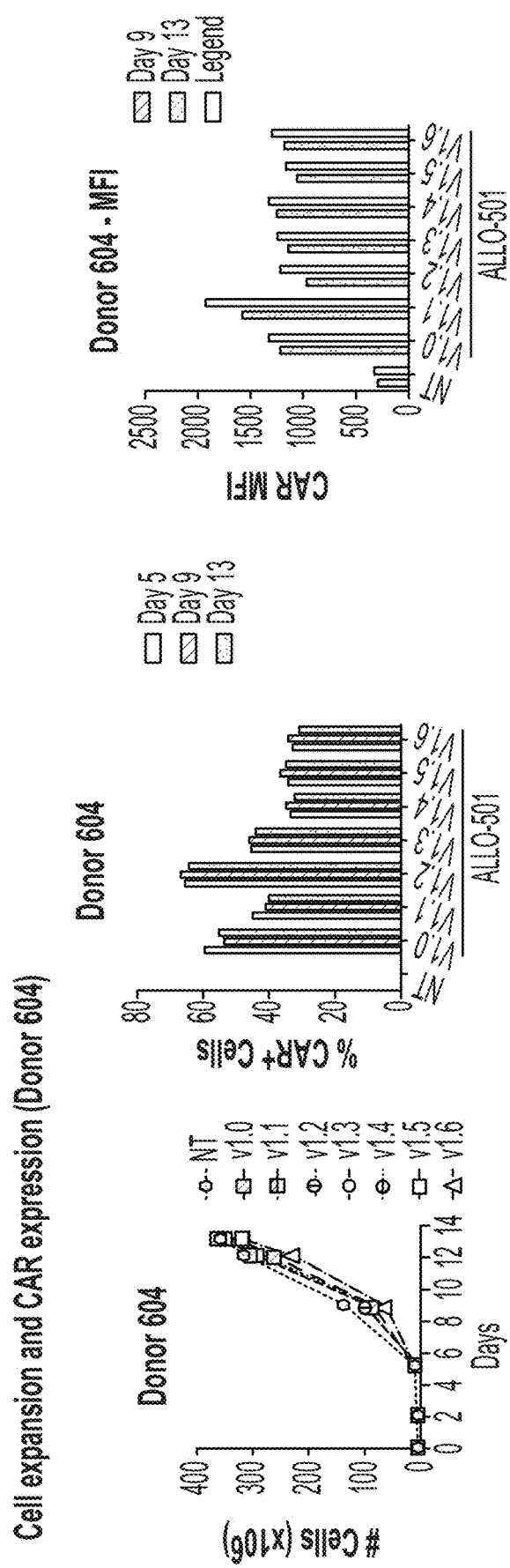
Figure 4C:
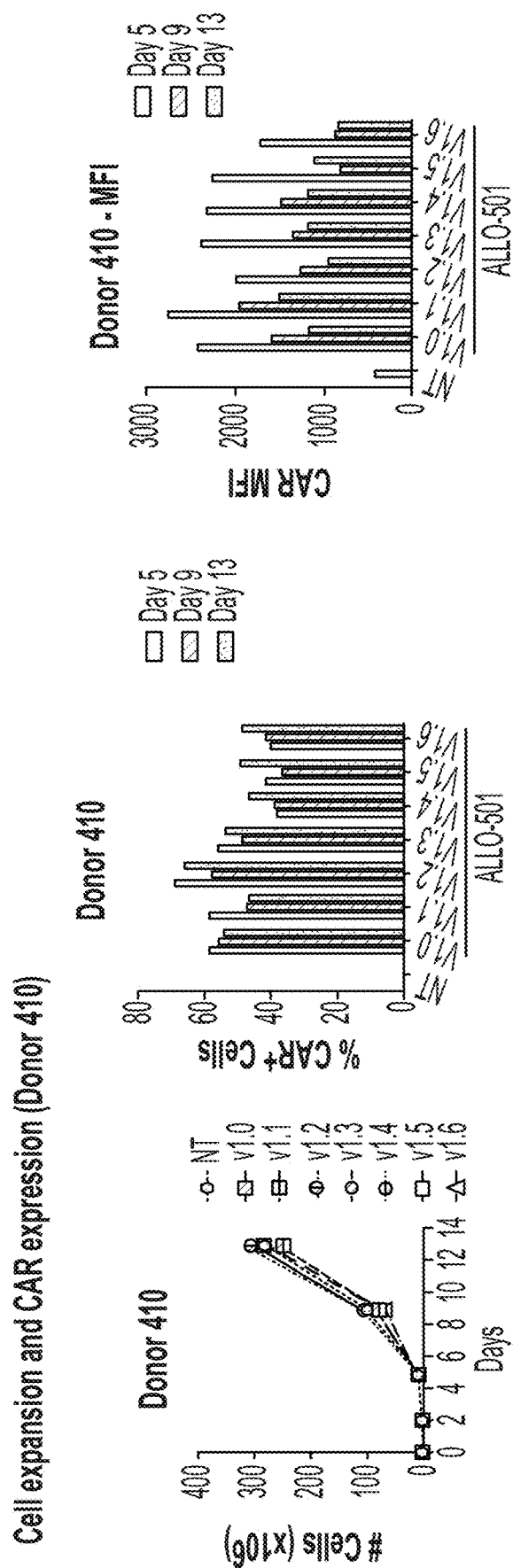
Figure 4D:
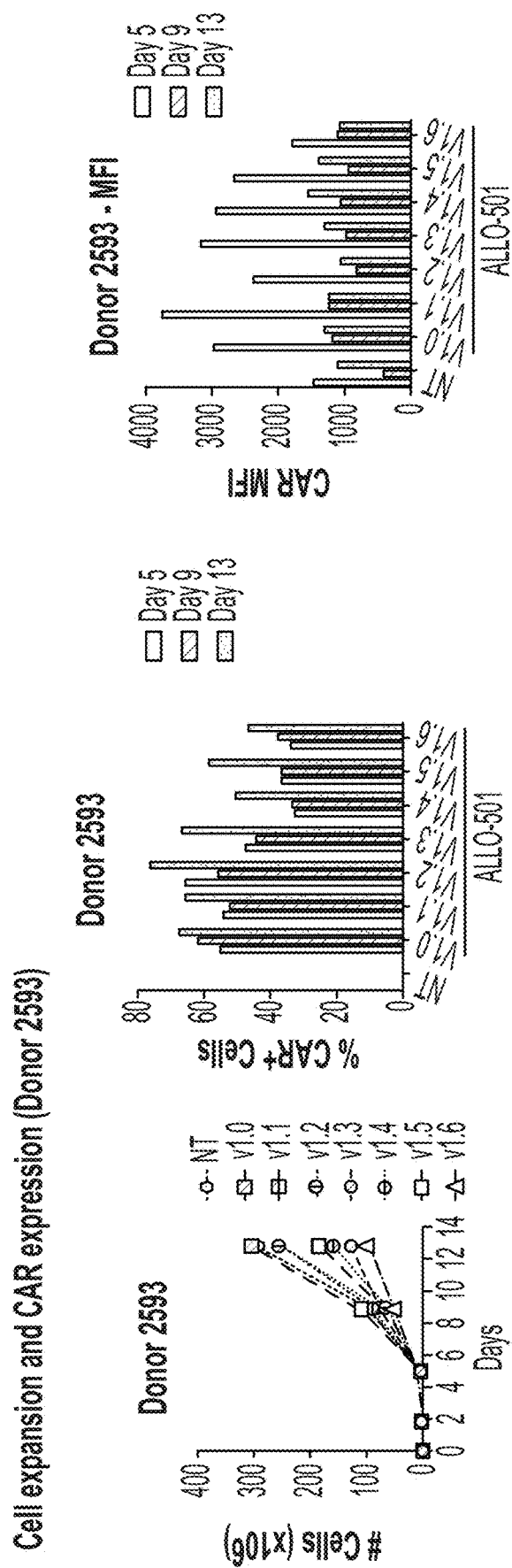

Flow cytometry with a human phenotype and activation panel was performed on day 9 and 13. The panel included CD3, CD4, CD8, viability, CD45RO, CD62L, CD25, 4-1BB, PD-1, an anti-idiotype to antibody to the anti-CD19 CAR, and TIM3. Cells were normalized for cell expansion and final CAR expression from all four donors on day 13 (FIG. 3). The data in FIG. 3 show that although v1.2 exhibited higher transduction rate (%CAR+), v1.2 transduced cells exhibited lower levels of CAR expression (CAR MFI), as compared to, e.g., v1.0 and v1.1. Cell expansion and CAR expression was monitored over time of the Pan T cells from donor 541 (FIG. 4A), 604 (FIG. 4B), 410 (FIG. 4C), 2593 (FIG. 4D) transduced with rituximab resistant CAR expression vectors.

Figure 5A:
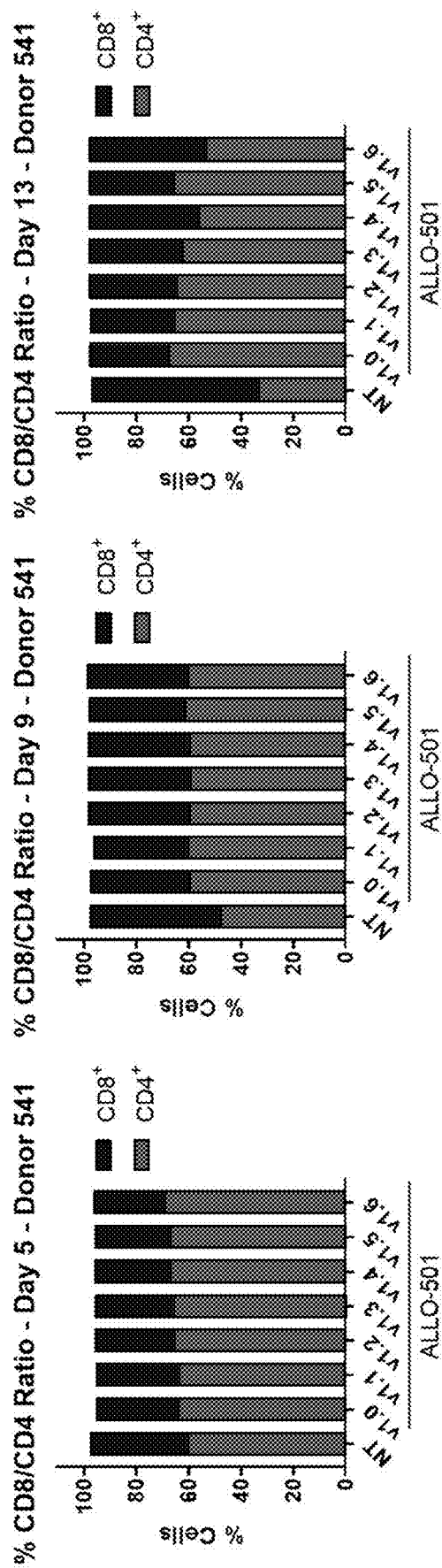
FIGS. 5A-5D show CD4/CD8 ratios on day 5, 9, and 13 of Pan T cells from donor 541 (FIG. 5A), 604 (FIG. 5B), 410 (FIG. 5C), 2593 (FIG. 5D) transduced with rituximab resistant CAR expression vectors.
Figure 5B:
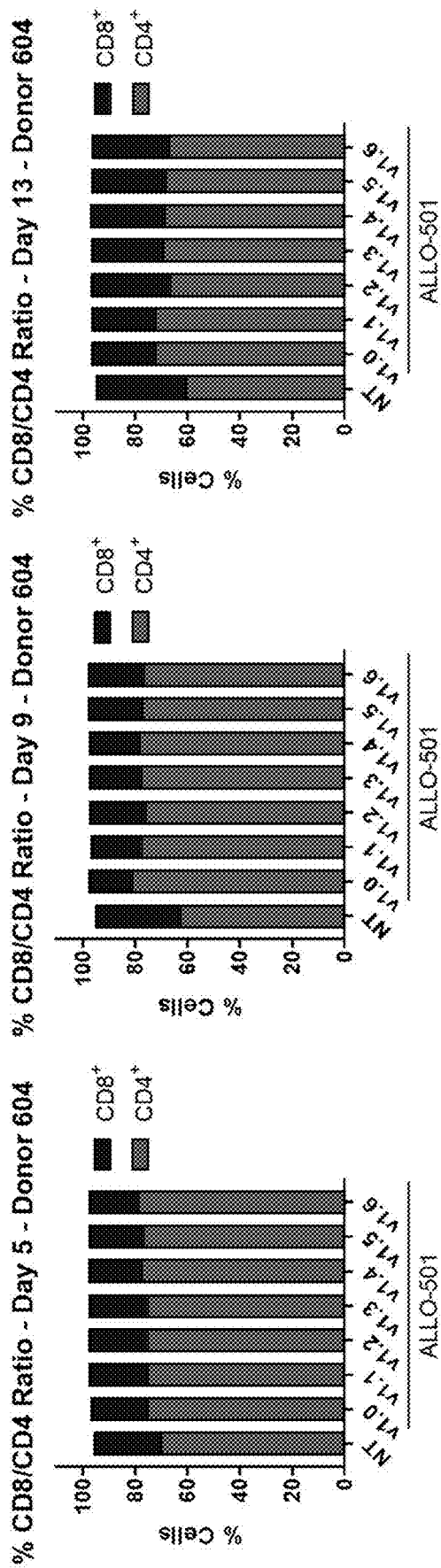
Figure 5C:
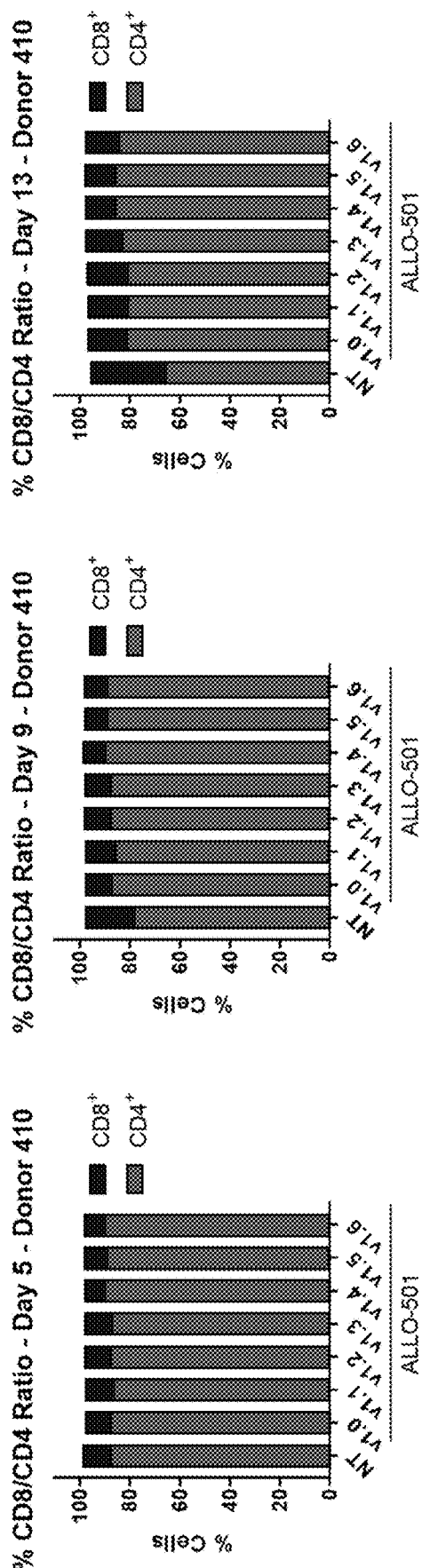
Figure 5D:
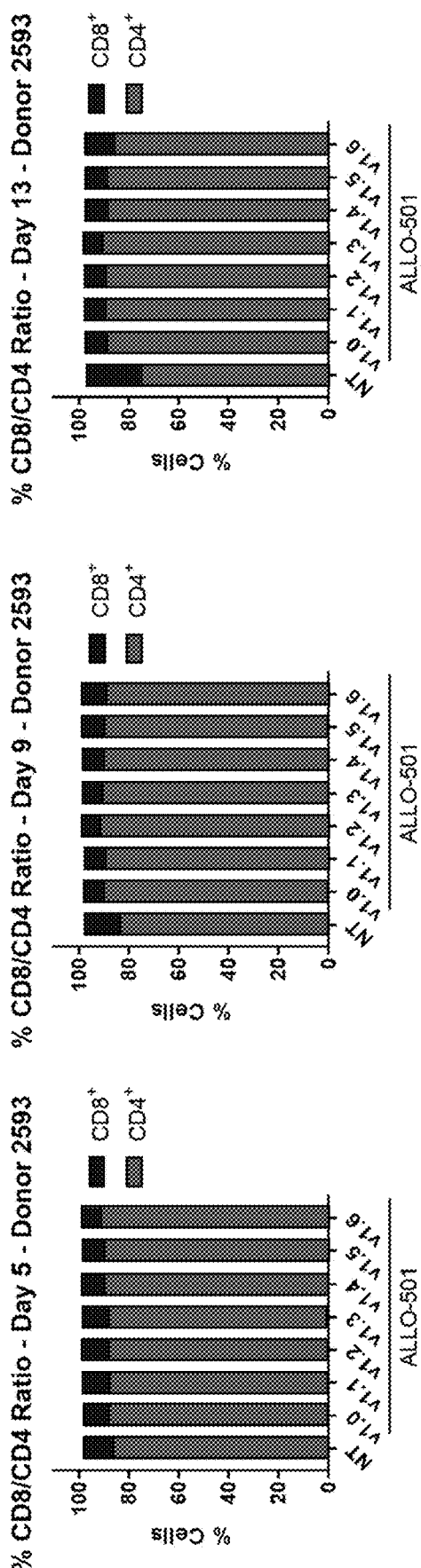
Figure 6A:
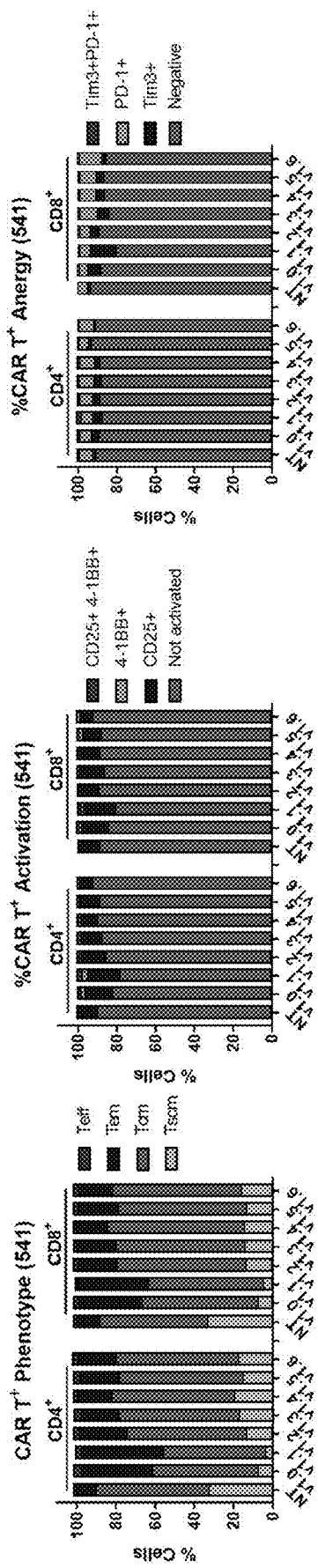
FIGS. 6A-6D show phenotype and activation on day 9 of Pan T cells from donor 541 (FIG. 6A), 604 (FIG. 6B), 410 (FIG. 6C), 2593 (FIG. 6D) transduced with rituximab resistant CAR expression vectors.
Figure 6B:
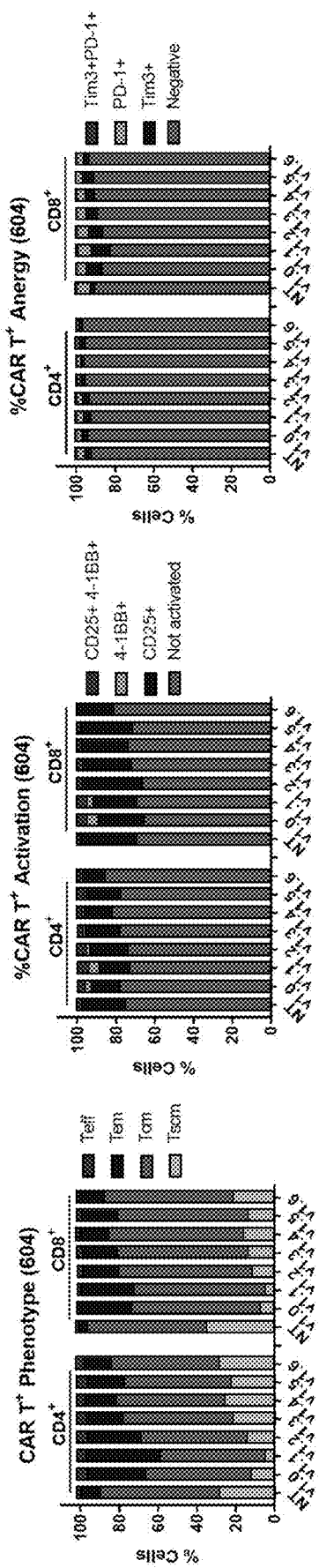
Figure 6C:
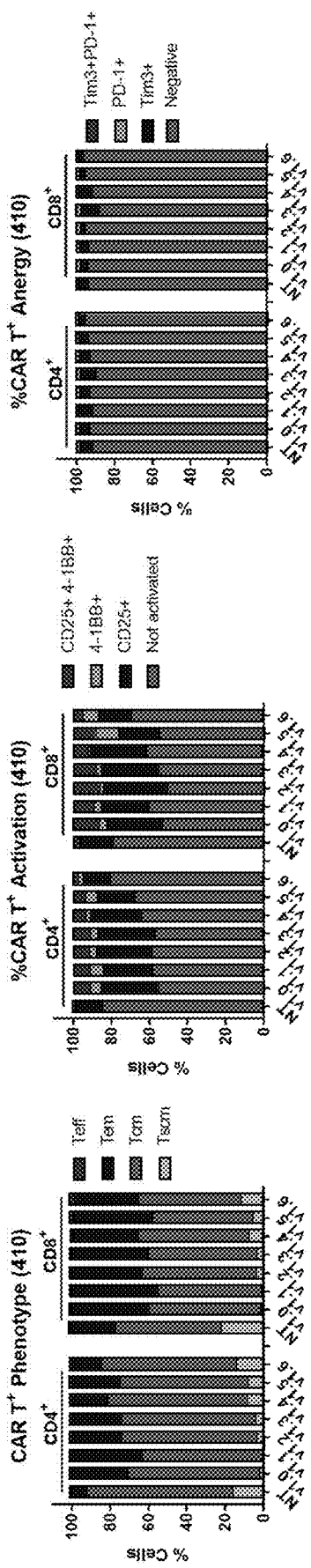
Figure 6D:
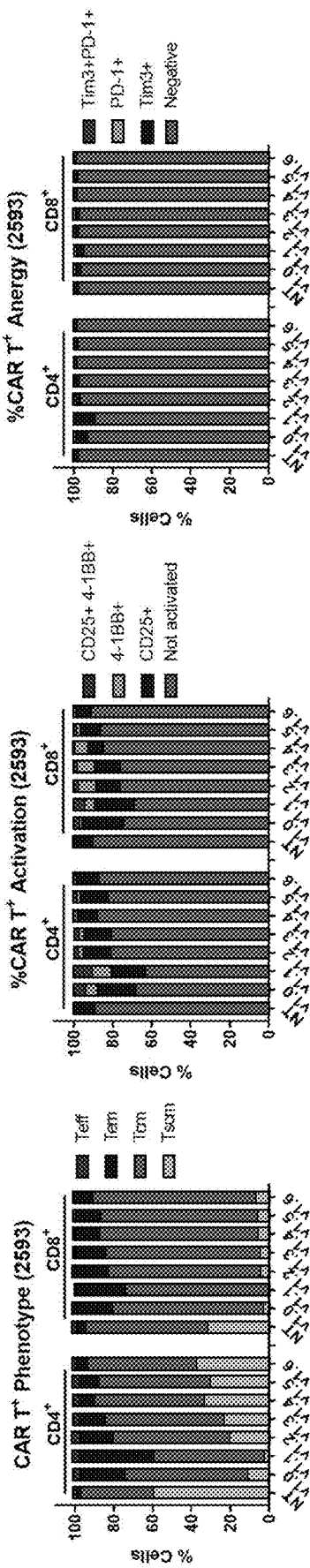
Figure 7:
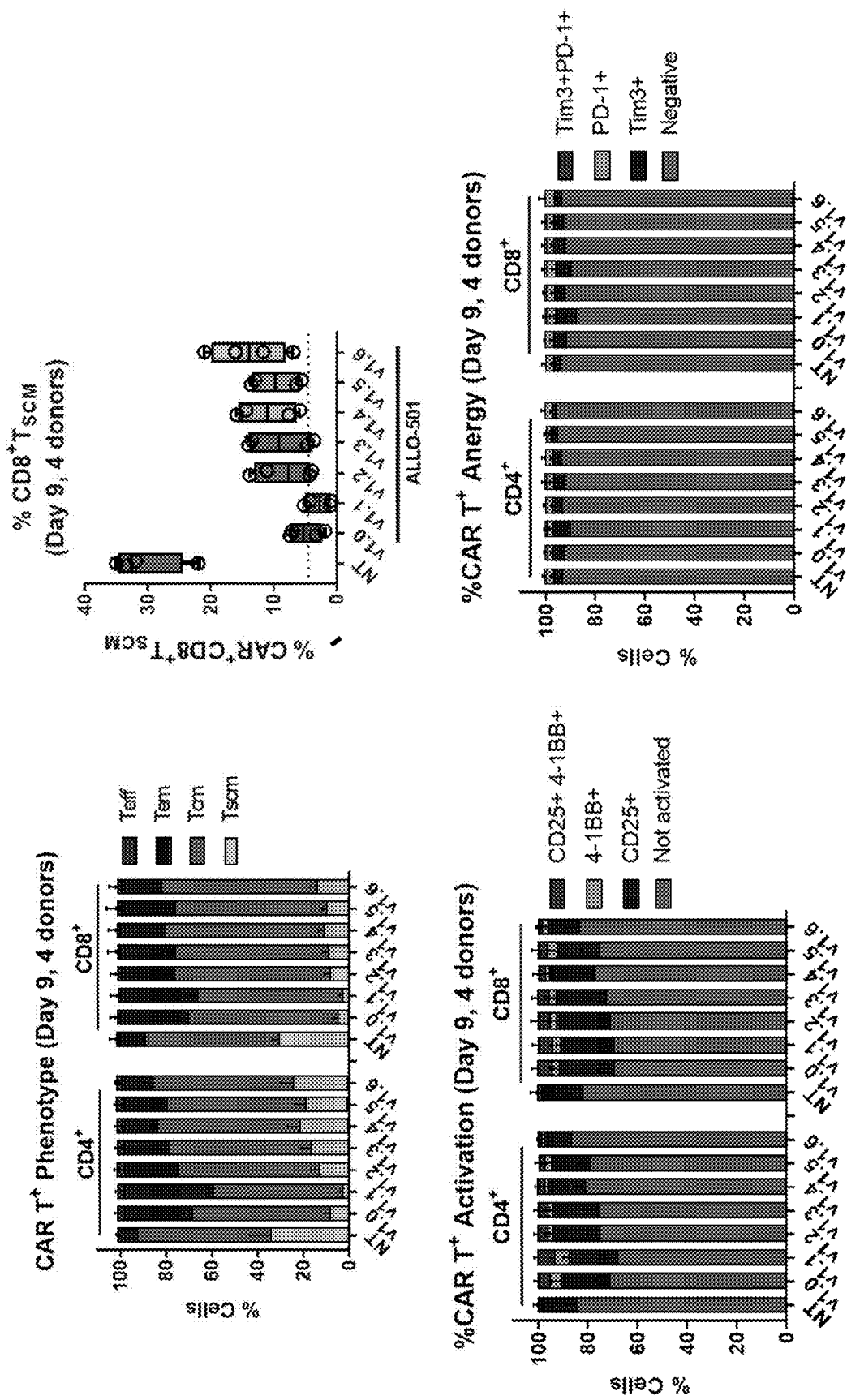
FIG. 7 shows phenotype, activation %CD8+, and anergy measured using TIM3 and PD1 staining averaged from all four donors on day 9.
Figure 8A:
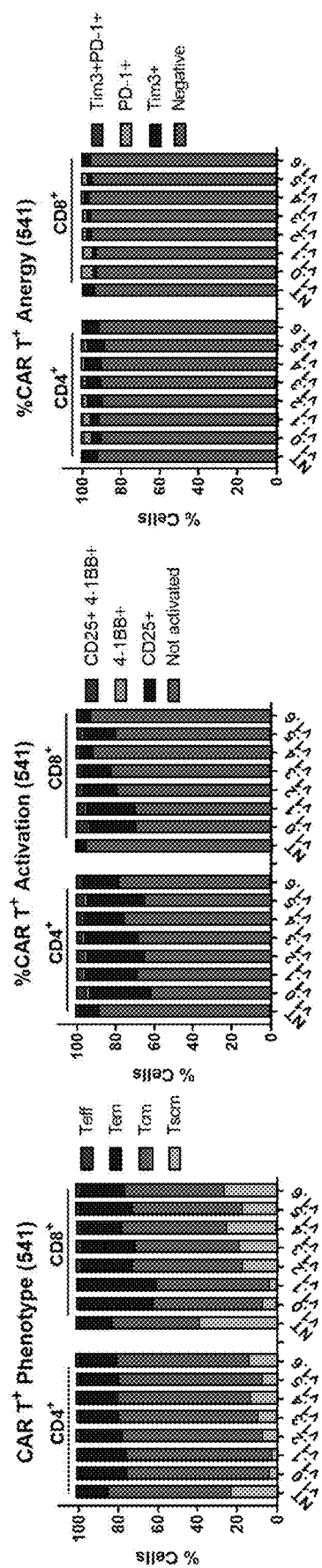
FIGS. 8A-8D show phenotype and activation on day 13 of Pan T cells from donor 541 (FIG. 8A), 604 (FIG. 8B), 410 (FIG. 8C), 2593 (FIG. 8D) transduced with rituximab resistant CAR expression vectors.
Figure 8B:
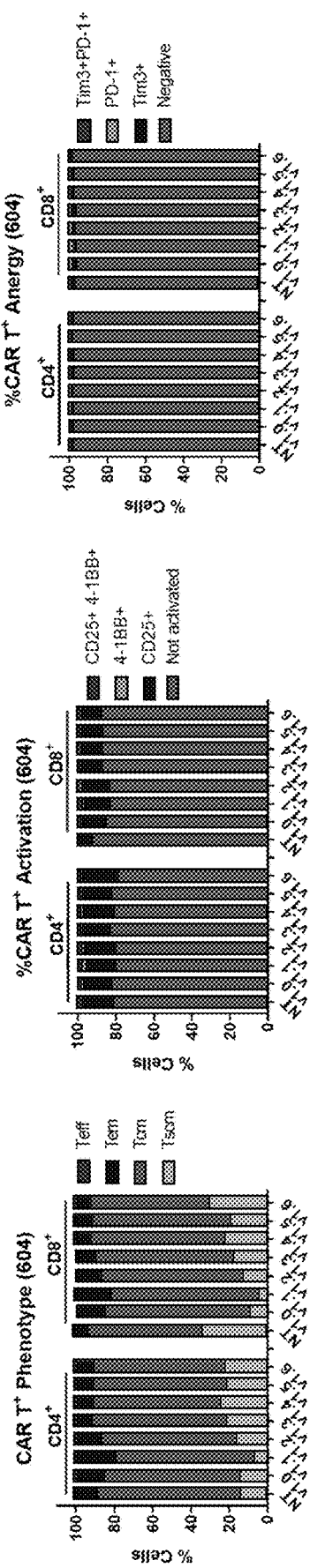
Figure 8C:
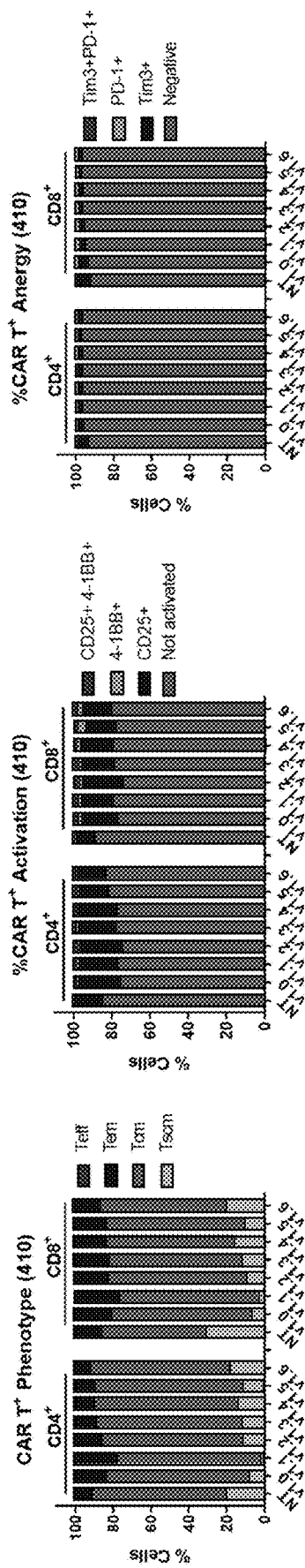
Figure 8D:
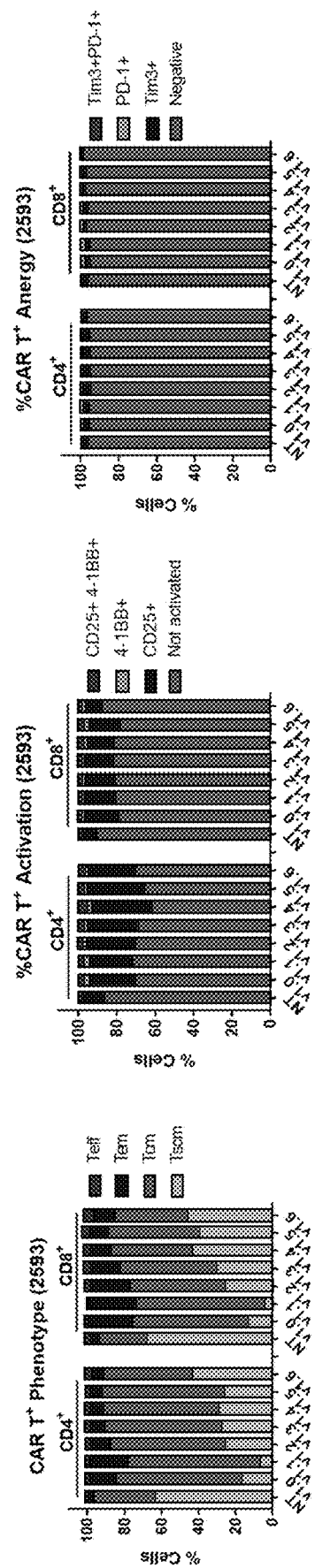
Figure 9:
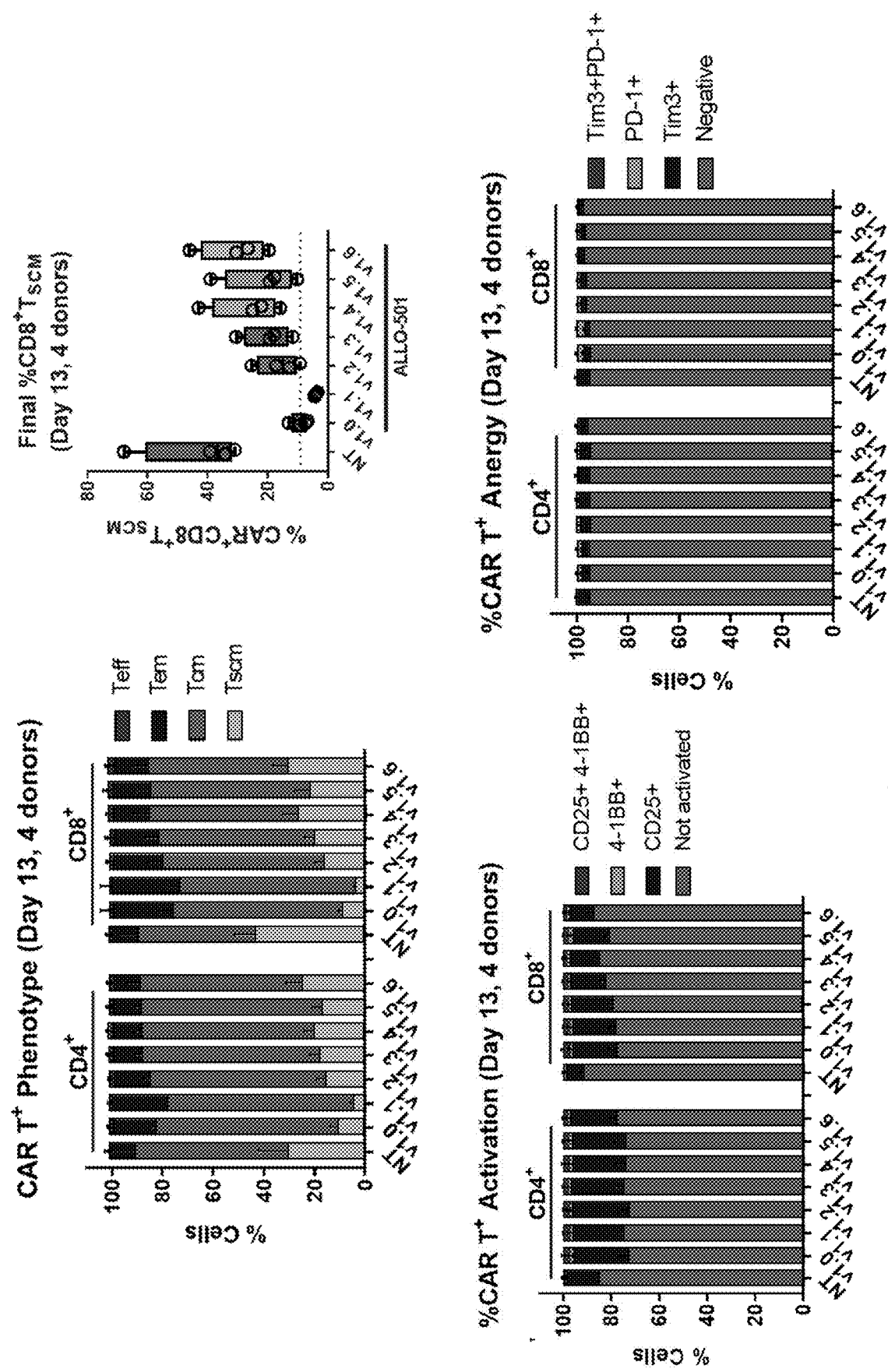
FIG. 9 shows phenotype, activation %CD8+, and anergy measured using TIM3 and PD1 staining from all four donors on day 13.

CD4/CD8 ratios were measured on day 5, 9, and 13 of Pan T cells from donor 541 (FIG. 5A), 604 (FIG. 5B), 410 (FIG. 5C), 2593 (FIG. 5D) transduced with rituximab resistant CAR expression vectors. FIGS. 6A-6D show phenotype and activation on day 9 of Pan T cells from donor 541 (FIG. 6A), 604 (FIG. 6B), 410 (FIG. 6C), 2593 (FIG. 6D) transduced with rituximab resistant CAR expression vectors. FIG. 7 shows phenotype, activation %CD8+, and T cell anergy measured using TIM3 and PD1 staining averaged from all four donors on day 9. Phenotype and activation were measured on day 13 of Pan T cells from donor 541 (FIG. 8A), 604 (FIG. 8B), 410 (FIG. 8C), 2593 (FIG. 8D) transduced with rituximab resistant CAR expression vectors. FIG. 9 shows phenotype, activation %CD8+, and T cell anergy measured using TIM3 and PD1 staining from all four donors on day 13.

Example 2: Short- and Long-Term in Vitro Killing Assays

Figure 10:
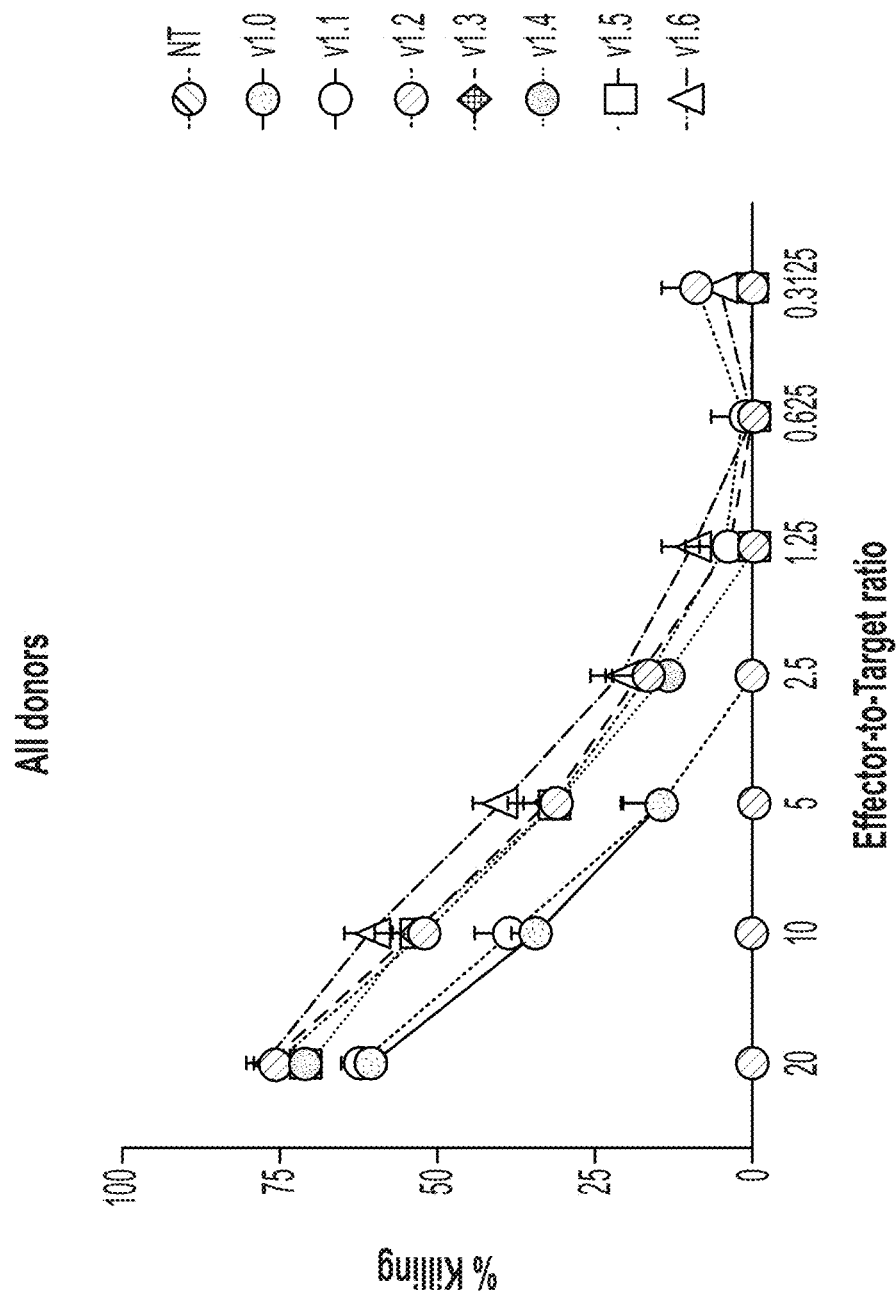
FIG. 10 shows average short-term (24 hr) killing assays using Raji cells as target cells for each CAR construct.
Figure 11B:
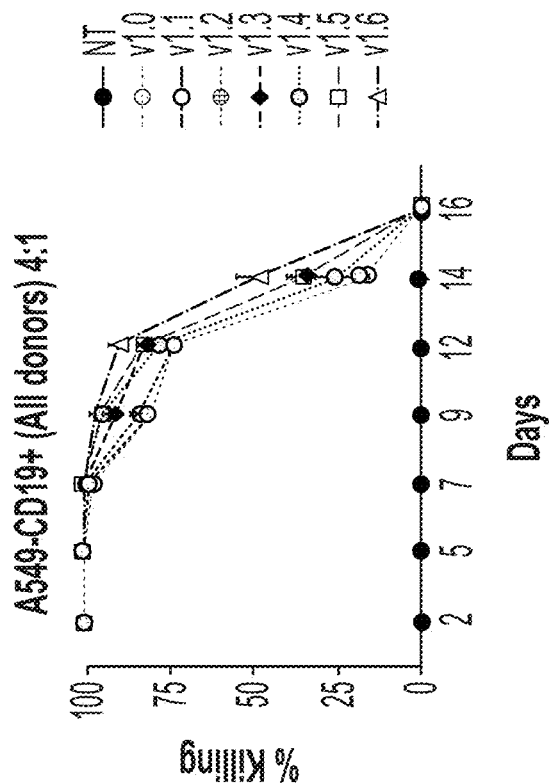
FIGS. 11A-11D shows average long-term killing assays using A549-CD19+ cells as target cells with an E:T of 8:1 (FIG. 11A), 4:1 (FIG. 11B), 2:1 (FIG. 11C), and 1:1 (FIG. 11D) for each CAR construct.
Figure 11A:
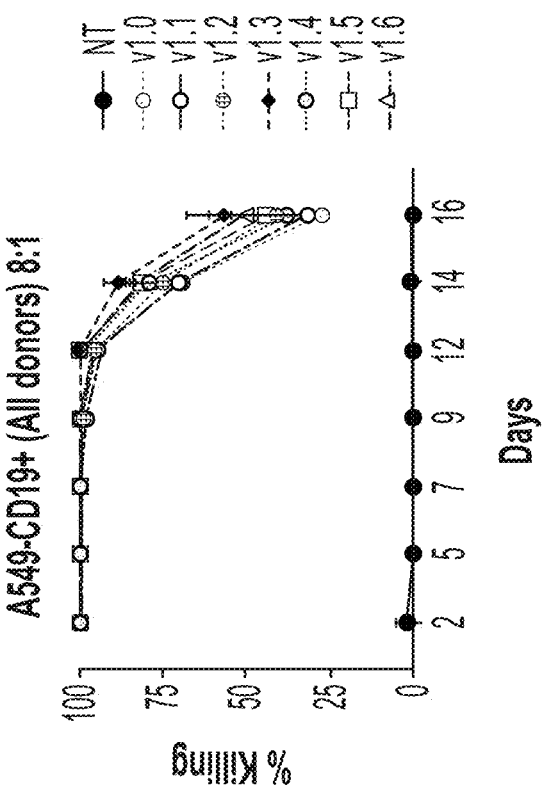
Figure 11D:
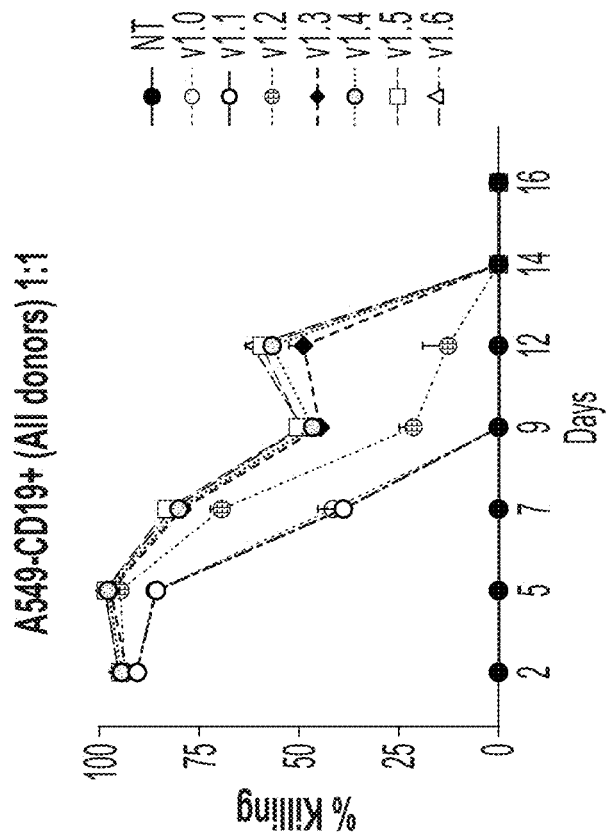
Figure 11C:
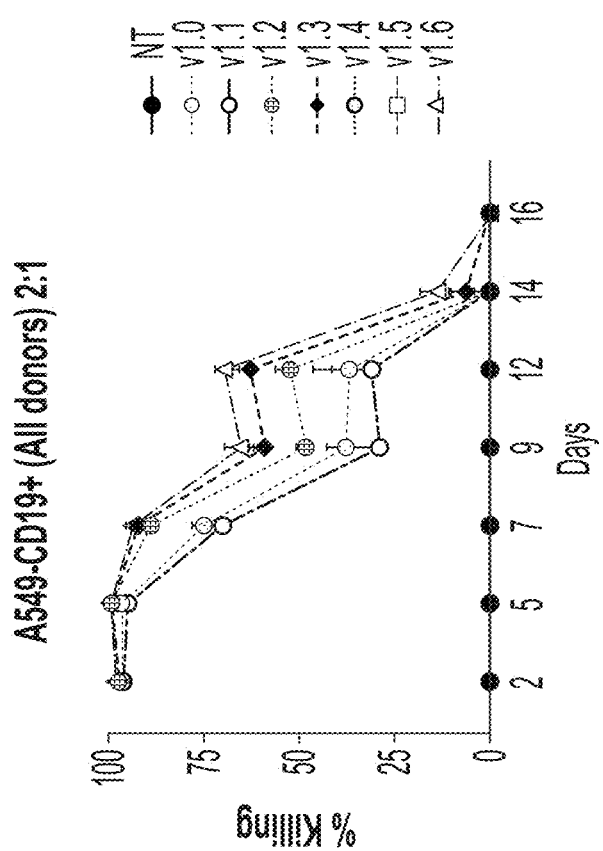

Transduced CAR cells from Example 1 were tested for short- and long-term killing capabilities. CAR T cell co-cultures with Raji cells (2:1 E-to-T) were prepared for posterior a Luminex assay. Average short-term (24 hr) killing assays using Raji cells as target cells was determined for each CAR construct (FIG. 10). FIGS. 11A-11D shows average long-term killing assays using A549-CD19+ cells as target cells with an E:T of 8:1 (FIG. 11A), 4:1 (FIG. 11B), 2:1 (FIG. 11C), and 1:1 (FIG. 11D) for each CAR construct.

Killing assay results were analyzed for correlation with phenotypic characteristics. Day 7 percent killing at 1:1 E-to-T negatively correlates with CAR+CD4+41BB+, CAR+CD4+Tim3+(p=0.0352), CAR+CD4+$T_{EM}$+ (p=0.0328), CAR+CD8+PD-1+(p=0.0269) and % CAR expression on day 13 (p=0.0245). Day 7 percent killing at 1:1 E-to-T positively correlates with CAR+CD8+$T_{SCM}$+. Day 9 percent killing at 1:1 E-to-T negatively correlates with CAR+CD4+Tim3+, CAR+CD4+$T_{EM}$+(p=0.0031), CAR+CD8+Tem+(p=0.0182) and %CAR expression day 13 (p=0.0469). Day 9 percent killing at 1:1 E-to-T positively correlates with CAR+CD8+$T_{SCM}$+, CAR+CD8+Tim3-PD-1-(p=0.0318), and CAR+CD4+$T_{SCM}$+(p=0.0289).

Example 3: Analysis of Titers of Lentivirus Containing Different Lentiviral Constructs In this experiment, the lentiviral vectors constructs were introduced into viral packaging cell line and anti-CD19 CAR containing lentiviruses were produced and titers determined at Lentigen (Gaithersberg, MD) under a similar protocol as in Example 1.

To lentiviral titers were assessed either by measuring the physical titers of the levels of viral protein p24 or by measuring the transducing titers. It was unexpectedly found that when the safety switch RQR8 was removed from the lentiviral construct v1.0, viral titer significantly decreased (compare v1.0 with v1.1 in Table 5). The titer was improved when the EF1a promoter in v1.1 was replaced with a short or truncated EF1a promoter as in v1.2 ("EF1a(short) promoter").

TABLE 5

Viral Titers of lentivirus bearing rituximab-sensitive and -resistant CD19 CAR constructs

| Construct | Physical titer p24 | Transducing titer |
|---|---|---|
| anti-CD19 CAR v1.0 | 9293 ng/mL | $1.9 \times 10^9$ TU/mL[1] |
| anti-CD19 CAR v1.1 | 2464 ng/mL | $5.4 \times 10^8$ TU/mL |
| anti-CD19 CAR v1.2 | 8208 ng/mL | $7 \times 10^9$ TU/mL |
| anti-CD19 CAR v1.3 | 4494 ng/mL | $7 \times 10^8$ TU/mL |
| anti-CD19 CAR v1.4 | 9686 ng/mL | $2.4 \times 10^9$ TU/mL |

[1]TU = Transducing Unit

Figure 12:
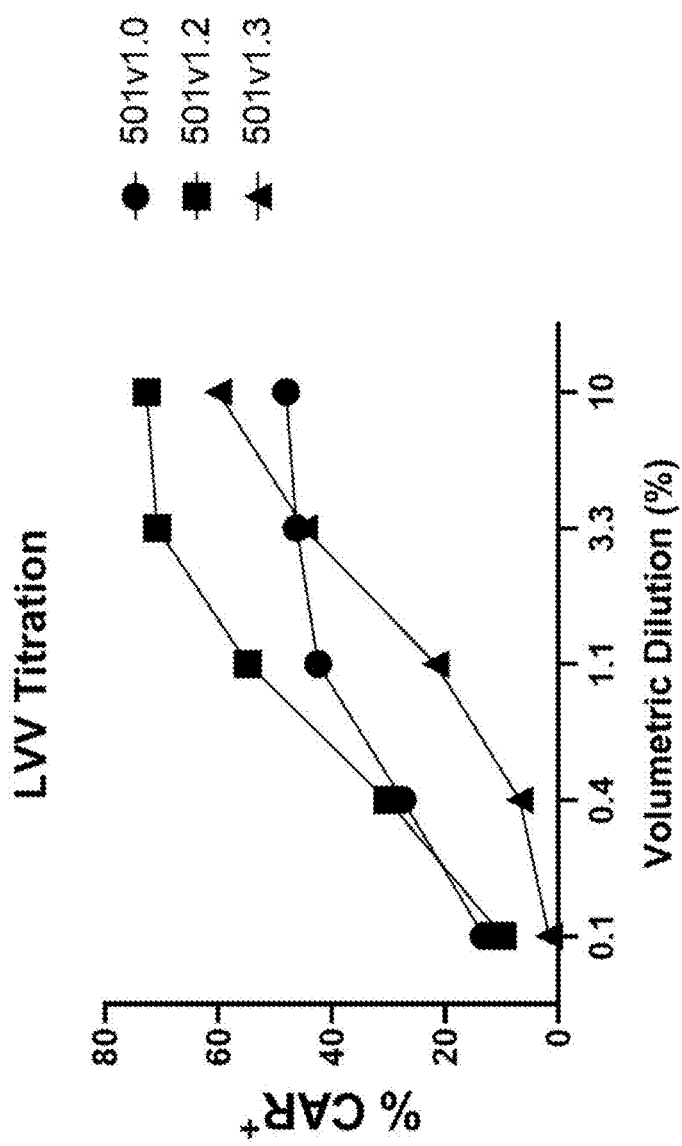
FIG. 12 shows the level of % CAR+ T cells on Day 5 after Pan T cells were transduced with serial dilution of lentiviral preparations of rituximab-resistant lentiviral constructs (ALLO-501v1.2 and v1.3) or rituximab-sensitive lentiviral construct (ALLO-501v1.0).

To analyze the robustness of the lentiviral preparations of anti-CD19 CAR v1.0, v1.2 and v1.3, a viral titration assay was performed. Serial volumetric dilution of lentiviral preparations of v1.0, v1.2 and v1.3 was analyzed for % CAR+ T cells on Day 5 after transduction of pan T cells. The results show that at low dilution (e.g., 10% v/v), all three constructs exhibited similar acceptable transduction efficiency. At increasing dilutions (e.g., 3.3%, 1.1% v/v), however, the transduction efficiency of rituximab-resistant anti-CD19 CAR construct v1.3 dropped more significantly as compared to the other rituximab-resistant anti-CD19 CAR construct v1.2. See FIG. 12. Construct v1.2 was selected for in vivo analysis.

Example 4: In Vivo Potency Assay

Figure 13A:
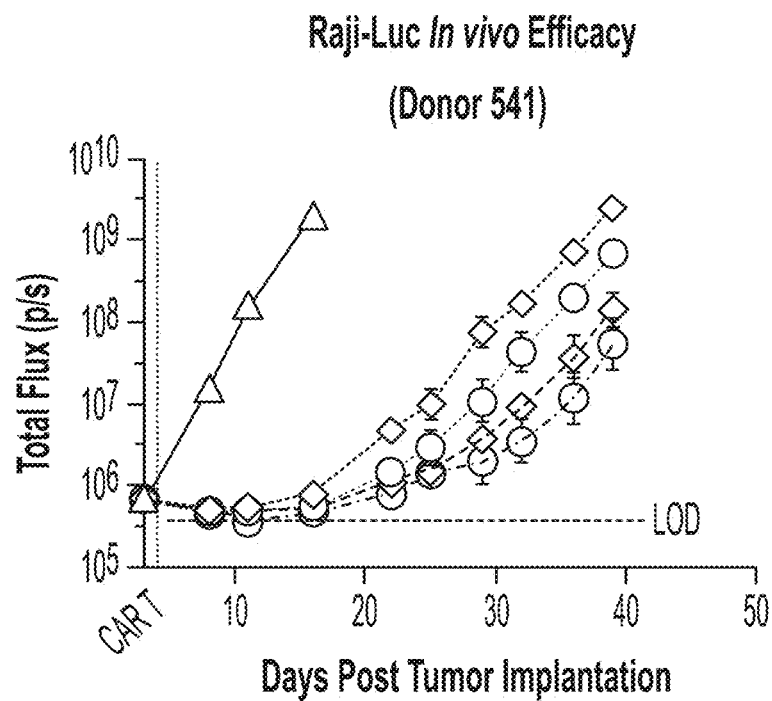
FIGS. 13A-13B show in vivo efficacy of pan T cells from donors 541 (FIG. 13A) and 604 (FIG. 13B) transduced with rituximab-resistant CAR expression vector (ALLO-501v1.2) or rituximab-sensitive CAR expression vector (ALLO-501v1.0) when tested in a Raji cells-bearing NSG mouse tumor model.
Figure 13B:
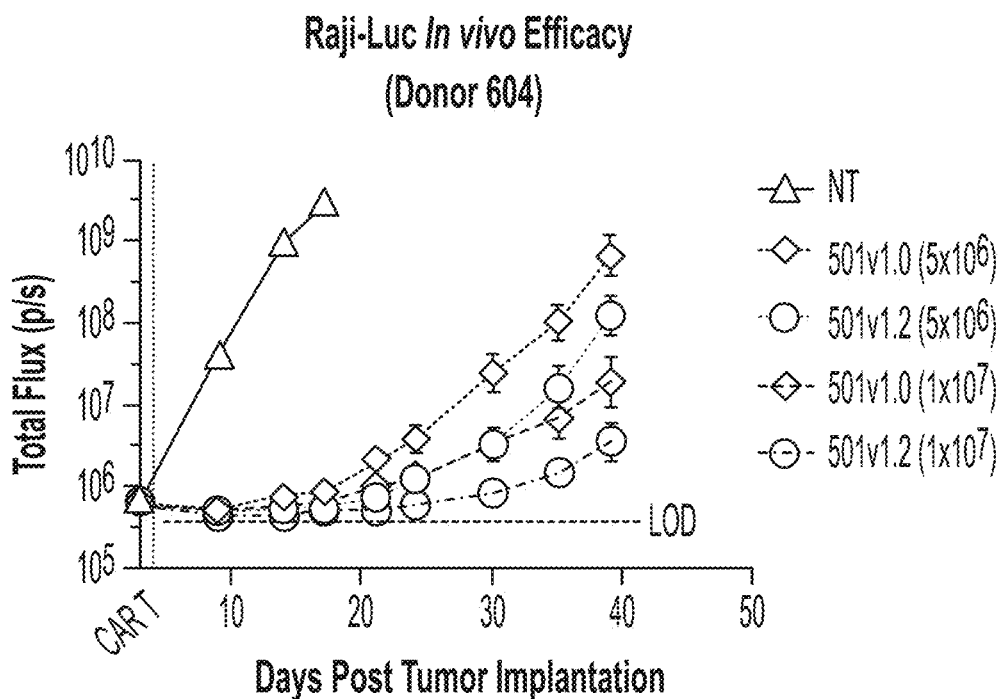

In this experiment, in vivo anti-tumor potency of ALLO-501v1.2 was analyzed as compared to ALLO-501v1.0 in a mice tumor model. CD19 positive Raji cells that carry a luciferase reporter gene were injected into NSG mice. Lentivirus containing the v1.0 or v1.2 lentiviral construct was transduced to pan T cells of two donors 541 and 604. NSG mice were inoculated via tail vein injection with 100,000 luciferase Raji cells. On day 4 post-inoculation Raji-bearing NSG mice were administered the CAR construct at the indicated doses. Raji engraftment and progression was evaluated by i.p. injection of luciferase substrate, followed by measurement of cumulative luciferase signals. Results are shown in FIG. 13A (donor 541) and FIG. 13B (donor 604).

Although the disclosed teachings have been described with reference to various applications, methods, kits, and compositions, it will be appreciated that various changes and modifications can be made without departing from the teachings herein and the claimed invention below. The foregoing examples are provided to better illustrate the disclosed teachings and are not intended to limit the scope of the teachings presented herein. While the present teachings have been described in terms of these exemplary embodiments, the skilled artisan will readily understand that numerous variations and modifications of these exemplary embodiments are possible without undue experimentation. All such variations and modifications are within the scope of the current teachings.

| SEQ ID NO | Description | Sequence |
|---|---|---|
| 1 | ALLO-501_v1.0 | atgctgaccagcctgctgtgctggatggccctgtgcctgctgggcgccgaccacg<br>ccgatgcctgcccctacagcaaccccagcctgtgcagcggaggcggcggcagc<br>gagctgcccacccagggcaccttctccaacgtgtccaccaacgtgagcccagcc<br>aagcccaccaccaccgcctgtccttattccaatccttccctgtgtagcggagggg<br>aggcagcccagcccccagacctcccacccagccccaccatcgccagccagc<br>ctctgagcctgagacccgaggcctgccgcccagccgccggcggcgccgtgcac<br>accagaggcctggatttcgcctgcgatatctacatctgggcccactggccggca<br>cctgtggcgtgctgctgctgagcctggtgatcaccctgtactgcaaccaccgcaac<br>cgcaggcgcgtgtgcaagtgccccaggcccgtggtgagagccgagggcagag<br>gcagcctgctgacctgcggcgacgtggaggagaacccaggcccatggagacc<br>gacaccctgctgctgtgggtgctgctgctgtgggtgccaggcagcaccggcgag<br>gtgcagctgcagcagagcggacccgagctgatcaagccaggcgccagcgtgaa<br>gatgagctgcaaggccagcggctacaccttcaccagctacgtgatgcactgggtg<br>aagcagaagccaggccagggcctggagtggatcggctacatcaaccccctacaac<br>gacggcaccaagtacaacgagaagttcaagggcaaggccaccctgaccagcga<br>caagagcagcagcaccgcctacatggagctgagcagcctgaccagcgaggaca<br>gcgccgtgtactactgcgccagaggcacctactactacggcagccgggtgttcga<br>ctactggggccagggcaccaccctgaccgtgagctctggcggaggcggctctgg<br>cggaggcggctctggcggaggcggcagcgacatcgtgatgacccaggctgccc<br>ccagcatcccgtgaccccaggcgagagcgtgagcatcagctgccggagcagc<br>aagagcctgctgaacagcaacggcaacacctacctgtactggttcctgcagcggc<br>caggccagagcccccagctgctgatctaccggatgagcaacctggccagcggc<br>gtgcccgaccggttcagcggcagcggcagcggcaccgccttcacccctgcggatc<br>agccgggtggaggccgaggacgtgggcgtgtactactgcatgcagcacctgga<br>gtacccatcaccttcggagccggcaccaagctggagctgaagcggtcggatccc<br>accaccaccccagccccacggccacctacccctgccccaaccatcgccagcca<br>gcccctgagcctgcgcctgaagcctgcaggcctgccgccggaggagccgtgc<br>acacaaggggcctggacttcgcctgcgacatctatatctgggccccctggccgg<br>gacatgcggggtgctgctgctgtccctggtgattacactgtattgcaaacggggcc<br>ggaagaagctgctgtacatcttcaagcagccccttcatgcggcccgtgcagaccac<br>ccaggaggaggacggctgcagctgccggttccccgaggaagaggaaggcggc<br>tgcgagctgcgggtgaagttcagccggagcgccgacgccccagcctaccagca<br>gggccagaaccagctgtacaacgagctgaacctgggacggcgggaggagtac<br>gacgtgctggacaagcggcggggacgggaccccgagatgggcggcaagcctc<br>gccggaagaatccccaggagggcctgtacaacgagctgcagaaggacaagatg<br>gccgaggcctacagcgagatcggcatgaagggcgagcggcgccggggcaag<br>ggccacgacggcctgtaccagggcctgagcaccgccaccaaggacacctacga<br>cgccctgcacatgcaggccctgccacccggtga |
| 2 | ALLO-501_v1.1 | atggagaccgacaccctgctgctgtgggtgctgctgctgtgggtgccaggcagca<br>ccggcgaggtgcagctgcagcagagcggacccgagctgatcaagccaggcgc<br>cagcgtgaagatgagctgcaaggccagcggctacaccttcaccagctacgtgatg<br>cactgggtgaagcagaagccaggccagggcctggagtggatcggctacatcaa<br>ccccctacaacgacggcaccaagtacaacgagaagttcaagggcaaggccaccct<br>gaccagcgacaagagcagcagcaccgcctacatggagctgagcagcctgacca<br>gcgaggacagcgccgtgtactactgcgccagaggcacctactactacggcgcc<br>gggtgttcgactactggggccagggcaccaccctgaccgtgagctctggcggag<br>gcggctctggcggaggcggctctggcggaggcggcagcgacatcgtgatgacc<br>caggctgccccagcatcccgtgaccccaggcgagagcgtgagcatcagctg<br>ccggagcagcaagagcctgctgaacagcaacggcaacacctacctgtactggtt<br>cctgcagcggccaggccagagcccccagctgctgatctaccggatgagcaacct<br>ggccagcggcgtgcccgaccggttcagcggcagcggcagcggcaccgccttca<br>ccctgcggatcagccgggtggaggccgaggacgtgggcgtgtactactgcatgc<br>agcacctggagtacccccttcacctcggagccggcaccaagctggagctgaagc<br>ggtcggatcccaccaccaccccagccccacggccacctacccctgccccaacca<br>tcgccagccagcccctgagcctgcgcctgaagcctgcaggcctgccgccgga<br>ggagccgtgcacacaaggggcctggacttcgcctgcgacatctatatctgggccc<br>cctggccgggacatgcggggtgctgctgctgtccctggtgattacactgtattgc<br>aaacggggccggaagaagctgctgtacatcttcaagcagcccttcatgcggcccg<br>tgcagaccaccaggaggaggacggctgcagctgccggttccccgaggaagag<br>gaaggcggctgcgagctgcgggtgaagttcagccggagcgccgacgccccag<br>cctaccagcagggccagaaccagctgtacaacgagctgaacctgggacggcgg<br>gaggagtacgacgtgctggacaagcggcggggacgggaccccgagatgggcg<br>gcaagcctcgccggaagaatccccaggagggcctgtacaacgagctgcagaag<br>gacaagatggccgaggcctacagcgagatcggcatgaagggcgagcggcgcc<br>ggggcaagggccacgacggcctgtaccagggcctgagcaccgccaccaagga<br>cacctacgacgccctgcacatgcaggccctgccacccggtga |
| 3 | ALLO-501_v1.2 | atggagacagataccctgctgctgtgggtgctgctgctgtgggtgcctggctccac<br>aggagaggtgcagctgcagcagtctggaccagagctgatcaagcctggagcatc<br>cgtgaagatgtcttgcaaggccagcggctatacattcaccagctacgtgatgcact<br>gggtgaagcagaagcctggccagggcctggagtggatcggctatatcaatccata<br>caacgacggcaccaagtataatgagaagtttaagggcaaggccacactgacctct<br>gataagagctcctctacagcctacatggagctgagctccctgacctctgaggacag<br>cgccgtgtactattgcgccagaggcacatactattacggcagcagggtgttcgatt<br>actggggccagggcaccacactgaccgtgtctagcggaggaggaggctccgga |

-continued

SEQ ID NO. CHART

| SEQ ID NO | Description | Sequence |
|---|---|---|
| | | ggaggaggctctggcggcggcggcagcgacatcgtgatgacacaggcagcac<br>caagcatcccagtgaccccctggcgagagcgtgtccatctcttgtcggtcctctaagt<br>ccctgctgaactctaatggcaacacctatctgtactggtttctgcagcggcccggac<br>agtccccacagctgctgatctataggatgagcaacctggcatccggagtgcctgat<br>cgcttcagcggctccggctctggaacagccttacctgaggatctctcgggtgga<br>ggcagaggacgtgggcgtgtattactgcatgcagcacctggagtacccccttcacat<br>ttggcgcaggaaccaagctggagctgaagcggagcgaccccaccacaaccct<br>gcaccacggcccctacaccagcacctaccatcgcatctcagccactgagcctgc<br>ggcccgaggcctgtaggcctgcagcaggaggagcagtgcacacaggggcct<br>ggacttcgcctgcgatatctatatctgggcaccactggcaggaacatgtggcgtgc<br>tgctgctgagcctggtcatcaccctgtattgcaagagaggcaggaagaagctgct<br>gtacatcttcaagcagccttttatgcggccagtgcagacaacccaggaggaggat<br>ggctgctcctgtagattcccagaggaggaggagggaggatgtgagctgcgcgtg<br>aagtttagccggtccgccgacgcaccagcatatcagcagggccagaatcagctgt<br>acaatgagctgaacctgggccggagagaggagtacgacgtgctggataagagg<br>aggggaagggaccccgagatgggaggcaagccacggagaaagaatccccag<br>gagggcctgtataacgagctgcagaaggataagatggccgaggcctacagcga<br>gatcggcatgaagggagagaggcgccggggcaagggacacgacggcctgtat<br>cagggcctgtccacagccaccaaggacacctacgatgccctgcacatgcaggcc<br>ctgccaccaaggtga |
| 4 | ALLO-501_v1.3 | atgggaacaagcctgctgtgctggatggctctgtgcctgctgggggccgaccacg<br>ctgacgcctccgggggggggggctcctgcccctaggcccccctacacctgcac<br>caaccatcgcatcccagccactgtctctgcgccctgaggcctgccggccagcagc<br>aggaggagcagtgcacaccccgcggcctggacttcgcctgcgatatctatatctgg<br>gcaccactggcaggcacatgtggcgtgctgctgctgagcctggtcatcaccctgta<br>ctgcaatcacaggaaccggagaagggtgtgcaagtgtccccggcctgtggtgag<br>agcagagggaaggggcagcctgctgacatgtggcgacgtggaggagaatccag<br>gccctatggagacagataccctgctgctgtgggtgctgctgctgtgggtgcccgg<br>cagcaccggagaggtgcagctgcagcagtccggaccagagctgatcaagcctg<br>gagccagcgtgaagatgtcctgtaaggcctctggctatacattcaccagctacgtg<br>atgcactgggtgaagcagaagcctggccagggcctggagtggatcggctatatc<br>aatccatacaacgacggcacaaagtataacgagaagtttaagggcaaggccaca<br>ctgacctccgataagagctcctctacagcctacatggagctgagctccctgacctct<br>gaggacagcgccgtgtactattgcgccagaggcacatactattacggctctagggt<br>gttcgattactggggccagggcaccacactgaccgtgtctgcggaggaggagg<br>cagcggaggaggaggctccggcggcggcggctctgacatcgtgatgacacagg<br>cagcaccatccatcccagtgacccctggcgagagcgtgtccatctcttgtcggtcc<br>tctaagagcctgctgaactccaatggcaacacctatctgtactggtttctgcagcgg<br>cccggacagagcccacagctgctgatctataggatgtctaatctggcaagcggcg<br>tgcccgatcgcttcagcggctccggctctggcacagccttacccctgaggatctcc<br>cgcgtggaggcagaggacgtgggcgtgtattactgcatgcagcacctggagtac<br>cccttcacatttggcgcaggcaccaagctggagctgaagcggagcgaccccacc<br>acaaccctgcaccacggccacccacaccagcacctactattgcatcccagccac<br>tgagcctgcggcccgaggcctgtaggcctgccgccggcggcgcagtgcacacc<br>cggggcctggacttgcctgcgatatctacatctggccacctctggccgcacatg<br>cggcgtgctgttactgagcctggtcatcaccctgtattgcaagcggggcagaaag<br>aagctgctgtacatcttcaagcagccttttatgcggccagtgcagacaacccagga<br>ggaggatggctgctcctgtagattcccagaggaggaggagggaggatgtgagct<br>gcgcgtgaagtttagccggtccgccgacgcaccagcatatcagcagggccagaa<br>ccagctgtacaatgagctgaacctgggccggagagaggagtatgacgtgctgga<br>taagagacggggccgggaccccgagatgggaggcaagccacgccggaagaat<br>ccccaggagggcctgtataacgagctgcagaaggataagatggccgaggcctac<br>agcgagatcggcatgaagggagagagaaggcgcggcaagggacacgacggc<br>ctgtaccagggcctgagcacagcaacaaaagacacctacgacgcactgcacatg<br>caggctctgccccctcggtaa |
| 5 | >ALLO-501_v1.4 | atgggaacctctctgctgtgctggatggctctgtgcctgctgggggccgatcacgc<br>tgacgcaagtggcgggggggggtccgaactgcccacacagggcaccttctcca<br>acgtgagcaccaacgtgagctccggcggaggaggcagccctgcaccaaggcc<br>cctacaccagcacctaccatcgcatctcagccactgagcctgcgccccgaggcc<br>tgccggcctgcagcaggcggcgccgtgcacacccgcggcctggactttgcctgc<br>gatatctatatctgggcacctctggcaggcacatgtggcgtgctgctgctgagcctg<br>gtcatcaccctgtactgcaatcacaggaaccggagaagggtgtgcaagtgtccac<br>ggcccgtggtgagagcagagggaaggggctccctgctgacatgtggcgacgtg<br>gaggagaatcctgcccaatggagacagataccctgctgctgtgggtgctgctgc<br>tgtgggtgcccggctccaccggagaggtgcagctgcagcagtctggaccagagc<br>tgatcaagccaggagcatccgtgaagatgtcttgtaaggccagcggctatacattc<br>accagctacgtgatgcactgggtgaagcagaagcctggccagggcctggagtg<br>gatcggctatatcaatccttacaacgacggcaccaagtataacgagaagtttaagg<br>gcaaggccacactgacctctgataagtctagctccacagcctacatggagctgtct<br>agcctgaccagcgaggactccgccgtgtactattgcgccagaggcacatactatta<br>cggcagcagggtgttcgattactggggccagggcaccacactgaccgtgtcctct<br>ggaggaggaggctccggaggaggaggctctggcggcggcggcagcgacatc |

SEQ ID NO. CHART

| SEQ ID NO | Description | Sequence |
|---|---|---|
| | | gtgatgacacaggcagcaccttccatcccagtgaccccaggcgagtctgtgagca<br>tctcctgtcggagctccaagtccctgctgaactctaatggcaacacctatctgtactg<br>gtttctgcagcggcccggacagtccccacagctgctgatctataggatgagcaatc<br>tggcctccggcgtgccagatcgcttctctggcagcggctccggcacagccttacc<br>ctgaggatctctcgcgtggaggcagaggacgtgggcgtgtattactgcatgcagc<br>acctggagtacccattcacatttggcgcaggcaccaagctggagctgaagcgga<br>gcgaccccaccacaaccccagcacctcggccacccacaccagcacccaccatc<br>gcatctcagcctctgagcctgcggcccgaggcctgtaggcccgcagcaggagg<br>agcagtgcacaccggggcctggacttcgcctgcgatatctacatctgggcacca<br>ctggccggcacatgcggcgtgctgttactgagcctggtcatcaccctgtattgcaa<br>gcggggcagaaagaagctgctgtacatcttcaagcagccctttatgcggcctgtgc<br>agacaacccaggaggaggatggctgctcctgtagattccctgaggaggaggagg<br>gaggatgtgagctgcgcgtgaagttttctcggagcgccgacgcaccagcatca<br>gcagggacagaaccagctgtacaatgagctgaacctgggccggagagaggagt<br>atgacgtgctggataagagacggggccgggaccccgagatgggaggcaagcct<br>cgccggaagaatccacaggagggcctgtataacgagctgcagaaggataagatg<br>gccgaggcctacagcgagatcggcatgaaggagagaaggcgcggcaag<br>ggacacgacggcctgtaccagggcctgagcacagcaacaaaagacacctacga<br>cgcactgcacatgcaggctctgccaccaagatga |
| 6 | ALLO-501_v1.5 | atggggacctcactgctgtgctggatggctctgtgcctgctgggggccgaccacg<br>ctgacgcctgctctgggggggggggggctcatgctccggaggaggaggctctct<br>gagctgccaacccagggcacattctccaacgtgagcaccaacgtgtctcctgcca<br>agccaaccacaaccgcatgcagcggcggaggaggaggcagctgttccggcgg<br>cggcggcagccctgccccaaggcccctacccagcaccacaatcgcatctca<br>gcctctgagcctgcgcccagaggcctgtcggccgcagcaggaggagcagtgc<br>acacccgcggcctggactttgcctgcgatatctatatctgggcaccactggcaggc<br>acctgtggcgtgctgctgctgagcctggtcatcaccctgtactgcaatcacaggaa<br>ccggagaagggtgtgcaagtgtccacggcccgtggtgagagcagagggaagg<br>ggctctctgctgacctgtggcgacgtggaggagaatcctggccctatggagacag<br>atacactgctgctgtgggtgctgctgctgtgggtgcccggcagcacaggagaggt<br>gcagctgcagcagtccggacctgagctgatcaagccaggcgcctccgtgaagat<br>gtcttgcaaggccagcggctataccttcacaagctacgtgatgcactgggtgaagc<br>agaagccaggccagggcctggagtggatcggctatatcaatccctcacaacgacg<br>gcaccaagtataacgagaagtttaagggcaaggccaccctgacaagcgataaga<br>gctcctctaccgcctacatggagctgagctccctgacaagcgaggactccgccgt<br>gtactattgcgccagaggcacctactattacggctccagggtgttcgattactgggg<br>ccagggcacaaccctgacagtgtctagcggaggaggaggcggcggaggagga<br>ggctccggcggcggcggctctgacatcgtgatgacccaggcagcaccatccatc<br>cctgtgacaccaggcgagtctgtgagcatctcctgtcggtcctctaagtccctgctg<br>aactctaatggcaacacctatctgtactggtttctgcagcggcccggacagtctcct<br>cagctgctgatctataggatgagcaatctggcctccggcgtgcctgatcgcttctct<br>ggcagcggctccggcaccgcctttacactgaggatcagccgcgtggaggcaga<br>ggacgtgggcgtgtattactgcatgcagcacctggagtaccctttcacctttggcgc<br>cggcacaaagctggagctgaagcggagcgaccccacaaccacaccagcacctc<br>ggccacccaccccagcaccaacaatcgcatctcagccactgagcctgcggcccg<br>aggcctgtaggccagccgccggcggcgcagtgcacacccggggcctggacttc<br>gcctgcgatatctacatctgggcccctctggccggcacctgcggcgtgctgttact<br>gagcctggtcatcaccctgtattgcaagcggggcagaaagaagctgctgtacatct<br>tcaagcagcccttcatgcggcccgtgcagaccacacaggaggatggctgct<br>cctgtagattccctgaggaggaggaggagggaggatgtgagctgcgcgtgaagttttc<br>tcggagcgccgacgcacctgcatatcagcagggacagaaccagctgtacaatga<br>gctgaacctgggccggagagaggagtatgacgtgctggataagagacggggcc<br>gggaccccgagatgggaggcaagcccgccggaagaatcctcaggagggcct<br>gtataacgagctgcagaaggataagatggccgaggcctacagcgagatcggcat<br>gaagggagagaaggcgcggcaagggccacgacggcctgtaccagggcct<br>gtccacagcaacaaaggatacttatgacgctctgcacatgcaggctctgccccctc<br>ggtga |
| 7 | ALLO-501_v1.6 | atgggaaccagcctgctgtgctggatggcactgtgcctgctgggagcagaccac<br>gccgatgccgaactgcctactcagggacattctctaatgtgagcaccaacgtga<br>gctctggaggaggaggctccgagctgccaacccagggcacattctctaatgtgag<br>cacaaacgtgtctcccgccagcctaccacaaccgccgaactgcctacccaggg<br>cacattttccaacgtgtctaccaacgtgtctagcgaggaggaggctcccccgcac<br>ctaggcccctacccagcaccaacaatcgcaagccagcctctgtccctgcgccc<br>agaggcatgcaggccagcagcaggaggagcagtgcacacccgcggcctggac<br>tttgcctgcgatatctatatctgggcaccactggcaggaacctgtggcgtgctgctg<br>ctgtctctggtcatcaccctgtactgcaatcacagaaaccggagaagggtgtgcaa<br>gtgtcctcggcagtggtgagagcagagggaagtgctgtgacctgtgg<br>cgacgtggaggagaatcccggccctatggagacagatacactgctgctgtgggt<br>gctgctgctgtgggtgccaggctctacaggagaggtgcagctgcagcagagcgg<br>acctgagctgatcaagccaggcgcctctgtgaagatgagctgcaaggcctccgg<br>ctataccttcacaagctacgtgatgcactgggtgaagcagaagccaggccaggc<br>ctggagtggatcggctatatcaatccctacaacgacggcaccaagtataacgaga |

SEQ ID NO. CHART

| SEQ ID NO | Description | Sequence |
|---|---|---|
|  |  | agtttaagggcaaggccaccctgacatccgataagagctcctctaccgcctacatg gagctgagctccctgacatccgaggactctgccgtgtactattgcgccagaggca cctactattacggctctagggtgttcgattactggggccagggcacaaccctgaca gtgtctagcggaggaggaggctctggaggaggaggcagcggcggcggaggct ccgacatcgtgatgacccaggcagcaccatcccagtgacacctggcggaga gcgtgtccatctcttgtaggtcctctaagtctctgctgaacagcaatggcaacaccta tctgtactggifictgcagcggcccggacagagccctcagctgctgatctataggat gtccaatctggcctctggagtgcctgatcgcttcagcggctccggctctggaaccg cctttacactgaggatctcccgcgtggaggcagaggacgtgggcgtgtattactgc atgcagcacctggagtacccctttcacctttggcgccggcacaaagctggagctga agcggagcgaccccacaaccacaccagcaccccggccaccaaccctgcccct acaatcgcaagccagccactgtccctgcggcccgaggcctgtagacctgccgcc ggcggcgccgtccataccccgcggcctggatttcgcgatatctacatttgggc ccctctggccggcacttgcggcgtgctgctgctgagcctggtcatcaccctgtattg caagcggggcagaaagaagctgctgtacatcttcaagcagcccttcatgcggccc gtgcagaccacacaggaggaggatggctgctcctgtagattcccagaggaggag gagggaggatgtgagctgcgcgtgaagtttagccggtccgccgacgcacctga tatcagcagggccagaaccagctgtacaatgagctgaacctgggccggagagag gagtacgacgtgctggataagagaaggggacgggaccccgagatgggaggca agccccgccggaagaatcctcaggagggcctgtataacgagctgcagaaggata agatggccgaggcctacagcgagatcggcatgaagggagagagaaggcgcgg caagggacacgacggcctgtatcagggcctgtccaccgccacaaaggacaccta cgatgccctgcacatgcaggccctgcctccaagatga |
| 8 | ALLO-501_v1.0 (or ALLO-501) Exemplary signal sequence is underlined | <u>MLTSLLCWMALCLLGADHADA</u>CPYSNPSLCSGGGG SELPTQGTFSNVSTNVSPAKPTTTACPYSNPSLCSGG GGSPAPRPPTPAPTIASQPLSLRPEACRPAAGGAVHT RGLDFACDIYIWAPLAGTCGVLLLSLVITLYCNHRN RRRVCKCPRPVVRA [EGRGSLLTCGDVEENPGP] <u>METDTLLLWVLLLWVPGSTG</u>EVQLQQSGPELIKPG ASVKMSCKASGYTFTSYVMHWVKQKPGQGLEWIG YINPYNDGTKYNEKFKGKATLTSDKSSTAYMELSS LTSEDSAVYYCARGTYYYGSRVFDYWGQGTTLTVS SGGGGSGGGGSGGGGSDIVMTQAAPSIPVTPGESVSI SCRSSKSLLNSNGNTYLYWFLQRPGQSPQLLIYRMS NLASGVPDRFSGSGSGTAFTLRISRVEAEDVGVYYC MQHLEYPFTFGAGTKLELKRSDPTTTPAPRPPTPAPT IASQPLSLRPEACRPAAGGAVHTRGLDFACDIYIWAP LAGTCGVLLLSLVITLYCKRGRKKLLYIFKQPFMRP VQTTQEEDGCSCRFPEEEEGGCELRVKFSRSADAPA YQQGQNQLYNELNLGRREEYDVLDKRRGRDPEMG GKPRRKNPQEGLYNELQKDKMAEAYSEIGMKGERR RGKGHDGLYQGLSTATKDTYDALHMQALPPR |
| 9 | ALLO-501_v1.1 | <u>METDTLLLWVLLLWVPGSTG</u>EVQLQQSGPELIKPG ASVKMSCKASGYTFTSYVMHWVKQKPGQGLEWIG YINPYNDGTKYNEKFKGKATLTSDKSSTAYMELSS LTSEDSAVYYCARGTYYYGSRVFDYWGQGTTLTVS SGGGGSGGGGSGGGGSDIVMTQAAPSIPVTPGESVSI SCRSSKSLLNSNGNTYLYWFLQRPGQSPQLLIYRMS NLASGVPDRFSGSGSGTAFTLRISRVEAEDVGVYYC MQHLEYPFTFGAGTKLELKRSDPTTTPAPRPPTPAPT IASQPLSLRPEACRPAAGGAVHTRGLDFACDIYIWAP LAGTCGVLLLSLVITLYCKRGRKKLLYIFKQPFMRP VQTTQEEDGCSCRFPEEEEGGCELRVKFSRSADAPA YQQGQNQLYNELNLGRREEYDVLDKRRGRDPEMG GKPRRKNPQEGLYNELQKDKMAEAYSEIGMKGERR RGKGHDGLYQGLSTATKDTYDALHMQALPPR |
| 10 | ALLO-501_v1.2 | <u>METDTLLLWVLLLWVPGSTG</u>EVQLQQSGPELIKPG ASVKMSCKASGYTFTSYVMHWVKQKPGQGLEWIG YINPYNDGTKYNEKFKGKATLTSDKSSTAYMELSS LTSEDSAVYYCARGTYYYGSRVFDYWGQGTTLTVS SGGGGSGGGGSGGGGSDIVMTQAAPSIPVTPGESVSI SCRSSKSLLNSNGNTYLYWFLQRPGQSPQLLIYRMS NLASGVPDRFSGSGSGTAFTLRISRVEAEDVGVYYC MQHLEYPFTFGAGTKLELKRSDPTTTPAPRPPTPAPT IASQPLSLRPEACRPAAGGAVHTRGLDFACDIYIWAP LAGTCGVLLLSLVITLYCKRGRKKLLYIFKQPFMRP VQTTQEEDGCSCRFPEEEEGGCELRVKFSRSADAPA YQQGQNQLYNELNLGRREEYDVLDKRRGRDPEMG GKPRRKNPQEGLYNELQKDKMAEAYSEIGMKGERR RGKGHDGLYQGLSTATKDTYDALHMQALPPR |

SEQ ID NO. CHART

| SEQ ID NO | Description | Sequence |
|---|---|---|
| 11 | ALLO-501_v1.3 | MGTSLLCWMALCLLGADHADASGGGGSPAPRPPTP APTIASQPLSLRPEACRPAAGGAVHTRGLDFACDIYI WAPLAGTCGVLLLSLVITLYCNHRNRRRVCKCPRPV VRAEGRGSLLTCGDVEENPGPMETDTLLLWVLLLW VPGSTGEVQLQQSGPELIKPGASVKMSCKASGYTFT SYVMEIWVKQKPGQGLEWIGYINPYNDGTKYNEKF KGKATLTSDKSSTAYMELSSLTSEDSAVYYCARGT YYYGSRVFDYWGQTTLTVSSGGGGSGGGGSGGG GSDIVMTQAAPSIPVTPGESVSISCRSSKSLLNSNGNT YLYWFLQRPGQSPQLLIYRMSNLASGVPDRFSGSGS GTAFTLRISRVEAEDVGVYYCMQHLEYPFTFGAGTK LELKRSDPTTTPAPRPPTPAPTIASQPLSLRPEACRPA AGGAVHTRGLDFACDIYIWAPLAGTCGVLLLSLVIT LYCKRGRKKLLYIFKQPFMRPVQTTQEEDGCSCRFP EEEEGGCELRVKFSRSADAPAYQQGQNQLYNELNL GRREEYDVLDKRRGRDPEMGGKPRRKNPQEGLYNE LQKDKMAEAYSEIGMKGERRRGKHDGLYQGLST ATKDTYDALHMQALPPR |
| 12 | ALLO-501_v1.4 | MGTSLLCWMALCLLGADHADASGGGGSELPTQGTF SNVSTNVSSGGGGSPAPRPPTPAPTIASQPLSLRPEAC RPAAGGAVHTRGLDFACDIYIWAPLAGTCGVLLLSL VITLYCNHRNRRRVCKCPRPVVRAEGRGSLLTCGD VEENPGPMETDTLLLWVLLLWVPGSTGEVQLQQSG PELIKPGASVKMSCKASGYTFTSYVMHWVKQKPGQ GLEWIGYINPYNDGTKYNEKFKGKATLTSDKSSTA YMELSSLTSEDSAVYYCARGTYYYGSRVFDYWGQ GTTLTVSSGGGGSGGGGSGGGGSDIVMTQAAPSIPV TPGESVSISCRSSKSLLNSNGNTYLYWFLQRPGQSPQ LLIYRMSNLASGVPDRFSGSGSGTAFTLRISRVEAED VGVYYCMQHLEYPFTFGAGTKLELKRSDPTTTPAPR PPTPAPTIASQPLSLRPEACRPAAGGAVHTRGLDFAC DIYIWAPLAGTCGVLLLSLVITLYCKRGRKKLLYIFK QPFMRPVQTTQEEDGCSCRFPEEEEGGCELRVKFSR SADAPAYQQGQNQLYNELNLGRREEYDVLDKRRG RDPEMGGKPRRKNPQEGLYNELQKDKMAEAYSEIG MKGERRRGKHDGLYQGLSTATKDTYDALHMQAL PPR |
| 13 | ALLO-501_v1.5 | MGTSLLCWMALCLLGADHADACSGGGGGSCSGGG GSELPTQGTFSNVSTNVSPAKPTTTACSGGGGGSCS GGGGSPAPRPPTPAPTIASQPLSLRPEACRPAAGGAV HTRGLDFACDIYIWAPLAGTCGVLLLSLVITLYCNH RNRRRVCKCPRPVVRAEGRGSLLTCGDVEENPGPM ETDTLLLWVLLLWVPGSTGEVQLQQSGPELIKPGAS VKMSCKASGYTFTSYVMHWVKQKPGQGLEWIGYI NPYNDGTKYNEKFKGKATLTSDKSSTAYMELSSLT SEDSAVYYCARGTYYYGSRVFDYWGQGTTLTVSSG GGGSGGGGSGGGGSDIVMTQAAPSIPVTPGESVSISC RSSKSLLNSNGNTYLYWFLQRPGQSPQLLIYRMSNL ASGVPDRFSGSGSGTAFTLRISRVEAEDVGVYYCMQ HLEYPFTFGAGTKLELKRSDPTTTPAPRPPTPAPTIAS QPLSLRPEACRPAAGGAVHTRGLDFACDIYIWAPLA GTCGVLLLSLVITLYCKRGRKKLLYIFKQPFMRPVQ TTQEEDGCSCRFPEEEEGGCELRVKFSRSADAPAYQ QGQNQLYNELNLGRREEYDVLDKRRGRDPEMGGK PRRKNPQEGLYNELQKDKMAEAYSEIGMKGERRRG KHDGLYQGLSTATKDTYDALHMQALPPR |
| 14 | ALLO-501_v1.6 | MGTSLLCWMALCLLGADHADAELPTQGTFSNVSTN VSSGGGGSELPTQGTFSNVSTNVSPAKPTTTAELPTQ GTFSNVSTNVSSGGGGSPAPRPPTPAPTIASQPLSLRP EACRPAAGGAVHTRGLDFACDIYIWAPLAGTCGVL LLSLVITLYCNHRNRRRVCKCPRPVVRAEGRGSLLT CGDVEENPGPMETDTLLLWVLLLWVPGSTGEVQLQ QSGPELIKPGASVKMSCKASGYTFTSYVMHWVKQK PGQGLEWIGYINPYNDGTKYNEKFKGKATLTSDKSS STAYMELSSLTSEDSAVYYCARGTYYYGSRVFDYW GQGTTLTVSSGGGGSGGGGSGGGGSDIVMTQAAPSI PVTPGESVSISCRSSKSLLNSNGNTYLYWFLQRPGQS PQLLIYRMSNLASGVPDRFSGSGSGTAFTLRISRVEA EDVGVYYCMQHLEYPFTFGAGTKLELKRSDPTTTP APRPPTPAPTIASQPLSLRPEACRPAAGGAVHTRGLD |

SEQ ID NO. CHART

| SEQ ID NO | Description | Sequence |
|---|---|---|
| | | FACDIYIWAPLAGTCGVLLLSLVITLYCKRGRKKLL<br>YIFKQPFMRPVQTTQEEDGCSCRFPEEEEGGCELRV<br>KFSRSADAPAYQQGQNQLYNELNLGRREEYDVLDK<br>RRGRDPEMGGKPRRKNPQEGLYNELQKDKMAEAY<br>SEIGMKGERRRGKGHDGLYQGLSTATKDTYDALH<br>MQALPPR |
| 15 | EF1alpha (long 1189)_promoter_ GRCh38.p12_(v1.0_ v1.1_v1.3_v1.4_ v1.5_v1.6) | gcgtgaggctccggtgcccgtcagtgggcagagcgcacatcgcccacagtcccc<br>gagaagttggggggagggtcggcaattgaaccggtgcctagagaaggtggcg<br>cggggtaaactgggaaagtgatgtcgtgtactggctccgccttttttcccgagggtg<br>ggggagaaccgtatataagtgcagtagtcgccgtgaacgttCTTTTTCGC<br>AACGGGTTTGCCGCCAGAACACAGgtaagtgccgtgtgtgg<br>ttcccgcgggcctggcctcttttacgggtatggcccttgcgtgccttgaattacttcc<br>acgcccctggctgcagtacgtgattcttgatcccgagcttcgggttggaagtgggt<br>gggagagttcgaggccttgcgcttaaggagcccccttcgcctcgtgcttgagttgag<br>gcctggcctgggcgctggggccgccgcgtgcgaatctggtggcaccttcgcgcc<br>tgtctcgctgattcgataagtctctagccatttaaaattttttgatgacctgctgcgacg<br>cttttttttctggcaagatagtcttgtaaatgcgggccaagatctgcacactggtatttc<br>ggttttttggggccgcgggcggcgacggggcccgtgcgtcccagcgcacatgttc<br>ggcgaggcggggcctgcgagcgcggccaccgagaatcggacgggggtagtct<br>caagctggccggcctgctctggtgcctggcctcgccgccgcctgtatcgccccgc<br>cctgggcggcaaggctggcccggtcggcaccagttgcgtgagcggaaagatgg<br>ccgcttcccggccctgctgcagggagctcaaaatggaggacgcggcgctcggg<br>agagcgggcgggtgagtcacccacacaaaggaaaagggcctttccgtcctcagc<br>cgtcgcttcatgtgactccacggagtaccgggcgccgtccaggcacctcgattagt<br>tctcgagatttggagtacgtcgtattaggttgggggaggggttttatgcgatgga<br>gtttccccacactgagtgggtggagactgaagttaggccagcttggcacttgatgta<br>attctccttggaatttgcccttttttgagtttggatcttggttcattctcaagcctcagaca<br>gtggttcaaagttttttttcttccatttcagGTGTCGTGA |
| 16 | >EF1alpha_(short_ 237)_promoter_ GRCh38.p12_(v1.2) | gcgtgaggctccggtgcccgtcagtgggcagagcgcacatcgcccacagtcccc<br>gagaagttggggggagggtcggcaattgaaccggtgcctagagaaggtggcg<br>cggggtaaactgggaaagtgatgtcgtgtactggctccgccttttttcccgagggtg<br>ggggagaaccgtatataagtgcagtagtcgccgtgaacgttCTTTTTCGC<br>AACGGGTTTGCCGCCAGAACACAG |
| 17 | 4G7 immunoglobulin gamma 1 heavy chain | MEWSWIFLFLLSGTAGVHSEVQLQQSGPELIKPGAS<br>VKMSCKASGYTFTSYVMHWVKQKPGQGLEWIGYI<br>NPYNDGTKYNEKFKGKATLTSDKSSSTAYMELSSLT<br>SEDSAVYYCARGTYYYGSRVFDYWGQGTTLTVSSA<br>KTTPPSVYPLAPGSAAQTNSMVTLGCLVKGYFPEPV<br>TVTWNSGSLSSGVHTFPAVLQSDLYTLSSSVTVPSST<br>WPSETVTCNVAHPASSTKVDKKIVPRDCGCKPCICT<br>VPEVSSVFIFPPKPKDVLTITLTPKVTCVVVDISKDDP<br>EVQFSWFVDDVEVHTAQTQPREEQFNSTFRSVSELPI<br>MHQDWLNGKEFKCRVNSAAFPAPIEKTISKTKGRPK<br>APQVYTIPPPKEQMAKDKVSLTCMITDFFPEDITVE<br>WQWNGQPAENYKNTQPIMDTDGSYFVYSKLNVQK<br>SNWEAGNTFTCSVLHEGLHNHHTEKSLSHSPGK |
| 18 | 4G7 immunoglobulin kappa light chain | MRCLAEFLGLLVLWIPGAIGDIVMTQAAPSIPVTPGE<br>SVSISCRSSKSLLNSNGNTYLYWFLQRPGQSPQLLIY<br>RMSNLASGVPDRFSGSGSGTAFTLRISRVEAEDVGV<br>YYCMQHLEYPFTFGAGTKLELKRADAAPTVSIFPPS<br>SEQLTSGGASVVCFLNNIFYPKDINVKWKIDGSERQN<br>GVLNSWTDQDSKDSTYSMSSTLTLTKDEYERHNSY<br>TCEATHKTSTSPIVKSFNRNEC |
| 19 | RQR8 | CPYSNPSLCSGGGGSELPTQGTFSNVSTNVSPAKPTT<br>TACPYSNPSLCSGGGGSP<br>APRPPTPAPTIASQPLSLRPEACRPAAGGAVHTRGLD<br>FACDIYIWAPLAGTCGVLLLS<br>LVITLYCNHRNRRRVCKCPRPVV |
| 20 | Suicide peptide signal sequence | MGTSLLCWMALCLLGADHADA |
| 21 | Signal Sequence and RQR8 | MGTSLLCWMALCLLGADHADACPYSNPSLCSGGG<br>GSELPTQGTFSNVSTNVSPAKPTTTACPYSNPSLCSG<br>GGGSPAPRPPTPAPTIASQPLSLRPEACRPAAGGAVH<br>TRGLDFACDIYIWAPLAGTCGVLLLSLVITLYCNHR<br>NRRRVCKCPRPVV |

SEQ ID NO. CHART

| SEQ ID NO | Description | Sequence |
|---|---|---|
| 22 | Rituximab mimotope | CPYSNPSLC |
| 23 | Palivizumab epitope | NSELLSLINDMPITNDQKKLMSNN |
| 24 | Cetuximab mimotope 1 | CQFDLSTRRLKC |
| 25 | Cetuximab mimotope 2 | CQYNLSSRALKC |
| 26 | Cetuximab mimotope 3 | CVWQRWQKSYVC |
| 27 | Cetuximab mimotope 4 | CMWDRFSRWYKC |
| 28 | Nivolumab Epitope 1 | SFVLNWYRMSPSNQTDKLAAFPEDR |
| 29 | Nivolumab Epitope 2 | SGTYLCGAISLAPKAQIKE |
| 30 | QBEND-10 Epitope | ELPTQGTFSNVSTNVS |
| 31 | Alemtuzumab epitope | GQNDTSQTSSPS |
| 32 | FcγRIIIα hinge | GLAVSTISSFFPPGYQ |
| 33 | CD8α hinge | TTTPAPRPPTPAPTIASQPLSLRPEACRPAAGGAVHT RGLDFACD |
| 34 | IgG1 hinge | EPKSPDKTHTCPPCPAPPVAGPSVFLFPPKPKDTLMI ARTPEVTCVVVDVSHEDPEVKFNWYVDGVEVHNA KTKPREEQYNSTYRVVSVLTVLHQDWLNGKEYKC KVSNKALPAPIEKTISKAKGQPREPQVYTLPPSRDEL TKNQVSLTCLVKGFYPSDIAVEWESNGQPENNYKTT PPVLDSDGSFFLYSKLTVDKSRWQQGNVFSCSVMH EALHNHYTQKSLSLSPGK |
| 35 | CD8α transmembrane | IYIWAPLAGTCGVLLLSLVIT |
| 36 | CD8α hinge/ transmembrane | TTTPAPRPPTPAPTIASQPLSLRPEACRPAAGGAVHT RGLDFACDIYIWAPLAGTCGVLLLSLVIT |
| 37 | 41BB (intracellular domain) | KRGRKKLLYIFKQPFMRPVQTTQEEDGCSCRFPEEE EGGCEL |
| 38 | CD3ζ cytoplasmic signaling domain | LRVKFSRSADAPAYQQGQNQLYNELNLGRREEYDV LDKRRGRDPEMGGKPRRKNPQEGLYNELQKDKMA EAYSEIGMKGERRRGKGHDGLYQGLSTATKDTYDA LHMQALPPR |
| 39 | EF1a first intron | GTAAGTGCCGTGTGTGGTTCCCGCGGGCCTGGCCT CTTTACGGGTTATGGCCCTTGCGTGCCTTGAATTA CTTCCACGCCCCTGGCTGCAGTACGTGATTCTTGA TCCCGAGCTTCGGGTTGGAAGTGGGTGGGAGAGT TCGAGGCCTTGCGCTTAAGGAGCCCCTTCGCCTCG TGCTTGAGTTGAGGCCTGGCCTGGGCGCTGGGGC CGCCGCGTGCGAATCTGGTGGCACCTTCGCGCCTG TCTCGCTGCTTTCGATAAGTCTCTAGCCATTTAAA ATTTTTGATGACCTGCTGCGACGCTTTTTTTCTGGC AAGATAGTCTTGTAAATGCGGGCCAAGATCTGCA CACTGGTATTTCGGTTTTTGGGGCCGCGGGCGGCG ACGGGGCCCGTGCGTCCCAGCGCACATGTTCGGC GAGGCGGGGCCTGCGAGCGCGGCCACCGAGAATC GGACGGGGGTAGTCTCAAGCTGGCCGGCCTGCTC TGGTGCCTGGCCTCGCGCCGCCGTGTATCGCCCCG |

SEQ ID NO. CHART

| SEQ ID NO | Description | Sequence |
|---|---|---|
| | | CCCTGGGCGGCAAGGCTGGCCCGGTCGGCACCAG<br>TTGCGTGAGCGGAAAGATGGCCGCTTCCCGGCCC<br>TGCTGCAGGGAGCTCAAAATGGAGGACGCGGCGC<br>TCGGGAGAGCGGGCGGGTGAGTCACCCACACAAA<br>GGAAAAGGGCCTTTCCGTCCTCAGCCGTCGCTTCA<br>TGTGACTCCACGGAGTACCGGGCGCCGTCCAGGC<br>ACCTCGATTAGTTCTCGAGCTTTTGGAGTACGTCG<br>TCTTTAGGTTGGGGGGAGGGGTTTTATGCGATGG<br>AGTTTCCCCACACTGAGTGGGTGGAGACTGAAGT<br>TAGGCCAGCTTGGCACTTGATGTAATTCTCCTTGG<br>AATTTGCCCTTTTTGAGTTTGGATCTTGGTTCATTC<br>TCAAGCCTCAGACAGTGGTTCAAAGTTTTTTTCTT<br>CCATTTCAG |
| 40 | LQL8 | CSGGGGGSCSGGGGSELPTQGTFSNVSTNVSPAKPT<br>TTACSGGGGGSCSGGGGSPAPRPPTPAPTIASQPLSL<br>RPEACRPAAGGAVHTRGLDFACDIYIWAPLAGTCG<br>VLLLSLVITLYCNHRNRRRVCKCPRPVV |

What is claimed is:

1. A method of treating a CD19-expressing cancer or malignancy in a subject in need thereof comprising administering to the subject an engineered immune cell that comprises an isolated polynucleotide encoding a polypeptide comprising an anti-CD19 chimeric antigen receptor (CAR) that comprises the amino acid sequence of SEQ ID NO: 9, wherein the polypeptide does not comprise a rituximab binding site, wherein the polynucleotide comprises a nucleic acid sequence having at least 90% identity to SEQ ID NO: 3 and a short EF1a promoter that is capable of expressing the anti-CD19 chimeric antigen receptor (CAR) in a mammalian T cell, and wherein the short EF1a promoter comprises the nucleic acid sequence of SEQ ID NO:16 and does not comprise the nucleic acid sequence of SEQ ID NO:39.

2. The method of claim 1, wherein the CD19-expressing cancer or malignancy is Non-Hodgkin lymphoma (NHL).

3. The method of claim 1 or 2, wherein the subject has been treated or is currently being treated with rituximab.

4. The method of claim 1, wherein the polypeptide further comprises a safety switch.

5. The method of claim 4, wherein the safety switch is linked to the CD19 CAR using a linker peptide.

6. The method of claim 4, wherein the safety switch is linked to the anti-CD19 CAR using a T2A linker.

7. The method of claim 4, wherein the safety switch comprises an antibody binding site.

8. The method of claim 4, wherein the safety switch comprises a mutated CD20 rituximab mimotope.

9. The method of claim 4, wherein the polypeptide comprises a CD34 epitope.

10. The method of claim 9, wherein the CD34 epitope is a QBEND-10 epitope.

11. The method of claim 1, wherein the polypeptide further comprises a CD8 hinge/transmembrane domain.

12. The method of claim 1, wherein the polynucleotide encodes a polypeptide that comprises any one of the amino acid sequences of SEQ ID NOs: 11-14.

13. The method of claim 1, wherein the polynucleotide comprises a nucleic acid sequence having at least 95% identity to SEQ ID NO: 3.

14. The method of claim 1, wherein the polynucleotide comprises a nucleic acid sequence having at least 96% identity to SEQ ID NO: 3.

15. The method of claim 1, wherein the polynucleotide comprises a nucleic acid sequence having at least 98% identity to SEQ ID NO: 3.

16. The method of claim 1, wherein the polynucleotide comprises a nucleic acid sequence having at least 99% identity to SEQ ID NO: 3.

17. The method of claim 1, wherein the polynucleotide comprises the nucleic acid sequence shown in SEQ ID NO: 3.

18. The method of claim 1, wherein the engineered immune cell is a T cell, tumor infiltrating lymphocyte (TIL), NK cell, TCR-expressing cell, dendritic cell, or NK-T cell.

19. The method of claim 18, wherein the T cell is an autologous T cell.

20. The method of claim 18, wherein the T cell is an allogeneic T cell.

21. The method of claim 1, wherein the engineered cell is resistant to rituximab.

\* \* \* \* \*

SEQUENCE LISTING

```
Sequence total quantity: 41
SEQ ID NO: 1              moltype = DNA  length = 2019
FEATURE                   Location/Qualifiers
misc_feature              1..2019
                          note = Description of Artificial Sequence: Synthetic
                          polynucleotide
misc_feature              1..2019
                          note = chimeric antigen receptor
source                    1..2019
                          mol_type = other DNA
                          organism = synthetic construct
SEQUENCE: 1
atgctgacca gcctgctgtg ctggatggcc ctgtgcctgc tgggcgccga ccacgccgat   60
gcctgcccct acagcaaccc cagcctgtgc agcggaggcg gcggcagcga gctgccacct  120
cagggcacct tctccaacgt gtccaccaac gtgagcccag ccaagcccac caccaccgcc  180
tgtccttatt ccaatccttc cctgtgtagc ggaggggggag gcagcccagc cccagacct   240
cccaccccag cccccaccat cgccagccag cctctgagcc tgagacccga ggcctgccgc  300
ccagccgccg gcgcgccgt gcacaccaga ggcctggatt tcgcctgcga tatctacatc   360
tgggcccac tggccggcac ctgtggcgtg ctgctgctga gcctggtgat caccctgtac   420
tgcaaccacc gcaaccgcag gcgcgtgtgc aagtgcccca ggcccgtgt gagagccgag   480
ggcagaggca gcctgctgac ctgcggcgac gtggaggaga cccaggccc catggagacc   540
gacaccctgc tgctgtgggt gctgctgctg tgggtgccag gcagcaccgg cgaggtgcag   600
ctgcagcaga gcggacccga gctgatcaag ccaggcgcca gcgtgaagat gagctgcaag   660
gccagcggct acaccttcac cagctacgtg atgcactggt gaagcagaa gccaggccag   720
ggcctggagt ggatcggcta catcaacccc tacaacgacg gcaccaagta caacgagaag   780
ttcaagggca aggccaccct gaccagcgac aagagcagca gcaccgccta catggagctg   840
agcagcctga ccagcgagga cagcgccgtg tactactgcg ccagaggcac ctactactac   900
ggcagccggg tgttcgacta ctggggccag ggcaccaccc tgaccgtgag ctctggcgga   960
ggcggctctg gcggaggcgg ctctggcgga ggcggcagcg acatcgtgat gacccaggct  1020
gccccccagca tccccgtgac cccaggcgag agcgtgagca tcagctgccg gagcagcaag  1080
agcctgctga acagcaacgg caacaccac ctgtactggt tcctgcagcg gccaggccag  1140
agcccccagc tgctgatcta ccggatgagc aacctgcgcc gcggcgtgcc tgaccggttc  1200
agcggcagcg gcagcggcac cgccttcacc ctgcggatca gccgggtgga ggccgaggac  1260
gtgggcgtgt actactgcat gcagcacctg gagtaccct tcaccttcgg agccggcacc  1320
aagctggagc tgaagcggtc ggatcccacc accaccccag cccacgcc acctaccct   1380
gccccaacca tcgccagcca gcccctgagc ctgcggccga aagcctgcag gcctgccgcc  1440
ggaggagccg tgcacacaag gggcctggac ttcgcctgcg acatctatat ctgggcccc  1500
ctggccggga catgcgggt gctgctgctg tccctggtga ttacactgta ttgcaaacgg  1560
ggccggaaga agctgctgta catcttcaag cagcccttca tgcggccgt gcagaccacc  1620
caggaggagg acggctgcag ctgccggttc ccgaggaag aggaaggcgg ctgcgagctg  1680
cgggtgaagt tcagccgag cgccgacgcc ccagctacc agcagggcca gaaccagctg  1740
tacaacgagc tgaacctggg acggcggag gagtacgacg tgctgacaa gcggcgggga  1800
cgggaccccg agatgggcgg caagcctcgc cggaagaatc cccaggaggg cctgtacaac  1860
gagctgcaga aggacaagat ggccgaggcc tacagcgaga tcggcatgaa gggcgagcgg  1920
cgcaggggca agggccacga cggcctgtac cagggcctga gcaccgccac caaggacacc  1980
tacgacgccc tgcacatgca ggccctgcca cccggtga                          2019

SEQ ID NO: 2              moltype = DNA  length = 1488
FEATURE                   Location/Qualifiers
```

| | | |
|---|---|---|
| misc_feature | 1..1488 note = Description of Artificial Sequence: Synthetic polynucleotide | |
| misc_feature | 1..1488 note = chimeric antigen receptor | |
| source | 1..1488 mol_type = other DNA organism = synthetic construct | |

SEQUENCE: 2

```
atggagaccg acaccctgct gctgtgggtg ctgctgctgt gggtgccagg cagcaccggc    60
gaggtgcagc tgcagcagag cggacccgag ctgatcaagc caggcgccag cgtgaagatg   120
agctgcaagg ccagcggcta caccttcacc agctacgtga tgcactgggt gaagcagaag   180
ccaggccagg gcctggagtg gatcggctac atcaacccct acaacgacgg caccaagtac   240
aacgagaagt tcaagggcaa ggccaccctg accagcgaca agagcaccag caccgcctac   300
atggagctga gcagcctgac cagcgaggac agcgccgtgt actactgcgc cagaggcacc   360
tactactacg gcagccgggt gttcgactac tggggccagg gcaccaccct gaccgtgagc   420
tctggcggag gcggctctgg cggaggcggc tctggcggag gcggcagcga catcgtgatg   480
acccaggctg ccccagcat ccccgtgacc ccaggcgaga gcgtgagcat cagctgccgg   540
agcagcaaga gcctgctgaa cagcaacggc aacacctacc tgtactggtt cctgcagcgg   600
ccaggccaga gcccccagct gctgatctac cggatgagca acctggccag cggcgtgccc   660
gaccggttca gcggcagcgg cagcggcacc gccttcaccc tgcggatcag ccgggtggag   720
gccgagacg tgggcgtgta ctactgcatg cagcacctgg agtaccccct caccttcgga   780
gccggcacca agctggagct gaagcggtcg gatcccacca ccaccccagc cccacgcca   840
cctaccctg cccaaccat cgccagccag cccctgagcc tgcggcctga agcctgcagg   900
cctgccgccg gaggagccgt gcacacaagg ggcctggact tcgcctgcga catctatatc   960
tgggcccccc tggccgggac atgcggggtg ctgctgctgt ccctggtgat tacactgtat  1020
tgcaaacggg gccggaagaa gctgctgtac atcttcaagc agcccttcat gcggcccgtg  1080
cagaccaccc aggaggagga cggctgcagc tgccggttcc ccgaggaaga ggaaggcggc  1140
tgcgagctgc gggtgaagtt cagccggagc gccgacgccc cagcctacca gcagggccag  1200
aaccagctgt acaacgagct gaacctggga cggcgggagg agtacgacgt gctggacaag  1260
cggcggggac gggaccccga gatgggcggc aagcctcgcc ggaagaatcc ccaggagggc  1320
ctgtacaacg agctgcagaa ggacaagatg gccgaggcct acagcgagat cggcatgaag  1380
ggcgagcggc gccggggcaa gggccacgac ggcctgtacc agggcctgag caccgccacc  1440
aaggacacct acgacgccct gcacatgcag gccctgccac ccggtga              1488
```

| | | |
|---|---|---|
| SEQ ID NO: 3 FEATURE misc_feature | moltype = DNA length = 1488 Location/Qualifiers 1..1488 note = Description of Artificial Sequence: Synthetic polynucleotide | |
| misc_feature | 1..1488 note = chimeric antigen receptor | |
| source | 1..1488 mol_type = other DNA organism = synthetic construct | |

SEQUENCE: 3

```
atggagacag ataccctgct gctgtgggtg ctgctgctgt gggtgcctgg ctccacagga    60
gaggtgcagc tgcagcagtc tggaccagag ctgatcaagc ctggagcatc cgtgaagatg   120
tcttgcaagg ccagcggcta cattcacc agctacgtga tgcactgggt gaagcagaag   180
cctgccagg gcctggagtg gatcggctat atcaatccat acaacgacgg caccaagtat   240
aatgagaagt ttaagggcaa ggccacactg acctctgata gagctcctc tacagcctac   300
atggagctga gctccctgac ctctgaggac agcgccgtgt actattgcgc cagaggcaca   360
tactattacg gcagcagggt gttcgattac tggggccagg gcaccacact gaccgtgtct   420
agcgaggag aggctccgg aggaggaggc tctggcggcg gcgcagcga catcgtgatg   480
acacaggcag caccaagcat cccagtgacc cctggcgaga gcgtgtccat ctcttgtcgg   540
tcctctaagt ccctgctgaa ctctaatggc aacacctatc tgtactggtt tctgcagcgg   600
cccgacagt ccccacagct gctgatctat aggatgagca acctggcatc cggagtgcct   660
gatcgcttca gcggctccgg ctctggaaca gcctttaccc tgaggatctc tcgggtggag   720
gcagaggacg tgggcgtgta ttactgcatg cagcacctgg agtaccccctt cacatttggc   780
gcaggaacca agctggagc gaagcggagc gaccccacca caaccccctgc accacgccc   840
cctacaccag cacctaccat cgcatctcag ccactgagcc tgcggcccga ggcctgtagg   900
cctgcagcag gaggagcagt gcacaccagg ggcctggact tcgcctgcga tatctatatc   960
tgggcaccac tggcaggaac atgtggcgtg ctgctgctga gccggtcat caccctgtat  1020
tgcaagagag gcaggaagaa gctgctgtac atcttcaagc agccttttat gcggcccgtg  1080
cagacaaccc aggaggagga tggctgctcc tgtagattcc cagaggagga gggaggagga  1140
tgtgagctgc gcgtgaagtt tagccggtcc gccgacgcac agcatatca gcagggccag  1200
aatcagctgt acaatgagct gaacctgggc cggagagagg agtacgacgt gctggataag  1260
aggaggggaa gggaccccga gatgggaggc aagccacgga aaagaatcc caggagggc  1320
ctgtataacg agctgcagaa ggataagatg gccgaggcct acagcgagat cggcatgaag  1380
ggagagaggc gccggggcaa gggacacgac ggcctgtatc agggcctgtc cacagccacc  1440
aaggacacct acgatgccct gcacatgcag gccctgccac caaggtga              1488
```

| | | |
|---|---|---|
| SEQ ID NO: 4 FEATURE misc_feature | moltype = DNA length = 1875 Location/Qualifiers 1..1875 note = Description of Artificial Sequence: Synthetic polynucleotide | |
| misc_feature | 1..1875 note = chimeric antigen receptor | |

| source | 1..1875 |
| --- | --- |
| | mol_type = other DNA |
| | organism = synthetic construct |

SEQUENCE: 4

```
atgggaacaa gcctgctgtg ctggatggct ctgtgcctgc tggggggccga ccacgctgac   60
gcctccgggg gggggggctc tcctgcccct aggcccccta cacctgcacc aaccatcgca  120
tcccagccac tgtctctgcg ccctgaggcc tgccggccag cagcaggagg agcagtgcac  180
acccgcggcc tggacttcgc ctgcgatatc tatatctggg caccactggc aggcacatgt  240
ggcgtgctgc tgctgagcct ggtcatcacc ctgtactgca atcacaggaa ccggagaagg  300
gtgtgcaagt gtccccggcc tgtggtgaga gcagagggaa ggggcagcct gctgacatgt  360
ggcgacgtgg aggagaatcc aggccctatg gagacagata ccctgctgct gtgggtgctg  420
ctgctgtggg tgcccggcag caccggagag gtgcagctgc agcagtccgg accagagctg  480
atcaagcctg agccagcgt gaagatgtcc tgtaaggcct ggctatac attcaccagc  540
tacgtgatgc actgggtgaa gcagaagcct ggccagggcc tggagtggat cggctatatc  600
aatccataca acgacggcac aaagtataac gagaagttta agggcaaggc cacactgacc  660
tccgataaga gctcctctac agcctacatg agctgagct ccctgacctc tgaggacagc  720
gccgtgtact attgcgccag aggcacatac tattacggct ctagggtgtt cgattactgg  780
ggccagggca ccacactgac cgtgtctagc ggaggaggag gcagcggagg aggaggctcc  840
ggcggcggcg gctctgacat cgtgatgaca caggcagcac catccatccc agtgaccect  900
ggcgagagcc tgtccatctc ttgtcggtcc tctaagagcc tgctgaactc caatggcaac  960
acctatctgt actggtttct gcagcggccc ggacagagcc cacagctgct gatctatagg 1020
atgtctaatc tggcaagcgg cgtgcccgat cgcttcagcg gcagcggctc tggcacagcc 1080
tttaccctga ggatctcccg cgtggaggca gaggacgtgg gcgtgtatta ctgcatgcag 1140
cacctggagt acccccttcac atttggcgca ggcaccaagc tggagctgaa gcggagcgac 1200
cccaccacaa cccctgcacc acggccaccc acaccagcac ctactattgc atcccagcca 1260
ctgagcctgc ggcccgaggc ctgtaggcct gccgcgggca gcagtgca caccggggcc 1320
ctggactttg cctgcgatat ctacatctgg gcacctctgg ccggcacatg cggcgtgctg 1380
ttactgagcc tggtcatcac cctgtattgc aagcggggca gaaagaagct gctgtacatc 1440
ttcaagcagc ttttatgcg gccagtgcag acaacccagg aggaggatgg ctgctcctgt 1500
agattcccag aggaggagga ggaggatgt gagctgcgg tgaagtttag ccggtccgcc 1560
gacgcaccag catatcagca gggccagaac cagctgtaca atgagctgaa cctgggccgg 1620
agagaggagt atgacgtgct ggataagaga cggggccggg accccgagat gggaggcaag 1680
ccacgccgga agaatcccca ggagggcctg tataacgagc tgcagaagga taagatggcc 1740
gaggcctaca gcgagatcgg catgaaggga gagaaggc gcggcaaggg acacgacggc 1800
ctgtaccagg gcctgagcac agcaacaaaa gacacctacg acgcactgca catgcaggct 1860
ctgccccctc ggtaa                                                  1875
```

| SEQ ID NO: 5 | moltype = DNA   length = 1941 |
| --- | --- |
| FEATURE | Location/Qualifiers |
| misc_feature | 1..1941 |
| | note = Description of Artificial Sequence: Synthetic polynucleotide |
| misc_feature | 1..1941 |
| | note = chimeric antigen receptor |
| source | 1..1941 |
| | mol_type = other DNA |
| | organism = synthetic construct |

SEQUENCE: 5

```
atgggaacct ctctgctgtg ctggatggct ctgtgcctgc tggggggccga tcacgctgac   60
gcaagtggcg gggggggtc cgaactgccc acacagggca ccttctccaa cgtgagcacc  120
aacgtgagct ccggcggagg aggcagccct gcaccaagc cccctacacc agcacctacc  180
atcgcatctc agccactgag cctgcgcccc gaggcctgcc ggcctgcagc aggcggcgcc  240
gtgcacaccc gcgcctgga cttttgcctgc gatatctata tctgggcacc tctggcaggc  300
acatgtggct gctgctgct gagcctggtc atccctgt actgcaatca caggaaccgg  360
agaagggtgt gcaagtgtcc acggcccgtg tgagagcga aggggaaggg ctccctgctg  420
acatgtggca acgtgaggaa gaatcctggc ccaatggaga cagataccct gctgctgtgg  480
gtgctgctgc tgtgggtgcc cggctccacc ggagaggtgc agctgcagca gtctggacca  540
gagctgatca gccaggagc atccgtgaag atgtcttgta aggccagcgg ctatacattc  600
accagctacg tgatgcactg ggtgaagcag aagccaggac agggcctgga gtggatcggc  660
tatatcaatc cttacaacga cggcaccaag tataacgaga gtttaaggg caaggccaca  720
ctgacctctg ataagtctag ctccacagcc tacatggagc tgtctagcct gaccagcgag  780
gactccgccg tgtactattg cgccagaggc acatactatt acggcagcag ggtgttcgat  840
tactgggccc agggcaccac actgaccgtg tcctctggag gaggaggctc cggaggagga  900
ggctctggcg gcggcggcag cgacatcgtg atgacacagg cagccttc catccgcatct  960
accccaggcg agtctgtgag catctcctgt cggagctcca gtccctgct gaactctaat 1020
ggcaacacct atctgtactg gtttctgcag cggcccggac agtccccaca gctgctgatc 1080
tataggatga gcaatctggc ctccggcgtg ccagatcgct tctctggcag cggctccggc 1140
acagccttta cctgaggat ctctcgcgtg gaggcagagg acgtgggcgt gtattactgc 1200
atgcagcacc tggagtaccc attcacattt ggccaggca ccaagctgga gctgaagcgg 1260
agcgacccca ccacaacccc agcacctcgg ccaccacac cagcacccac catcgcatct 1320
cagcctctga gcctgcggcc cgaggcctgt aggcccgcag caggaggagc agtgcacacc 1380
cggggcctga cttcgcctg cgatatctac atctgggcac actggccgg cacatgcggc 1440
gtgctgttac tgagcctggt catcaccctg tattgcaagc ggggcagaaa gaagctgctg 1500
tacatcttca agcagccctt tatgcgcct gtgcagacaa cccaggagga ggatggctgc 1560
tcctgtagat ccctgaggg ggaggaggga ggatgtgagc tgcgcgtgaa gttttctcgg 1620
agcgccgacg caccagcata tcagcaggga cagaaccagc tgtacaatga gctgaacctg 1680
ggccggagag aggagtatga cgtgctggat aagacgggg ccgggacccc gagatggga 1740
ggcaagcctc gccggaagaa tccacaggag ggcctgtata cgagctgca gaaggataag 1800
atggccgagg cctacagcga gatcggcatg aaggagaga gaaggcgcgg caagggacac 1860
```

```
gacggcctgt accagggcct gagcacagca acaaaagaca cctacgacgc actgcacatg  1920
caggctctgc caccaagatg a                                            1941
```

| SEQ ID NO: 6 | moltype = DNA  length = 2019 |
|---|---|
| FEATURE | Location/Qualifiers |
| misc_feature | 1..2019 |
| | note = Description of Artificial Sequence: Synthetic polynucleotide |
| misc_feature | 1..2019 |
| | note = chimeric antigen receptor |
| source | 1..2019 |
| | mol_type = other DNA |
| | organism = synthetic construct |

```
SEQUENCE: 6
atggggacct cactgctgtg ctggatggct ctgtgcctgc tggggccga ccacgctgac   60
gcctgctctg ggggggggg gggctcatgc tccggaggag gaggctctga gctgccaacc  120
cagggcacat tctccaacgt gagcaccaac gtgtctcctg ccaagccaac acaaccgca  180
tgcagcggcg gaggaggagg cagctgttcc ggcggcggcg gcagccctgc cccaaggccc  240
cctaccccag cacctacaat cgcatctcag cctctgagcc tgcgcccaga ggcctgtcgg  300
cccgcagcag gaggagcagt gcacaccgc ggcctggact tgcctgcga tatctatatc   360
tgggcaccac tggcaggcac ctgtggcgtg ctgctgctga gcctggtcat caccctgtac  420
tgcaatcaca ggaaccggag aagggtgtgc aagtgtccac ggccgtggt gagagcagag   480
ggaagggggct ctctgctgac ctgtggcgac gtggaggaga atcctggccc tatggagaca  540
gatacactgc tgctgtgggt gctgctgctg tgggtgcccg gcagcacagg agaggtgcag  600
ctgcagcagt ccgacctga gctgatcaag ccaggcgcct ccgtgaagat gtcttgcaag   660
gccagcggct ataccttcac aagctacgtg atgcactgga tgaagcagaa gccaggccag  720
ggcctggagt ggatcggcta tcaatccc tacaacgacg gcaccaagta taacgagaag    780
tttaagggca aggccaccct gacaagcgat aagagctcct ctaccgccta catggagctg  840
agctccctga caagcgagga ctccgccgtg tactattgcg ccagaggcac ctactattac  900
ggctccaagg tgttcgatta ctgggggcag ggcacaaccc tgacagtgtc tagcggagga  960
ggaggcagcg gaggaggagg ctccggcggc ggcggctctg acatcgtgat gacccaggca 1020
gcaccatcca tccctgtgac accaggcgag tctgtgagca tctcctgtcg gtcctctaag 1080
tccctgctga actctaatgg caacacctat ctgtactggt tctgcagcg gcccggacag  1140
tctcctcagc tgctgatcta taggatgagc aatctggcct ccggcgtgcc tgatcgcttc 1200
tctggcagcg gctccggcac cgccttaca ctgaggatca gccgcgtgga ggcagaggac  1260
gtgggcgtgt attactgcat gcagcacctg gagtaccctt tcacctttgg cgccggcaca 1320
aagctggagc tgaagcggag cgaccccaca accacccag cacctcggcc acccacccca  1380
gcaccaacaa tcgcatctca gccactgagc ctgcggcccg aggcctgtag gccagccgcc 1440
ggcggcgcag tgcacacccg gggcctggac ttcgcctgca atatctacat ctgggcccct 1500
ctggccggca cctgcggcgt gctgttactg agcctggtca tcaccctgta ttgcaagcgg 1560
ggcagaaaga agctgctgta catcttcaag cagcccttca tgcggcccgt gcagaccaca 1620
caggaggagg atggctgctc ctgtagattc ccagaggagg aggagggagg atgtgagctg 1680
cgcgtgaagt tttctcggag cgccgacgca cctgcatatc agcagggaca gaaccagctg 1740
tacaatgagc tgaacctggg ccggagagag gagtatgacg tgctggataa gagacggggc 1800
cgggaccccg agatgggagg caagcccgc cggaagaatc ctcaggaggg cctgtataac  1860
gagctgcaga aggataagat ggccgaggcc tacagcgaga tcggcatgaa gggagagaga 1920
aggcgcggca agggccacga cggcctgtac caggcctgt ccacagcaac aaaggatact  1980
tatgacgctc tgcacatgca ggctctgccc cctcggtga                        2019
```

| SEQ ID NO: 7 | moltype = DNA  length = 2061 |
|---|---|
| FEATURE | Location/Qualifiers |
| misc_feature | 1..2061 |
| | note = Description of Artificial Sequence: Synthetic polynucleotide |
| misc_feature | 1..2061 |
| | note = chimeric antigen receptor |
| source | 1..2061 |
| | mol_type = other DNA |
| | organism = synthetic construct |

```
SEQUENCE: 7
atgggaacca gctgctgtg ctggatggca ctgtgcctgc tgggagcaga ccacgccgat    60
gccgaactgc ctactcaggg gacattctct aatgtgagca ccaacgtgag ctctggagga  120
ggaggctccg agctgccaac ccagggcaca ttctctaatg tgagcacaaa cgtgtctccc  180
gccaagccaa ccacaaccgc cgaactgcct acccaggca cattttccaa cgtgtctacc   240
aacgtgtcta gcggaggagg aggctccccc gcacctagga cccctacccc agcaccaaca  300
atcgcaagcc agcctctgtc cctgcgccca gaggcatgca ggccagcagc aggaggagca  360
gtgcacaccc gcgcctgga ctttgcctgc gatatctata tctgggcacc actggcagga   420
acctgtggcg tgctgctgct gtctctggtc atcaccgtgt actgcaatca cagaaaccgg  480
agaagggtgt gcaagtgtcc tcggccagtg gtgagagcag agggaagggg cagcctgctg  540
acctgtggcg acgtggagga gaatcccggc cctatggaga cagatacact gctgctgtgg  600
gtgctgctgc tgtgggtgcc aggctctaca ggagaggtgc agctgcagca gagcggacct  660
gagctgatca gccaggcgc ctctgtgaag atgagctgaa ggcctccggg ctataccttc    720
acaagctacg tgatgcactg ggtgaagcag aagccaggcc agggcctgga gtggatcggc  780
tatcaatccc cctacaacga cggcaccaag tataacgagaa gtttaaggg caaggccacc   840
ctgacatcga ataagagctc ctctaccgcc tacatggagc tgagctccct gacatccgag  900
gactctgccg tgtactattg cgccagaggc acctactatt acggctctag ggtgttcgat  960
tactggggc agggcacaac cctgacagtg tctagcggag gaggaggctc tggaggagga 1020
ggcagcggcg gcggaggctc cgacatcgtg atgacccagg cagccatc atcccagtg    1080
acacctggcg agagcgtgtc catctcttgt aggtcctcta gtctctgct gaacagcaat 1140
```

-continued

```
ggcaacacct atctgtactg gtttctgcag cggcccggac agagccctca gctgctgatc   1200
tataggatgt ccaatctggc ctctggagtg cctgatcgct tcagcggctc cggctctgga   1260
accgccttta cactgaggat ctcccgcgtg gaggcagagg acgtgggcgt gtattactgc   1320
atgcagcacc tggagtaccc ttttcacctt tggcgccggca caaagctgga gctgaagcgg   1380
agcgacccca caaccacacc agcacccccgg ccaccaaccc ctgcccctac aatcgcaagc   1440
cagccactgt ccctgcggcc cgaggcctgt agacctgccg ccgccggcgc cgtccatacc   1500
cgcggcctgg atttcgcctg cgatatctac atttggggcc ctctggccgg cacttgcggc   1560
gtgctgctgc tgagcctggt catcaccctg tattgcaagc ggggcagaaa gaagctgctg   1620
tacatcttca gcagcccttt catgcggccc gtgcagacca cacaggagga ggatggctgc   1680
tcctgtagat tcccagagga ggaggaggga ggatgtgagc tgcgcgtgaa gtttagccgg   1740
tccgccgacg cacctgcata tcagcagggc cagaaccagc tgtacaatga gctgaacctg   1800
ggccggagag aggagtacga cgtgctggat aagagaaggg gacgggaccc cgagatggga   1860
ggcaagcccc gccggaagaa tcctcaggag ggcctgtata cgagctgcaa gaaggataag   1920
atggccgagg cctacagcga gatcggcatg aagggagaga aaggcgcgg caaggacac   1980
gacggcctgt atcagggcct gtccaccgcc acaaaggaca cctacgatgc cctgcacatg   2040
caggccctgc ctccaagatg a                                             2061

SEQ ID NO: 8          moltype = AA   length = 672
FEATURE               Location/Qualifiers
REGION                1..672
                      note = Description of Artificial Sequence: Synthetic
                      polypeptide
REGION                1..672
                      note = chimeric antigen receptor
source                1..672
                      mol_type = protein
                      organism = synthetic construct
SEQUENCE: 8
MLTSLLCWMA LCLLGADHAD ACPYSNPSLC SGGGGSELPT QGTFSNVSTN VSPAKPTTTA   60
CPYSNPSLCS GGGGSPAPRP PTPAPTIASQ PLSLRPEACR PAAGGAVHTR GLDFACDIYI   120
WAPLAGTCGV LLLSLVITLY CNHRNRRRVC KCPRPVVRAE GRGSLLTCGD VEENPGPMET   180
DTLLLWVLLL WVPGSTGEVQ LQQSGPELIK PGASVKMSCK ASGYTFTSYV MHWVKQKPGQ   240
GLEWIGYINP YNDGTKYNEK FKGKATLTSD KSSSTAYMEL SSLTSEDSAV YYCARGTYYY   300
GSRVFDYWGQ GTTLTVSSGG GGSGGGGSGG GGSDIVMTQA APSIPVTPGE SVSISCRSSK   360
SLLNSNGNTY LYWFLQRPGQ SPQLLIYRMS NLASGVPDRF SGSGSGTAFT LRISRVEAED   420
VGVYYCMQHL EYPFTFGAGT KLELKRSDPT TTPAPRPPTP APTIASQPLS LRPEACRPAA   480
GGAVHTRGLD FACDIYIWAP LAGTCGVLLL SLVITLYCKR GRKKLLYIFK QPFMRPVQTT   540
QEEDGCSCRF PEEEEGGCEL RVKFSRSADA PAYQQGQNQL YNELNLGRRE EYDVLDKRRG   600
RDPEMGGKPR RKNPQEGLYN ELQKDKMAEA YSEIGMKGER RRGKGHDGLY QGLSTATKDT   660
YDALHMQALP PR                                                       672

SEQ ID NO: 9          moltype = AA   length = 495
FEATURE               Location/Qualifiers
REGION                1..495
                      note = Description of Artificial Sequence: Synthetic
                      polypeptide
REGION                1..495
                      note = chimeric antigen receptor
source                1..495
                      mol_type = protein
                      organism = synthetic construct
SEQUENCE: 9
METDTLLLWV LLLWVPGSTG EVQLQQSGPE LIKPGASVKM SCKASGYTFT SYVMHWVKQK   60
PGQGLEWIGY INPYNDGTKY NEKFKGKATL TSDKSSSTAY MELSSLTSED SAVYYCARGT   120
YYYGSRVFDY WGQGTTLTVS SGGGGSGGGG SGGGGSDIVM TQAAPSIPVT PGESVSISCR   180
SSKSLLNSNG NTYLYWFLQR PGQSPQLLIY RMSNLASGVP DRFSGSGSGT AFTLRISRVE   240
AEDVGVYYCM QHLEYPFTFG AGTKLELKRS DPTTTPAPRP PTPAPTIASQ PLSLRPEACR   300
PAAGGAVHTR GLDFACDIYI WAPLAGTCGV LLLSLVITLY CKRGRKKLLY IFKQPFMRPV   360
QTTQEEDGCS CRFPEEEEGG CELRVKFSRS ADAPAYQQGQ NQLYNELNLG RREEYDVLDK   420
RRGRDPEMGG KPRRKNPQEG LYNELQKDKM AEAYSEIGMK GERRRGKGHD GLYQGLSTAT   480
KDTYDALHMQ ALPPR                                                    495

SEQ ID NO: 10         moltype = AA   length = 495
FEATURE               Location/Qualifiers
REGION                1..495
                      note = Description of Artificial Sequence: Synthetic
                      polypeptide
REGION                1..495
                      note = chimeric antigen receptor
source                1..495
                      mol_type = protein
                      organism = synthetic construct
SEQUENCE: 10
METDTLLLWV LLLWVPGSTG EVQLQQSGPE LIKPGASVKM SCKASGYTFT SYVMHWVKQK   60
PGQGLEWIGY INPYNDGTKY NEKFKGKATL TSDKSSSTAY MELSSLTSED SAVYYCARGT   120
YYYGSRVFDY WGQGTTLTVS SGGGGSGGGG SGGGGSDIVM TQAAPSIPVT PGESVSISCR   180
SSKSLLNSNG NTYLYWFLQR PGQSPQLLIY RMSNLASGVP DRFSGSGSGT AFTLRISRVE   240
AEDVGVYYCM QHLEYPFTFG AGTKLELKRS DPTTTPAPRP PTPAPTIASQ PLSLRPEACR   300
PAAGGAVHTR GLDFACDIYI WAPLAGTCGV LLLSLVITLY CKRGRKKLLY IFKQPFMRPV   360
```

```
QTTQEEDGCS  CRFPEEEEGG  CELRVKFSRS  ADAPAYQQGQ  NQLYNELNLG  RREEYDVLDK   420
RRGRDPEMGG  KPRRKNPQEG  LYNELQKDKM  AEAYSEIGMK  GERRRGKGHD  GLYQGLSTAT   480
KDTYDALHMQ  ALPPR                                                       495

SEQ ID NO: 11            moltype = AA   length = 624
FEATURE                  Location/Qualifiers
REGION                   1..624
                         note = Description of Artificial Sequence: Synthetic
                         polypeptide
REGION                   1..624
                         note = chimeric antigen receptor
source                   1..624
                         mol_type = protein
                         organism = synthetic construct
SEQUENCE: 11
MGTSLLCWMA  LCLLGADHAD  ASGGGGSPAP  RPPTPAPTIA  SQPLSLRPEA  CRPAAGGAVH    60
TRGLDFACDI  YIWAPLAGTC  GVLLLSLVIT  LYCNHRNRRR  VCKCPRPVVR  AEGRGSLLTC   120
GDVEENPGPM  ETDTLLLWVL  LLWVPGSTGE  VQLQQSGPEL  IKPGASVKMS  CKASGYTFTS   180
YVMHWVKQKP  GQGLEWIGYI  NPYNDGTKYN  EKFKGKATLT  SDKSSSTAYM  ELSSLTSEDS   240
AVYYCARGTY  YYGSRVFDYW  GQGTTLTVSS  GGGGSGGGGS  GGGGSDIVMT  QAAPSIPVTP   300
GESVSISCRS  SKSLLNSNGN  TYLYWFLQRP  GQSPQLLIYR  MSNLASGVPD  RFSGSGSGTA   360
FTLRISRVEA  EDVGVYYCMQ  HLEYPFTFGA  GTKLELKRSD  PTTTPAPRPP  TPAPTIASQP   420
LSLRPEACRP  AAGGAVHTRG  LDFACDIYIW  APLAGTCGVL  LLSLVITLYC  KRGRKKLLYI   480
FKQPFMRPVQ  TTQEEDGCSC  RFPEEEEGGC  ELRVKFSRSA  DAPAYQQGQN  QLYNELNLGR   540
REEYDVLDKR  RGRDPEMGGK  PRRKNPQEGL  YNELQKDKMA  EAYSEIGMKG  ERRRGKGHDG   600
LYQGLSTATK  DTYDALHMQA  LPPR                                            624

SEQ ID NO: 12            moltype = AA   length = 646
FEATURE                  Location/Qualifiers
REGION                   1..646
                         note = Description of Artificial Sequence: Synthetic
                         polypeptide
REGION                   1..646
                         note = chimeric antigen receptor
source                   1..646
                         mol_type = protein
                         organism = synthetic construct
SEQUENCE: 12
MGTSLLCWMA  LCLLGADHAD  ASGGGGSELP  TQGTFSNVST  NVSSGGGGSP  APRPPTPAPT    60
IASQPLSLRP  EACRPAAGGA  VHTRGLDFAC  DIYIWAPLAG  TCGVLLLSLV  ITLYCNHRNR   120
RRVCKCPRPV  VRAEGRGSLL  TCGDVEENPG  PMETDTLLLW  VLLLWVPGST  GEVQLQQSGP   180
ELIKPGASVK  MSCKASGYTF  TSYVMHWVKQ  KPGQGLEWIG  YINPYNDGTK  YNEKFKGKAT   240
LTSDKSSSTA  YMELSSLTSE  DSAVYYCARG  TYYYGSRVFD  YWGQGTTLTV  SSGGGGSGGGG   300
GSGGGGSDIV  MTQAAPSIPV  TPGESVSISC  RSSKSLLNSN  GNTYLYWFLQ  RPGQSPQLLI   360
YRMSNLASGV  PDRFSGSGSG  TAFTLRISRV  EAEDVGVYYC  MQHLEYPFTF  GAGTKLELKR   420
SDPTTTPAPR  PPTPAPTIAS  QPLSLRPEAC  RPAAGGAVHT  RGLDFACDIY  IWAPLAGTCG   480
VLLLSLVITL  YCKRGRKKLL  YIFKQPFMRP  VQTTQEEDGC  SCRFPEEEEG  GCELRVKFSR   540
SADAPAYQQG  QNQLYNELNL  GRREEYDVLD  KRRGRDPEMG  GKPRRKNPQE  GLYNELQKDK   600
MAEAYSEIGM  KGERRRGKGH  DGLYQGLSTA  TKDTYDALHM  QALPPR                  646

SEQ ID NO: 13            moltype = AA   length = 672
FEATURE                  Location/Qualifiers
REGION                   1..672
                         note = Description of Artificial Sequence: Synthetic
                         polypeptide
REGION                   1..672
                         note = chimeric antigen receptor
source                   1..672
                         mol_type = protein
                         organism = synthetic construct
SEQUENCE: 13
MGTSLLCWMA  LCLLGADHAD  ACSGGGGGSC  SGGGGSELPT  QGTFSNVSTN  VSPAKPTTTA    60
CSGGGGGSCS  GGGGSPAPRP  PTPAPTIASQ  PLSLRPEACR  PAAGGAVHTR  GLDFACDIYI   120
WAPLAGTCGV  LLLSLVITLY  CNHRNRRRVC  KCPRPVVRAE  GRGSLLTCGD  VEENPGPMET   180
DTLLLWVLLL  WVPGSTGEVQ  LQQSGPELIK  PGASVKMSCK  ASGYTFTSYV  MHWVKQKPGQ   240
GLEWIGYINP  YNDGTKYNEK  FKGKATLTSD  KSSSTAYMEL  SSLTSEDSAV  YYCARGTYYY   300
GSRVFDYWGQ  GTTLTVSSGG  GGSGGGGSGG  GGSDIVMTQA  APSIPVTPGE  SVSISCRSSK   360
SLLNSNGNTY  LYWFLQRPGQ  SPQLLIYRMS  NLASGVPDRF  SGSGSGTAFT  LRISRVEAED   420
VGVYYCMQHL  EYPFTFGAGT  KLELKRSDPT  TTPAPRPPTP  APTIASQPLS  LRPEACRPAA   480
GGAVHTRGLD  FACDIYIWAP  LAGTCGVLLL  SLVITLYCKR  GRKKLLYIFK  QPFMRPVQTT   540
QEEDGCSCRF  PEEEEGGCEL  RVKFSRSADA  PAYQQGQNQL  YNELNLGRRE  EYDVLDKRRG   600
RDPEMGGKPR  RKNPQEGLYN  ELQKDKMAEA  YSEIGMKGER  RRGKGHDGLY  QGLSTATKDT   660
YDALHMQALP  PR                                                          672

SEQ ID NO: 14            moltype = AA   length = 686
FEATURE                  Location/Qualifiers
REGION                   1..686
                         note = Description of Artificial Sequence: Synthetic
                         polypeptide
```

```
REGION                         1..686
                               note = chimeric antigen receptor
source                         1..686
                               mol_type = protein
                               organism = synthetic construct
SEQUENCE: 14
MGTSLLCWMA LCLLGADHAD AELPTQGTFS NVSTNVSSGG GGSELPTQGT FSNVSTNVSP    60
AKPTTTAELP TQGTFSNVST NVSSGGGGSP APRPPTPAPT IASQPLSLRP EACRPAAGGA   120
VHTRGLDFAC DIYIWAPLAG TCGVLLLSLV ITLYCNHRNR RRVCKCPRPV VRAEGRGSLL   180
TCGDVEENPG PMETDTLLLW VLLLWVPGST GEVQLQQSGP ELIKPGASVK MSCKASGYTF   240
TSYVMHWVKQ KPGQGLEWIG YINPYNDGTK YNEKFKGKAT LTSDKSSSTA YMELSSLTSE   300
DSAVYYCARG TYYYGSRVFD YWGQGTTLTV SSGGGGSGGG GSGGGGSDIV MTQAAPSIPV   360
TPGESVSISC RSSKSLLNSN GNTYLYWFLQ RPGQSPQLLI YRMSNLASGV PDRFSGSGSG   420
TAFTLRISRV EAEDVGVYYC MQHLEYPFTF GAGTKLELKR SDPTTTPAPR PPTPAPTIAS   480
QPLSLRPEAC RPAAGGAVHT RGLDFACDIY IWAPLAGTCG VLLLSLVITL YCKRGRKKLL   540
YIFKQPFMRP VQTTQEEDGC SCRFPEEEEG GCELRVKFSR SADAPAYQQG QNQLYNELNL   600
GRREEYDVLD KRRGRDPEMG GKPRRKNPQE GLYNELQKDK MAEAYSEIGM KGERRRGKGH   660
DGLYQGLSTA TKDTYDALHM QALPPR                                        686

SEQ ID NO: 15                  moltype = DNA  length = 1189
FEATURE                        Location/Qualifiers
misc_feature                   1..1189
                               note = Description of Artificial Sequence: Synthetic
                                polynucleotide
misc_feature                   1..1189
                               note = artificial promoter
source                         1..1189
                               mol_type = other DNA
                               organism = synthetic construct
SEQUENCE: 15
gcgtgaggct ccggtgcccg tcagtgggca gagcgcacat cgcccacagt ccccgagaag    60
ttgggggggag gggtcggcaa ttgaaccggt gcctagagaa ggtggcgcgg ggtaaactgg   120
gaaagtgatg tcgtgtactg gctccgcctt tttcccgagg gtgggggaga accgtatata   180
agtgcagtag tcgccgtgaa cgttctttt cgcaacgggt ttgccgccag aacacaggta    240
agtgccgtgt gtggttcccg cgggcctggc ctctttacgg gttatgcccc ttgcgtgcct   300
tgaattactt ccacgcccct ggctgcagta cgtgattctt gatcccgagc ttcgggttgg   360
aagtgggtgg gagagttcga ggccttgcgc ttaaggagcc ccttcgcctc gtgcttgagt   420
tgaggcctgc cctgggcgct ggggccgccg cgtgcgaatc tggtggcacc ttcgcgcctg   480
tctcgctgct ttcgataagt ctctagccat ttaaaatttt tgatgacctg ctgcgacgct   540
tttttctgg caagatagtc ttgtaaatgc gggccaagat ctgcacactg gtatttcggt    600
ttttggggcc gcgggcggcg acggggcccg tgcgtcccag cgcacatgtt cggcgaggcg   660
gggcctgcga gcgcggccac cgagaatcgg acggggctag tctcaagctg gccggcctgc   720
tctggtgcct ggcctcgcgc cgccgtgtat cgccccgccc tgggcggcaa ggctggccgg   780
gtcggcacca gttgcgtgag cggaaagatg gccgcttccc ggccctgctg cagggagctc   840
aaaatggagg acgcggcgct cgggagagcg ggcgggtgag tcacccacac aaaggaaaag   900
ggcctttccg tcctcagccg tcgcttcatg tgactccacg gagtaccggg cgccgtccag   960
gcacctcgat tagttctcga gcttttggag tacgtcgtct ttaggttggg ggagggggtt  1020
ttatgcgatg gagtttcccc acactgagtg ggtggagact gaagttaggc cagcttggca  1080
cttgatgtaa ttctccttgg aatttgccct ttttgagttt ggatcttggt tcattctcaa  1140
gcctcagaca gtgggttcaaa gttttttttct tccatttcag gtgtcgtga              1189

SEQ ID NO: 16                  moltype = DNA  length = 237
FEATURE                        Location/Qualifiers
misc_feature                   1..237
                               note = Description of Artificial Sequence: Synthetic
                                polynucleotide
misc_feature                   1..237
                               note = promoter
source                         1..237
                               mol_type = other DNA
                               organism = synthetic construct
SEQUENCE: 16
gcgtgaggct ccggtgcccg tcagtgggca gagcgcacat cgcccacagt ccccgagaag    60
ttgggggggag gggtcggcaa ttgaaccggt gcctagagaa ggtggcgcgg ggtaaactgg   120
gaaagtgatg tcgtgtactg gctccgcctt tttcccgagg gtgggggaga accgtatata   180
agtgcagtag tcgccgtgaa cgttctttt cgcaacgggt ttgccgccag aacacag       237

SEQ ID NO: 17                  moltype = AA  length = 464
FEATURE                        Location/Qualifiers
REGION                         1..464
                               note = Description of Artificial Sequence: Synthetic
                                polypeptide
REGION                         1..464
                               note = immunoglobulin gamma 1 heavy chain
source                         1..464
                               mol_type = protein
                               organism = synthetic construct
SEQUENCE: 17
MEWSWIFLFL LSGTAGVHSE VQLQQSGPEL IKPGASVKMS CKASGYTFTS YVMHWVKQKP    60
```

```
GQGLEWIGYI NPYNDGTKYN EKFKGKATLT SDKSSSTAYM ELSSLTSEDS AVYYCARGTY   120
YYGSRVFDYW GQGTTLTVSS AKTTPPSVYP LAPGSAAQTN SMVTLGCLVK GYFPEPVTVT   180
WNSGSLSSGV HTFPAVLQSD LYTLSSSVTV PSSTWPSETV TCNVAHPASS TKVDKKIVPR   240
DCGCKPCICT VPEVSSVFIF PPKPKDVLTI TLTPKVTCVV VDISKDDPEV QFSWFVDDVE   300
VHTAQTQPRE EQFNSTFRSV SELPIMHQDW LNGKEFKCRV NSAAFPAPIE KTISKTKGRP   360
KAPQVYTIPP PKEQMAKDKV SLTCMITDFF PEDITVEWQW NGQPAENYKN TQPIMDTDGS   420
YFVYSKLNVQ KSNWEAGNTF TCSVLHEGLH NHHTEKSLSH SPGK                   464

SEQ ID NO: 18           moltype = AA  length = 239
FEATURE                 Location/Qualifiers
REGION                  1..239
                        note = Description of Artificial Sequence: Synthetic
                         polypeptide
REGION                  1..239
                        note = immunoglobulin kappa light chain
source                  1..239
                        mol_type = protein
                        organism = synthetic construct
SEQUENCE: 18
MRCLAEFLGL LVLWIPGAIG DIVMTQAAPS IPVTPGESVS ISCRSSKSLL NSNGNTYLYW    60
FLQRPGQSPQ LLIYRMSNLA SGVPDRFSGS GSGTAFTLRI SRVEAEDVGV YYCMQHLEYP   120
FTFGAGTKLE LKRADAAPTV SIFPPSSEQL TSGGASVVCF LNNFYPKDIN VKWKIDGSER   180
QNGVLNSWTD QDSKDSTYSM SSTLTLTKDE YERHNSYTCE ATHKTSTSPI VKSFNRNEC    239

SEQ ID NO: 19           moltype = AA  length = 136
FEATURE                 Location/Qualifiers
REGION                  1..136
                        note = Description of Artificial Sequence: Synthetic
                         polypeptide
REGION                  1..136
                        note = rituximab binding sequence
source                  1..136
                        mol_type = protein
                        organism = synthetic construct
SEQUENCE: 19
CPYSNPSLCS GGGGSELPTQ GTFSNVSTNV SPAKPTTTAC PYSNPSLCSG GGGSPAPRPP    60
TPAPTIASQP LSLRPEACRP AAGGAVHTRG LDFACDIYIW APLAGTCGVL LLSLVITLYC   120
NHRNRRRVCK CPRPVV                                                  136

SEQ ID NO: 20           moltype = AA  length = 21
FEATURE                 Location/Qualifiers
REGION                  1..21
                        note = Description of Artificial Sequence: Synthetic peptide
REGION                  1..21
                        note = signal peptide
source                  1..21
                        mol_type = protein
                        organism = synthetic construct
SEQUENCE: 20
MGTSLLCWMA LCLLGADHAD A                                             21

SEQ ID NO: 21           moltype = AA  length = 157
FEATURE                 Location/Qualifiers
REGION                  1..157
                        note = Description of Artificial Sequence: Synthetic
                         polypeptide
source                  1..157
                        mol_type = protein
                        organism = synthetic construct
SEQUENCE: 21
MGTSLLCWMA LCLLGADHAD ACPYSNPSLC SGGGGSELPT QGTFSNVSTN VSPAKPTTTA    60
CPYSNPSLCS GGGGSPAPRP PTPAPTIASQ PLSLRPEACR PAAGGAVHTR GLDFACDIYI   120
WAPLAGTCGV LLLSLVITLY CNHRNRRRVC KCPRPVV                            157

SEQ ID NO: 22           moltype = AA  length = 9
FEATURE                 Location/Qualifiers
REGION                  1..9
                        note = Description of Artificial Sequence: Synthetic peptide
source                  1..9
                        mol_type = protein
                        organism = synthetic construct
SEQUENCE: 22
CPYSNPSLC                                                            9

SEQ ID NO: 23           moltype = AA  length = 24
FEATURE                 Location/Qualifiers
REGION                  1..24
                        note = Description of Artificial Sequence: Synthetic peptide
source                  1..24
```

-continued

```
                              mol_type = protein
                              organism = synthetic construct
SEQUENCE: 23
NSELLSLIND MPITNDQKKL MSNN                                                     24

SEQ ID NO: 24                 moltype = AA  length = 12
FEATURE                       Location/Qualifiers
REGION                        1..12
                              note = Description of Artificial Sequence: Synthetic peptide
source                        1..12
                              mol_type = protein
                              organism = synthetic construct
SEQUENCE: 24
CQFDLSTRRL KC                                                                  12

SEQ ID NO: 25                 moltype = AA  length = 12
FEATURE                       Location/Qualifiers
REGION                        1..12
                              note = Description of Artificial Sequence: Synthetic peptide
source                        1..12
                              mol_type = protein
                              organism = synthetic construct
SEQUENCE: 25
CQYNLSSRAL KC                                                                  12

SEQ ID NO: 26                 moltype = AA  length = 12
FEATURE                       Location/Qualifiers
REGION                        1..12
                              note = Description of Artificial Sequence: Synthetic peptide
source                        1..12
                              mol_type = protein
                              organism = synthetic construct
SEQUENCE: 26
CVWQRWQKSY VC                                                                  12

SEQ ID NO: 27                 moltype = AA  length = 12
FEATURE                       Location/Qualifiers
REGION                        1..12
                              note = Description of Artificial Sequence: Synthetic peptide
source                        1..12
                              mol_type = protein
                              organism = synthetic construct
SEQUENCE: 27
CMWDRFSRWY KC                                                                  12

SEQ ID NO: 28                 moltype = AA  length = 25
FEATURE                       Location/Qualifiers
REGION                        1..25
                              note = Description of Artificial Sequence: Synthetic peptide
source                        1..25
                              mol_type = protein
                              organism = synthetic construct
SEQUENCE: 28
SFVLNWYRMS PSNQTDKLAA FPEDR                                                    25

SEQ ID NO: 29                 moltype = AA  length = 19
FEATURE                       Location/Qualifiers
REGION                        1..19
                              note = Description of Artificial Sequence: Synthetic peptide
source                        1..19
                              mol_type = protein
                              organism = synthetic construct
SEQUENCE: 29
SGTYLCGAIS LAPKAQIKE                                                           19

SEQ ID NO: 30                 moltype = AA  length = 16
FEATURE                       Location/Qualifiers
REGION                        1..16
                              note = Description of Artificial Sequence: Synthetic peptide
source                        1..16
                              mol_type = protein
                              organism = synthetic construct
SEQUENCE: 30
ELPTQGTFSN VSTNVS                                                              16

SEQ ID NO: 31                 moltype = AA  length = 12
FEATURE                       Location/Qualifiers
REGION                        1..12
                              note = Description of Artificial Sequence: Synthetic peptide
```

```
source                  1..12
                        mol_type = protein
                        organism = synthetic construct
SEQUENCE: 31
GQNDTSQTSS PS                                                           12

SEQ ID NO: 32           moltype = AA   length = 16
FEATURE                 Location/Qualifiers
REGION                  1..16
                        note = Description of Artificial Sequence: Synthetic peptide
source                  1..16
                        mol_type = protein
                        organism = synthetic construct
SEQUENCE: 32
GLAVSTISSF FPPGYQ                                                       16

SEQ ID NO: 33           moltype = AA   length = 45
FEATURE                 Location/Qualifiers
REGION                  1..45
                        note = Description of Artificial Sequence: Synthetic
                         polypeptide
source                  1..45
                        mol_type = protein
                        organism = synthetic construct
SEQUENCE: 33
TTTPAPRPPT PAPTIASQPL SLRPEACRPA AGGAVHTRGL DFACD                       45

SEQ ID NO: 34           moltype = AA   length = 231
FEATURE                 Location/Qualifiers
REGION                  1..231
                        note = Description of Artificial Sequence: Synthetic
                         polypeptide
source                  1..231
                        mol_type = protein
                        organism = synthetic construct
SEQUENCE: 34
EPKSPDKTHT CPPCPAPPVA GPSVFLFPPK PKDTLMIART PEVTCVVVDV SHEDPEVKFN        60
WYVDGVEVHN AKTKPREEQY NSTYRVVSVL TVLHQDWLNG KEYKCKVSNK ALPAPIEKTI       120
SKAKGQPREP QVYTLPPSRD ELTKNQVSLT CLVKGFYPSD IAVEWESNGQ PENNYKTTPP       180
VLDSDGSFFL YSKLTVDKSR WQQGNVFSCS VMHEALHNHY TQKSLSLSPG K                231

SEQ ID NO: 35           moltype = AA   length = 21
FEATURE                 Location/Qualifiers
REGION                  1..21
                        note = Description of Artificial Sequence: Synthetic peptide
source                  1..21
                        mol_type = protein
                        organism = synthetic construct
SEQUENCE: 35
IYIWAPLAGT CGVLLLSLVI T                                                 21

SEQ ID NO: 36           moltype = AA   length = 66
FEATURE                 Location/Qualifiers
REGION                  1..66
                        note = Description of Artificial Sequence: Synthetic
                         polypeptide
source                  1..66
                        mol_type = protein
                        organism = synthetic construct
SEQUENCE: 36
TTTPAPRPPT PAPTIASQPL SLRPEACRPA AGGAVHTRGL DFACDIYIWA PLAGTCGVLL        60
LSLVIT                                                                  66

SEQ ID NO: 37           moltype = AA   length = 42
FEATURE                 Location/Qualifiers
REGION                  1..42
                        note = Description of Artificial Sequence: Synthetic
                         polypeptide
source                  1..42
                        mol_type = protein
                        organism = synthetic construct
SEQUENCE: 37
KRGRKKLLYI FKQPFMRPVQ TTQEEDGCSC RFPEEEEGGC EL                          42

SEQ ID NO: 38           moltype = AA   length = 113
FEATURE                 Location/Qualifiers
REGION                  1..113
                        note = Description of Artificial Sequence: Synthetic
                         polypeptide
```

```
source                  1..113
                        mol_type = protein
                        organism = synthetic construct
SEQUENCE: 38
LRVKFSRSAD APAYQQGQNQ LYNELNLGRR EEYDVLDKRR GRDPEMGGKP RRKNPQEGLY  60
NELQKDKMAE AYSEIGMKGE RRRGKGHDGL YQGLSTATKD TYDALHMQAL PPR        113

SEQ ID NO: 39           moltype = DNA  length = 943
FEATURE                 Location/Qualifiers
misc_feature            1..943
                        note = Description of Artificial Sequence: Synthetic
                         polynucleotide
misc_feature            1..943
                        note = intron
source                  1..943
                        mol_type = other DNA
                        organism = synthetic construct
SEQUENCE: 39
gtaagtgccg tgtgtggttc ccgcgggcct ggcctcttta cgggttatgg cccttgcgtg   60
ccttgaatta cttccacgcc cctggctgca gtacgtgatt cttgatcccg agcttcgggt  120
tggaagtggg tgggagagtt cgaggccttg cgcttaagga gccccttcgc ctcgtgcttg  180
agttgaggcc tggcctgggc gctgggggcc ccgcgtgcga atctggtggc accttcgcgc  240
ctgtctcgct gctttcgata agtctctagc catttaaaat ttttgatgac ctgctgcgac  300
gctttttttc tggcaagata gtcttgtaaa tgcgggccaa gatctgcaca ctggtatttc  360
ggttttttgg gccgcgggcg gcgacggggc ccgtgcgtcc cagcgcacat gttcggcgag  420
gcggggcctg cgagcgcggc caccgagaat cggacggggg tagtctcaag ctggccggcc  480
tgctctggtg cctggcctcg cgccgccgtg tatcgccccg ccctgggcgg caaggctggc  540
ccggtcggca ccagttgcgt gagcggaaag atggccgctt cccggccctg ctgcaggag   600
ctcaaaatgg aggacgcggc gctcgggaga gcgggcgggt gagtcaccca cacaaaggaa  660
aagggccttt ccgtcctcag ccgtcgcttc atgtgactcc acggagtacc gggcgccgtc  720
caggcacctc gattagttct cgagcttttg gagtacgtcg tctttaggtt gggggagggg  780
gttttatgcg atggagtttc cccacactga gtgggtggag actgaagtta ggccagcttg  840
gcacttgatg taattctcct tggaatttgc ccttttttgag tttggatctt ggttcattct  900
caagcctcag acagtggttc aaagtttttt tcttccattt cag                    943

SEQ ID NO: 40           moltype = AA  length = 136
FEATURE                 Location/Qualifiers
REGION                  1..136
                        note = Description of Artificial Sequence: Synthetic
                         polypeptide
REGION                  1..136
                        note = mutated rituximab binding sequences
source                  1..136
                        mol_type = protein
                        organism = synthetic construct
SEQUENCE: 40
CSGGGGGSCS GGGGSELPTQ GTFSNVSTNV SPAKPTTTAC SGGGGGSCSG GGGSPAPRPP   60
TPAPTIASQP LSLRPEACRP AAGGAVHTRG LDFACDIYIW APLAGTCGVL LLSLVITLYC  120
NHRNRRRVCK CPRPVV                                                  136

SEQ ID NO: 41           moltype = AA  length = 25
FEATURE                 Location/Qualifiers
VARIANT                 1..25
                        note = SITE - This sequence may encompass 1-5 GGGGS
                         repeating units
REGION                  1..25
                        note = Description of Artificial Sequence: Synthetic peptide
source                  1..25
                        mol_type = protein
                        organism = synthetic construct
SEQUENCE: 41
GGGGSGGGGS GGGGSGGGGS GGGGS                                         25
```